US012664316B1

(12) United States Patent
Shah et al.

(10) Patent No.: US 12,664,316 B1
(45) Date of Patent: Jun. 23, 2026

(54) DOMAIN-RULE-BASED VALIDATION AND USE OF TRUSTED DOCUMENTS BY ONLINE SOFTWARE PLATFORM (OSP)

(71) Applicant: Avalara, Inc., Seattle, WA (US)

(72) Inventors: Dhawal Shah, Chennai (IN); Jeremy Martinez, Seattle, WA (US); Shubham Kanodia, Chennai (IN); Matild Reema, Chennai (IN); Rajesh Muppalla, Chennai (IN); Nick Brown, Durham, NC (US); Greg Penhaligon, Durham, NC (US); Abhineythri Venkataraman, Chennai (IN); Brandon Potter, Redmond, WA (US); Scott Seely, Galesville, WI (US); Gregory T. Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 563 days.

(21) Appl. No.: 18/067,511

(22) Filed: Dec. 16, 2022

Related U.S. Application Data

(60) Provisional application No. 63/342,753, filed on May 17, 2022.

(51) Int. Cl.
*G06F 21/64* (2013.01)
*G06F 3/0484* (2022.01)
(Continued)

(52) U.S. Cl.
CPC ............ *G06F 21/64* (2013.01); *G06F 3/0484* (2013.01); *G06F 16/93* (2019.01); *G06F 40/226* (2020.01);
(Continued)

(58) Field of Classification Search
CPC ........ G06F 21/64; G06F 3/0484; G06F 16/93; G06F 40/226; G06V 30/19; G06V 30/32; G06V 30/412
(Continued)

(56) References Cited

U.S. PATENT DOCUMENTS

| | | | |
|---|---|---|---|
| 7,783,536 B2 | 8/2010 | William et al. | |
| 7,933,803 B1 | 4/2011 | Nadler et al. | |

(Continued)

OTHER PUBLICATIONS

Zacks Equity Research, "Avalara's (AVLR) New Product Simplifies Exemption Certificate Collection," Yahoo! Finance, May 17, 2022, https://finance.yahoo.com/news/avalaras-avlr-product-simplifies-exemption-145302866.html . 3 pages.

*Primary Examiner* — Stephen S Hong
*Assistant Examiner* — Ahamed I Nazar
(74) *Attorney, Agent, or Firm* — Christopher Wickstrom; Frontier IP Law PLLC

(57) ABSTRACT

An Online Software Platform (OSP) is configured to receive an upload trusted document, input text segments of it, identify from the trusted document a set of requirements for the trusted document, confirm that the requirements are met, and therefore cause to be created a trusted document record that can be used to process a dataset that is received via a network later. The dataset has dataset values that can be used to select a subset of stored digital resource rules. The subset includes a main rule and an override rule, and it can be determined from the trusted document record whether the override rule applies or not. If so, a resource having a value of zero is reported. Else, a resource having a non-zero value is produced by applying the main rule to at least one of the dataset values, and is reported.

26 Claims, 34 Drawing Sheets

(51) Int. Cl.

| | |
|---|---|
| *G06F 16/93* | (2019.01) |
| *G06F 40/226* | (2020.01) |
| *G06V 30/19* | (2022.01) |
| *G06V 30/32* | (2022.01) |
| *G06V 30/412* | (2022.01) |

(52) U.S. Cl.
  CPC .............. *G06V 30/19* (2022.01); *G06V 30/32* (2022.01); *G06V 30/412* (2022.01)

(58) Field of Classification Search
  USPC ........................................................ 715/221
  See application file for complete search history.

(56) References Cited

U.S. PATENT DOCUMENTS

| | | | |
|---|---|---|---|
| 8,620,578 | B1 | 12/2013 | Brown et al. |
| 8,725,407 | B2 | 5/2014 | Hurley et al. |
| 9,760,915 | B2 * | 9/2017 | Pavlou ................. G06Q 40/123 |
| 10,332,216 | B2 | 6/2019 | Barsade et al. |
| 10,445,818 | B1 | 10/2019 | Chowdhary |
| 10,769,611 | B2 | 9/2020 | McNeel |
| 10,872,100 | B1 | 12/2020 | Shefferman et al. |
| 11,176,620 | B1 | 11/2021 | Lubczynski et al. |
| 11,238,542 | B1 | 2/2022 | Wixted et al. |
| 2002/0138765 | A1 | 9/2002 | Fishman et al. |
| 2007/0136158 | A1 | 6/2007 | Rawlings et al. |
| 2007/0136159 | A1 | 6/2007 | Rawlings et al. |
| 2009/0187500 | A1 | 7/2009 | Wilson et al. |
| 2013/0013471 | A1 * | 1/2013 | Fishman ................ G06Q 40/00 705/31 |
| 2014/0172656 | A1 | 6/2014 | Shaw |
| 2014/0351105 | A1 | 11/2014 | Hamm |
| 2016/0042466 | A1 | 2/2016 | Herndon et al. |
| 2016/0140668 | A1 * | 5/2016 | Maguire .............. G06Q 40/123 705/31 |
| 2019/0073232 | A1 * | 3/2019 | Armstrong .......... G06F 3/04842 |
| 2019/0114609 | A1 * | 4/2019 | Burton .............. G06Q 20/4016 |
| 2021/0158456 | A1 | 5/2021 | Morgan et al. |

* cited by examiner

*DATASET VALUES INVOKING DIFFERENT TYPES OF POSSIBLE DIGITAL RESOURCE RULES*

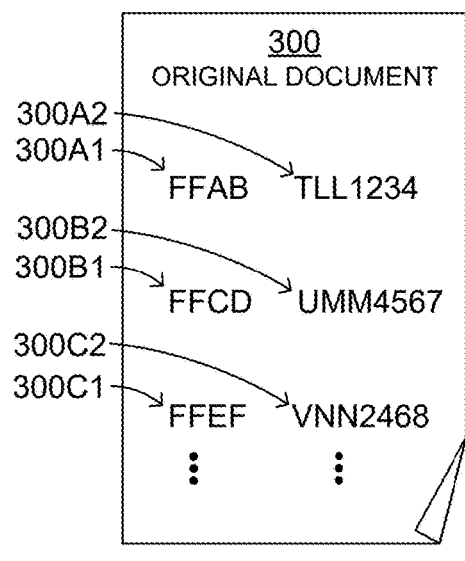
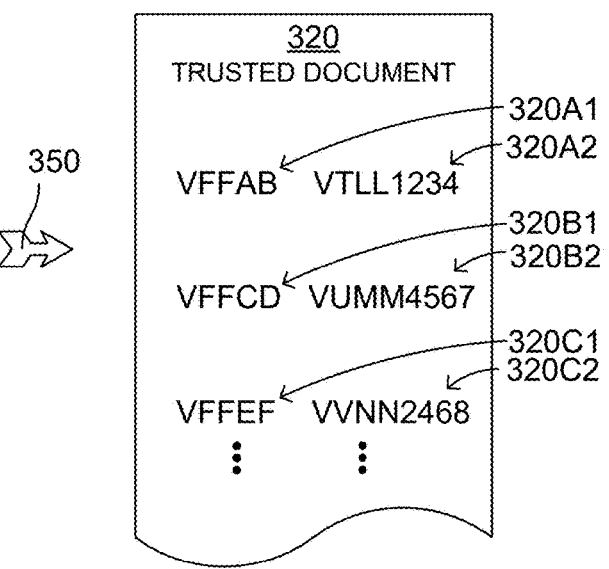
FIGURE 3
*SAMPLE TRUSTED DOCUMENT, AND ITS GENERATION*
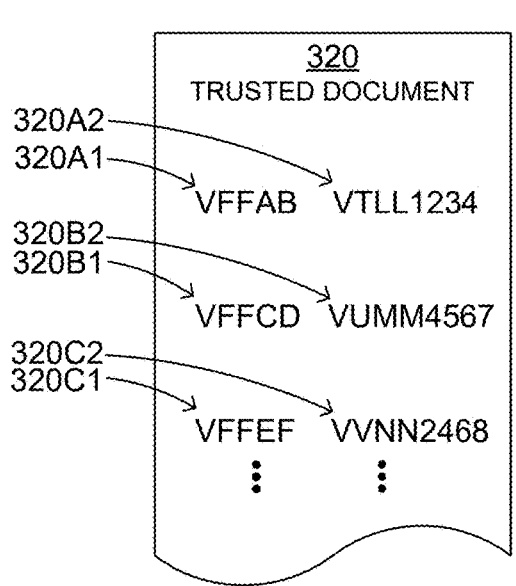
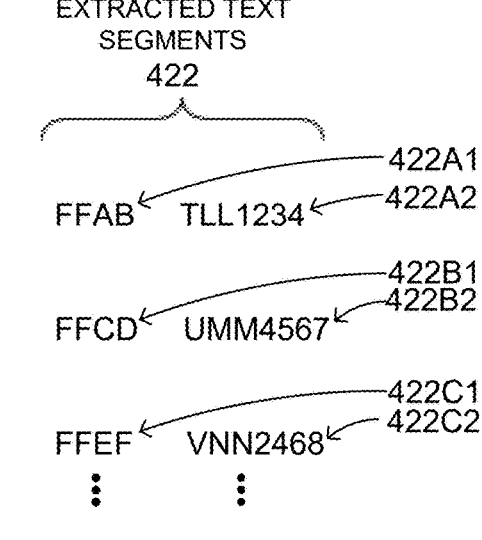
FIGURE 4
*EXTRACTING TEXT SEGMENTS*

523

422

524
DOMAIN FIELD        FFAB        TLL1234        525 DOMAIN FIELD VALUE

526
ACTUAL CONTENT FIELD 2        FFCD        UMM4567        527 ACTUAL VALUE 2

528
ACTUAL CONTENT FIELD 3        FFEF        VNN2468        529 ACTUAL VALUE 3

⋮        ⋮

_TEXT SEGMENTS CHARACTERIZED_

623

624
DOMAIN FIELD

625 DOMAIN FIELD VALUE

STATE OF VIRGINIA

626
ACF1

627 AV1

DOCUMENT NUMBER: CE1234567

628
ACF2

629 AV2

NAME: ABCD CO.

634
ACF3

635 AV3

PERSON ID NUMBER: 12-3456789

636
ACF4

637 AV4

ADDRESS: 123 Main Street, Anytown, Anystate 00000 US

638
ACF5

639 AV5

INVOKED JUSTIFICATION: [REASON_2]

644
ACF6

645 AV6

EXPIRATION DATE: 2022-12-31

646
ACF7

647 AV7

PERSON NAME: Jane Doe

648
ACF8

649 AV8     659 COMMENT

PERSON SIGNATURE: Jane Doe, 2022-02-22 (e-signed)

*SAMPLE CHARACTERIZED*
*TEXT SEGMENTS*

777 SCREEN

707 UI

THIS IS THE DATA WE EXTRACTED, PLEASE EDIT OR CONFIRM    717

723

STATE OF VIRGINIA

DOCUMENT NUMBER: CE1234567

NAME: ABCD CO.

PERSON ID NUMBER: XX-XXXXX

ADDRESS: 123 Main Street,
Anytown, Anystate 00000 US

INVOKED JUSTIFICATION: [REASON_2]

EXPIRATION DATE: 2022-12-31

PERSON NAME: Jane Doe

PERSON SIGNATURE: Jane Doe, 2022-02-22 (e-signed)    785

Click to Edit    784

Click to Confirm

_USER INTERFACE_
_(UI)_

_ALTERNATE SCENARIO:_
_FAILURE TO EXTRACT A_
_TEXT SEGMENT_

777 SCREEN

904 UI

CAUTION! WE COULD NOT EXTRACT SOME DATA BELOW

914

923

STATE OF VIRGINIA

DOCUMENT NUMBER: CE1234567

NAME: ABCD CO.

934
ACF3

PERSON ID NUMBER: __

984

← Please enter this from the document you received

ADDRESS: 123 Main Street,
Anytown, Anystate 00000 US

INVOKED JUSTIFICATION: [REASON_2]

EXPIRATION DATE: 2022-12-31

PERSON NAME: Jane Doe

PERSON SIGNATURE: Jane Doe, 2022-02-22 (e-signed)

_USER INTERFACE_
_(UI)_

SCENARIO WHERE ONE OF THE
REQUIREMENTS OF THE SET IS NOT MET

777 SCREEN

1102 UI

ERROR WITH TRUSTED DOCUMENT!  SEE BELOW

1112

1123

STATE OF VIRGINIA

DOCUMENT NUMBER:  CE1234567

NAME:  ABCD CO.

PERSON ID NUMBER:  12-3456789

ADDRESS:  123 Main Street,
Anytown, Anystate 00000 US

INVOKED JUSTIFICATION:  [REASON_2]

EXPIRATION DATE:  2022-12-31

PERSON NAME:  Jane Doe

1179

PERSON SIGNATURE:

← the document is not
signed as required

_USER INTERFACE_
_(UI)_

1300

*MODEL BUILDING*

1600

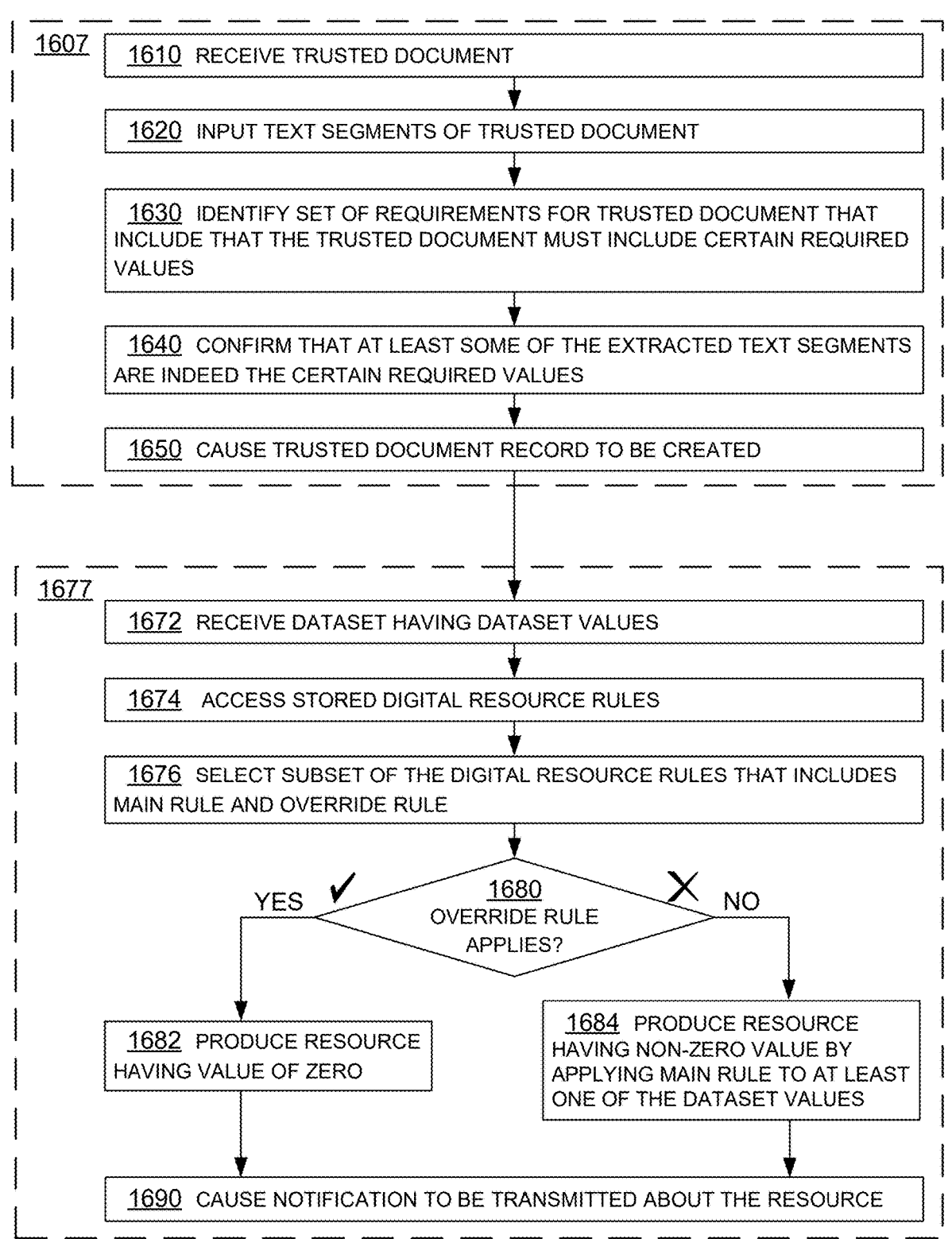

1607

1610   RECEIVE TRUSTED DOCUMENT

1620   INPUT TEXT SEGMENTS OF TRUSTED DOCUMENT

1630   IDENTIFY SET OF REQUIREMENTS FOR TRUSTED DOCUMENT THAT INCLUDE THAT THE TRUSTED DOCUMENT MUST INCLUDE CERTAIN REQUIRED VALUES

1640   CONFIRM THAT AT LEAST SOME OF THE EXTRACTED TEXT SEGMENTS ARE INDEED THE CERTAIN REQUIRED VALUES

1650   CAUSE TRUSTED DOCUMENT RECORD TO BE CREATED

1677

1672   RECEIVE DATASET HAVING DATASET VALUES

1674   ACCESS STORED DIGITAL RESOURCE RULES

1676   SELECT SUBSET OF THE DIGITAL RESOURCE RULES THAT INCLUDES MAIN RULE AND OVERRIDE RULE

YES   ✓        1680   OVERRIDE RULE APPLIES?        ✗   NO

1682   PRODUCE RESOURCE HAVING VALUE OF ZERO

1684   PRODUCE RESOURCE HAVING NON-ZERO VALUE BY APPLYING MAIN RULE TO AT LEAST ONE OF THE DATASET VALUES

1690   CAUSE NOTIFICATION TO BE TRANSMITTED ABOUT THE RESOURCE

FIGURE 16     *METHODS*

1700

| 1710 | USER PROVIDES TO APPLICATION IMAGE OF DOCUMENT |

1720
IDENTIFY DOCUMENT TYPE
(E.G. BY CLASSIFIER )

| 1791 | 1792 | 1793 | • • • |

| 1730 | EXTRACT FIELD VALUES BASED ON DOCUMENT |

| 1740 | PROCESS ALL EXTRACTED FIELD VALUES (REPEAT FOR EACH) |

| 1750 | PRESENT FIELD VALUES TO USER (HIGHLIGHTING THOSE REQUIRING VALIDATION) |

| 1760 | INPUT USER CORRECTIONS |

| 1770 | SAVE CORRECTED DATA |

| 1780 | SEND CORRECTIONS & ORIGINAL TO TRAINING SET |

1840

*USE CASE*

DATASET VALUES INVOKING
DIFFERENT TYPES OF POSSIBLE
DIGITAL TAX RULES

2300

2601

2620

FIGURE 26    *SAMPLE SCREEN FOR USE CASE*

2712

2713

SAMPLE SCREENS
FOR USE CASE

DR-13
R. 10/18

2019 Florida Annual Resale Certificate for Sales Tax
This Certificate Expires on December 31, 2019

FLORIDA

Business Name and Location Address

Certificate Number 12-3456780000-9

SAMPLE CUSTOMER
STREET ADDRESS
GAINESVILLE, FL 32611-2002

By extending this certificate or the certificate number to a selling dealer to make eligible purchases of taxable property or services exempt from sales tax and discretionary sales surtax, the person or business named above certifies that the taxable property or services purchased or rented will be resold or re-rented for one or more of the following purposes:

* Resale as tangible personal property.

* Re-rental as tangible personal property.

* Resale of services.

* Re-rental as commercial real property.

* Incorporation into tangible personal property being repaired.

* Re-rental as transient rental property.

* Incorporation as a material, ingredient, or component part of tangible personal property that is being produced for sale by manufacturing, compounding, or processing.

Your *Florida Annual Resale Certificate for Sales Tax* (Annual Resale Certificate) allows you or your representatives to buy or rent property or services tax exempt when the property or service is resold or re-rented. You may not use your Annual Resale Certificate to make tax-exempt purchases or rentals of property or services that will be used by your business or for personal purposes. Florida law provides for criminal and civil penalties for fraudulent use of an Annual Resale Certificate.

As a seller, you must document each tax-exempt sale for resale using one of three methods. You can use a different method each time you make a tax-exempt sale for resale.

1. Obtain a copy (paper or electronic) of your customer's current Annual Resale Certificate.
2. For each sale, obtain a transaction authorization number using your customer's Annual Resale Certificate number.
3. Each calendar year, obtain annual vendor authorization numbers for your regular customers using their Annual Resale Certificate numbers.

Online: Visit floridarevenue.com/taxes/certificates

Phone: 877-357-3725 and enter your customer's Annual Resale Certificate number

Mobile App: Available for iPhone, iPad, Android devices, and Windows phones.

FIGURE 28A

```
{
    "predictions" :  [
        {
          "label" :  "Florida Annual Resale Certificate",
          "confidence" :  0.74
        },
        {
          "label" :  "Tennessee Sales and Use Tax Resale Certificate",
          "confidence" :  0.04
        },
        {
          "label" :  "Other",
          "confidence" :  0.04
        },
        {
          "label" :  "Missouri Sales and Use Tax Exemption  Certificate",
          "confidence" :  0.03
        },
        {
          "label" :  "Florida Consumer's Certificate of Exemption",
          "confidence" :  0.02
        },
        {
          "label" :  "Illinois Sales Tax Exemption Certificate",
          "confidence" :  0.02
        },
        {
          "label" :  "Mississippi Retail Sales Tax Permit",
          "confidence" :  0.02
        },
        {
          "label" :  "Colorado Contractor Certificate of Exemption",
          "confidence" :  0.01
        },
        {
          "label" :  "Massachusetts ST-2 Certificate of Exemption",
          "confidence" :  0.01
        },
            {
          "label" :  "Louisiana Resale Certificate",
          "confidence" :  0.01
        },
        {
          "label" :  "Washington Reseller Permit Certificate",
          "confidence" :  0.01
        },
        {
          "label" :  "W9",
          "confidence" :  0
        }
    ]
}
```

FIGURE 28B

Consumer's Certificate of Exemption
Issued Pursuant to Chapter 212, Florida Statutes

DR-14
R. 10/15

| 12-3456781111-0 | 08/31/2017 | 08/31/2022 | COUNTY GOVERNMENT |
|---|---|---|---|
| Certificate Number | Effective Date | Expiration Date | Exemption Category |

This certifies that

SAMPLE CUSTOMER
STREET ADDRESS
GAINESVILLE, FL 32611-2002

2915 is exempt from the payment of Florida sales and use tax on real property rented, transient rental property rented, tangible personal property purchased or rented, or services purchased.

Important Information for Exempt Organizations

DR-14
R. 10/15

1.  You must provide all vendors and suppliers with an exemption certificate before making tax-exempt purchases. See Rule 12A-1.038, Florida Administrative Code (F.A.C.).

2.  Your Consumer's Certificate of Exemption is to be used solely by your organization for your organization's customary nonprofit activities.

3.  Purchases made by an individual on behalf of the organization are taxable, even if the individual will be reimbursed by the organization.

4.  This exemption applies only to purchases your organization makes. The sale or lease to others of tangible personal property, sleeping accommodations, or other real property is taxable. Your organization must register, and collect and remit sales and use tax on such taxable transactions. Note: Churches are exempt from this requirement except when they are the lessor of real property (Rule 12A-1.070, F.A.C.).

5.  It is a criminal offense to fraudulently present this certificate to evade the payment of sales tax. Under no circumstances should this certificate be used for the personal benefit of any individual. Violators will be liable for payment of the sales tax plus a penalty of 200% of the tax, and may be subject to conviction of a third-degree felony. Any violation will require the revocation of this certificate.

6.  If you have questions regarding your exemption certificate, please contact the Exemption Unit of Account Management at 800-352-3671. From the available options, select "Registration of Taxes," then "Registration Information," and finally "Exemption Certificates and Nonprofit Entities." The mailing address is PO Box 6480, Tallahassee, FL 32314-6480.

RECEIVED

FIGURE 29A

```
{
    "predictions" :  [
        {
          "label" :  "Business Name",
          "value" :  "SAMPLE CUSTOMER"
        },
        {
          "label" :  "Location Address",
          "value" :  "STREET ADDRESS, GAINESVILLE FL 32611-2002"
        },
        {
          "label" :  "Effective Date",
          "value" :  "2017-08-31"
        },
        {
          "label" :  "Expiration Date",
          "value" :  "2022-08-31"
        },
        {
          "label" :  "State",
          "value" :  "FLORIDA"
        },
        {
          "label" :  "Tax ID",
          "value" :  "12-3456781111-0"
        },
        {
          "label" :  "Certificate",
          "value" :  "Florida Consumer's Certificate of Exemption"
        }
    ]
}
```

FIGURE 29B

```
{
    "predictions" :  [
        {
          "label" :   "Business Name",
          "value" :   "FICTICIOUS COMPANY INC"
        },
        {
          "label" :   "Location Address",
          "value" :   "1234 BAYSHORE DR STE 101 PALM BAY FL 32905-2834"
        },
        {
          "label" :   "State",
          "value" :   "FLORIDA"
        },
        {
          "label" :   "Tax ID",
          "value" :   "11-3456780000-1"
        },
        {
          "label" :   "Certificate Year",
          "value" :   "2011"
        },
        {
          "label" :   "Certificate",
          "value" :   "Annual Resale Certificate"
        }
    ]
}
```

FIGURE 30B

Figure 31A:
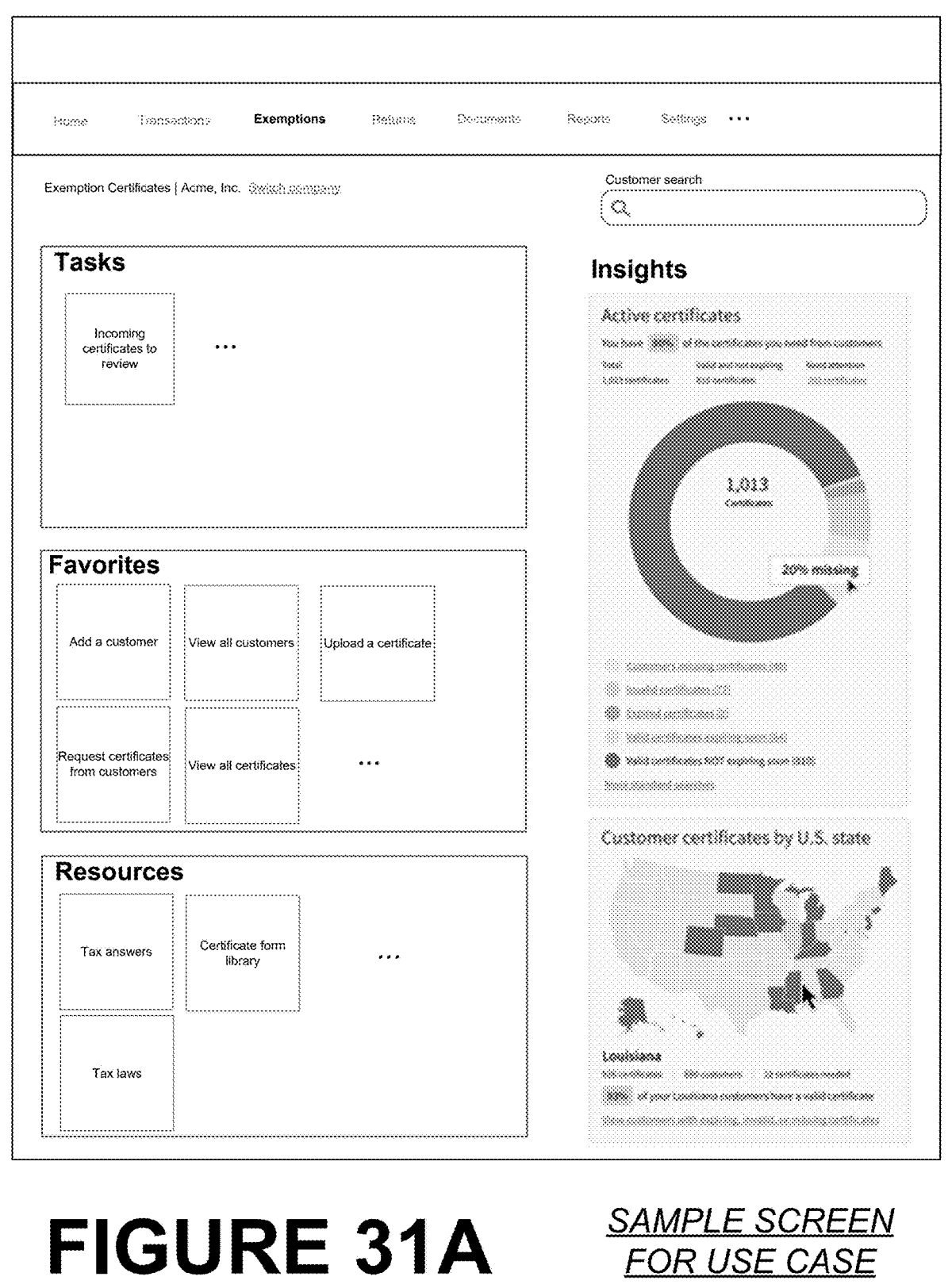

Home    Transactions    Exemptions    Returns    Documents    Reports    Settings    ...

Exemption Certificates | Acme, Inc.    Switch company

Customer search

🔍

Tasks

Incoming certificates to review    ...

Favorites

Add a customer    View all customers    Upload a certificate

Request certificates from customers    View all certificates    ...

Resources

Tax answers    Certificate form library    ...

Tax laws

Insights

Active certificates

You have ____ of the certificates you need from customers.

1,013
Certificates

20% missing

Customer certificates by U.S. state

Louisiana

FIGURE 31A    *SAMPLE SCREEN FOR USE CASE*

_SAMPLE SCREEN_
_FOR USE CASE_

DOMAIN-RULE-BASED VALIDATION AND USE OF TRUSTED DOCUMENTS BY ONLINE SOFTWARE PLATFORM (OSP)

CROSS REFERENCE TO RELATED PATENT APPLICATIONS

This patent application claims priority from U.S. provisional patent application Ser. No. 63/342,753, filed on May 17, 2022.

BACKGROUND

Online software platforms perform computations and make determinations for clients. Yet some of these computations and determinations can be impeded when they depend on the existence of proper documents, especially when these need to be validated by human operators.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

BRIEF SUMMARY

The present description gives instances of computer systems, storage media that may store programs, and methods for receiving these documents and validating them, sometimes automatically, and then using them to process subsequently received data. This increases accuracy and reduces the processing time of waiting for a human, and therefore enables tasks to be performed with less latency and/or preserving more conserved resources for use in performing other tasks or additional instances of the same task.

In embodiments, an Online Software Platform (OSP) is configured to receive an upload trusted document, input text segments of it, identify from the trusted document a set of requirements for the trusted document, confirm that the requirements are met, and therefore cause to be created a trusted document record that can be used to process a dataset that is received via a network later. The dataset has dataset values that can be used to select a subset of stored digital resource rules. The subset includes a main rule and an override rule, and it can be determined from the trusted document record whether the override rule applies or not. If so, a resource having a value of zero is reported. Else, a resource having a non-zero value is produced by applying the main rule to at least one of the dataset values, and is reported.

An advantage can be that the OSP will discover deficiencies in the uploaded trusted documents and inform a user quickly for fixing them, while not distracting the user much with uploaded trusted documents that were compliant upon being uploaded. In addition, the human operator need no longer know the requirements for a trusted document to be valid, which is even more important considering that different documents must satisfy different sets of requirements. As such, it will be appreciated that results of embodiments are larger than the sum of their individual parts, and have utility.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 3 is a diagram of a sample trusted document that could be the trusted document of FIG. 1, and its generation from an original document of a user, according to embodiments.

FIG. 4 is a diagram showing how text segments may be extracted from versions of writings of a sample trusted document, which could be the trusted document of FIG. 1, according to embodiments.

FIG. 16 is a flowchart for illustrating sample methods according to embodiments.

FIG. 28A is a view of a sample document in a use case of embodiments.

FIG. 28B shows part of a process of identifying the document of FIG. 28A, if uploaded in a use case of embodiments.

FIG. 29A is a view of the front and back sides of another sample document in a use case of embodiments.

FIG. 29B shows part of a process of reading the document of FIG. 29A, if uploaded in a use case of embodiments.

FIG. 30B shows part of a process of reading the document of FIG. 30A, if uploaded in a use case of embodiments.

FIG. 30B shows a confidently extracted, recognized and/or characterized text segments of the document of FIG. 30A, if uploaded in a use case of embodiments.

FIG. 31A is a sample view of a User Interface (UI) in a use case of an embodiment for managing exemption certificates.

DETAILED DESCRIPTION

As has been mentioned, the present description is about computer systems, storage media that may store programs, and methods. Embodiments are now described in more detail.

Figure 1:
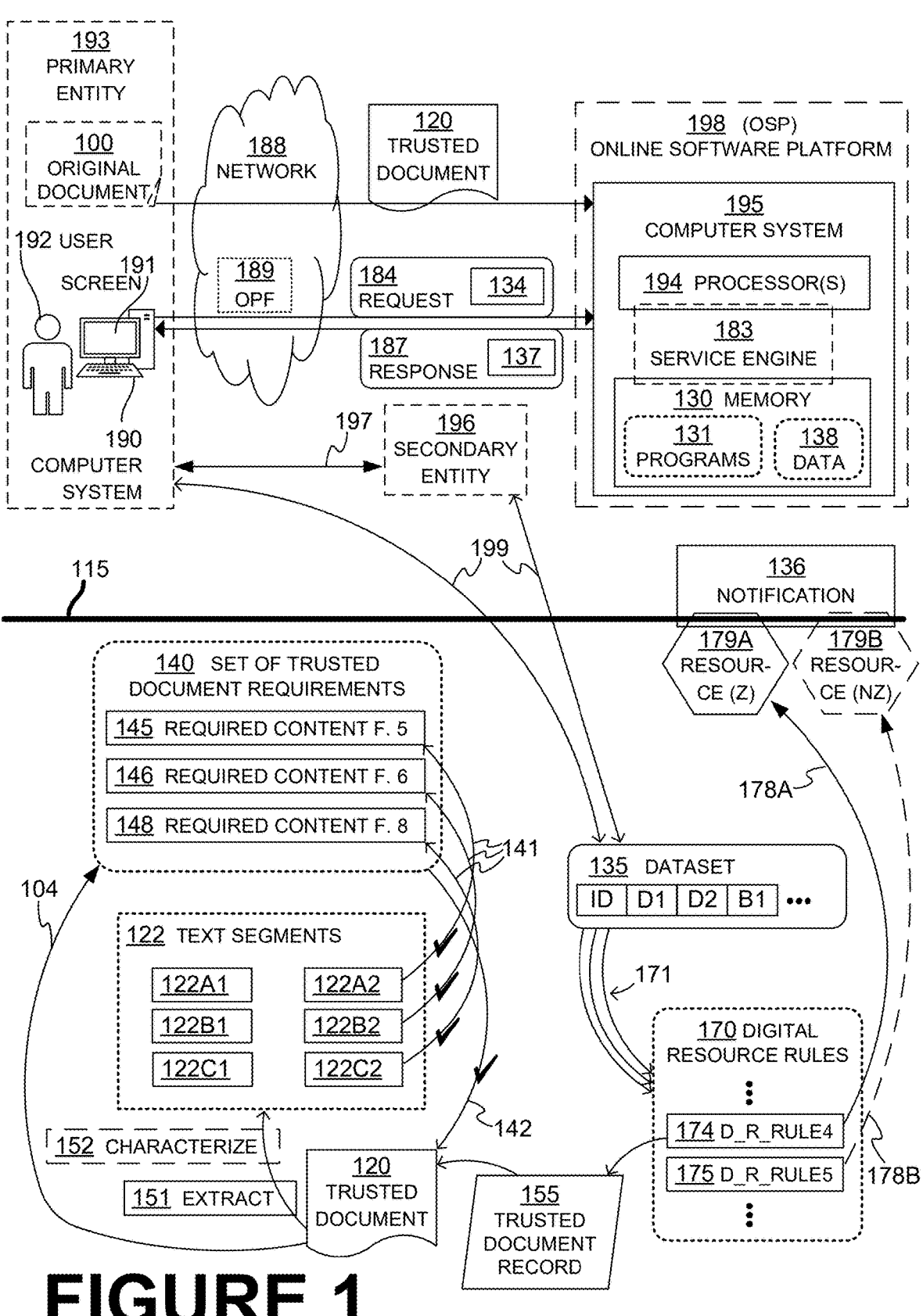
FIG. 1 is a diagram showing sample aspects of embodiments.

FIG. 1 is a diagram showing sample aspects of embodiments. A thick horizontal line 115 separates this diagram, although not completely or rigorously, into a top portion and a bottom portion. Above the line 115 are shown elements with emphasis mostly on entities, components, their relationships, and their interactions, while below the line 115 are shown elements with emphasis mostly on processing of data that takes place often within one or more of the components that are above the line 115.

Above the line 115, a sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183.

The computer system 195 can be located in "the cloud." In fact, the computer system 195 may optionally be implemented as part of an Online Software Platform (OSP) 198. The OSP 198 can be configured to perform one or more predefined services, for example via operations of the service engine 183. Such services can be searches, determinations, computations, verifications, notifications, the transmission of specialized information, including data that effectuates payments, the generation and transmission of documents, the online accessing of other systems to effect registrations, and so on, including what is described in this document. Such services can be provided in the form of Software as a Service (Saas). As such, the OSP 198 can be an online service provider.

A user 192 may be standalone. The user 192 may use a computer system 190 that has a screen 191, on which User Interfaces (UIs) may be shown. In embodiments, the user 192 and the computer system 190 are considered part of a primary entity 193. In such instances, the user 192 can be an agent of the primary entity 193, and even within a physical site of the entity 193, although that is not necessary. In embodiments, the computer system 190 or other device of the user 192 can be client devices for the computer system 195. The user 192 or the primary entity 193 can be clients for the OSP 198. For instance, the user 192 may log into the computer system 195 by using credentials, such as a user name, a password, a token, and so on.

The computer system 190 may access the computer system 195 via a communications network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media, including those used by various different physical and logical channels of communication, now known or later developed. Non-limiting media and communication channel examples include one or more, or any operable combination of: fiber optic systems, satellite systems, cable systems, microwave systems, Asynchronous Transfer Mode ("ATM") systems, frame relay systems, Digital Subscriber Line ("DSL") systems, Radio Frequency ("RF") systems, telephone systems, cellular systems, other wireless systems, and the Internet. In various embodiments the communication network 188 can be or include any type of network, such as a Local Area Network (LAN), a Metropolitan Area Network (MAN), a Wide Area Network (WAN), or the internet. Accordingly, from certain perspectives, the OSP 198 is in the cloud, and is therefore depicted in FIG. 1 within the communication network 188.

Accessing, downloading and/or uploading, and so on may be permitted among these computer systems. Such can be performed, for instance, with manually uploading files, like spreadsheet files, etc. Such can also be performed automatically as shown in the example of FIG. 1, with systems exchanging requests and responses.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In embodiments, a trusted document 120 is received by an upload to the computer system 195. Unusually, the trusted document 120 is shown in two places in FIG. 1, both above the line 115 to show its being uploaded to the computer system 195, and also below the line 115 to show its internal use by the computer system 195. The uploading may be performed, for instance via the network 188 by the primary entity 193. The trusted document 120 is a computer file that may have been generated or created by the user 192 from an original document 100 that may have been given to the user 192.

The trusted document 120 may store versions of writings. A content of at least one of the writings may be associated with the primary entity 193 and/or the secondary entity 196. In fact, one of these entities may have prepared one or more aspects of the trusted document 120 before the uploading.

In embodiments, text segments that have been extracted from the versions of the writings of the trusted document 120 may be inputted by the computer system 195. In the example of FIG. 1, this is indicated by an extract operation 151 shown below the line 115, which provides sample text segments 122.

According to an optional characterization operation, these text segments are also characterized. In the example of FIG. 1, this is indicated by an optional characterize operation 152. In addition, the sample text segments 122, while not required, are shown characterized in pairs, namely text segments 122A1, 122A2, 122B1, 122B2, 122C1, 122C2.

In embodiments, a set of requirements 140 for the trusted document 120 is identified from the trusted document 120, as indicated by an arrow 104. In embodiments, the set 140 of requirements can be so identified from among a plurality of such sets of trusted document requirements, which can be stored so that they are accessible to the computer system 195. In the example of FIG. 1, however, only the identified set 140 is shown.

The requirements of the identified set may include that the received trusted document must include certain required values. In embodiments, it is confirmed by the computer system that at least some of the extracted text segments are indeed the certain required values, which would therefore satisfy the set of requirements. For instance, in the example of FIG. 1, it is confirmed that at least some of the extracted text segments 122A2, 122B2, 122C2 are indeed the certain required values, according to arrows 141 that begin from the respective text segments, and also show checkmarks.

In some embodiments, the identified set defines certain content fields, and the requirements include that the certain required values satisfy the certain content fields. Indeed, in the example of FIG. 1, the identified set 140 defines a Required Content Field 5 145, a Required Content Field 6 146, and a Required Content Field 8 148. In addition, the requirements include that the text segments 122A2, 122B2, 122C2 have certain required values that satisfy these certain content fields, as indicated by the endings of the arrows 141.

In embodiments, once it is confirmed that the set of requirements is met, the trusted document 120 can be treated as valid, and reliable for subsequent operations. This treatment is depicted in FIG. 1 by an arrow 142, which also has a checkmark.

In embodiments, a trusted document record is caused to be created by the computer system. The trusted document record can be created responsive to the above-mentioned confirming about the text segments indeed including certain required values. The trusted document record can be about the trusted document, and be created from at least some of the actual values that satisfy the certain required content fields. In the example of FIG. 1, a trusted document record 155 is shown that refers to the trusted document 120. In some of these embodiments, the trusted document record indicates that the trusted document has been stored in a memory that is convenient for retrieval if necessary. For instance, it may be stored by the OSP 198 in association with the primary entity, meaning together with and findable from data and/or other records of the primary entity.

In some instances, the user 192 and/or the primary entity 193 have instances of relationships with secondary entities. Only one such secondary entity 196 is shown. In this example, the primary entity 193 has a relationship instance 197 with the secondary entity 196.

In some instances, the user 192 and/or the primary entity 193 obtain data about one or more secondary entities, for example as necessary for conducting the relationship instances with them. The primary entity 193 and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, a specific domain that the entity belongs in a context of multiple domains that are defined in terms of the above, and so on.

In embodiments, the computer system 195 receives one or more datasets. A sample received dataset 135 is shown below the line 115. The dataset 135 may be received by the computer system 195 in a number of ways. In some embodiments, one or more requests may be received by the computer system 195 via a network. In this example, a request 184 is received by the computer system 195 via the network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control.

The dataset 135 has values that can also be called dataset values. The dataset values can be numerical, alphanumeric, Boolean, and so on, as needed for what the values characterize. For example, an identity value ID may indicate an identity of the dataset 135, so as to differentiate it from other such datasets. At least one of the dataset values may characterize an attribute of a certain one of the entities 193 and 196, as indicated by correspondence arrows 199. For instance, a value D1 may be the name of the certain entity, a value D2 may be for relevant data of the entity, and so on. Plus, an optional value B1 may be a numerical base value. The database value B1 can be for an aspect of the dataset, and so on. The aspect of the dataset may be the aspect of a value that characterizes the attribute, an aspect of the reason that the dataset was created in the first place, and so on. The dataset 135 may further have additional dataset values, as indicated by the horizontal dot-dot-dot in the right side of the dataset 135. (Each time, the dot-dot-dot suggests possibly more of what it follows.) In some embodiments, the dataset 135 has values that characterize attributes of both the primary entity 193 and the secondary entity 196, but that is not required.

In embodiments digital resource rules 170 are provided for use by the OSP 198. These rules 170 may sometimes be considered to be a set of rules. In the example of this diagram, only two sample digital resource rules are shown explicitly, namely rules D_R_RULE4 174 and D_R_RULE5 175. All other such rules are indicated by the vertical dot-dot-dots. These rules 170 are digital in that they are implemented for use by software. For example, these rules 170 may be implemented within programs 131 and data 138. The data portion of these rules 170 may alternately be stored in memories, local or in other places that can be accessed by the computer system 195. The storing can be in the form of a spreadsheet, a database, etc.

In embodiments, the computer system 195 may access the stored digital resource rules 170. This accessing may be performed responsive to the computer system 195 receiving a dataset, such as the dataset 135.

Then the computer system 195 may select a certain one of the accessed digital resource rules 170. In this example, either the rule D_R_RULE4 174, or the rule D_R_RULE5 175 is thus selected as the certain digital resource rule. The selection of these particular rules indicated also by the fact that the arrows 178A, 178B begin from these rules, respectively.

The computer system 195 may thus select the rule D_R_RULE4 174, or the rule D_R_RULE5 175, as the certain rule, responsive to one or more of the dataset values of the dataset 135. The impact of the dataset 135 in the selection is indicated by at least some of the arrows 171.

Then the computer system 195 may produce a resource for the dataset 135. The computer system 195 may thus produce the resource by applying the certain digital resource rule, which was previously selected, to at least one of the dataset values of the dataset 135.

In the example of FIG. 1, if the rule D_R_RULE4 174 is selected as the certain rule, then the resource 179A can be produced, as indicated by the arrow 178A. The resource 179A is shown with the additional designation "(Z)" to indicate that it can be associated with a zero value. Or, if the rule D_R_RULE5 175 is selected as the certain rule, then the resource 179B can be produced, as indicated by the arrow 178B. The resource 179B is shown with the additional designation "(NZ)" to indicate that it can be associated with a non-zero value. The impact of the dataset 135 in producing either the resource 179A or the resource 179B is indicated by at least one of the arrows 171. In some embodiments, only one of these two resources is produced for the dataset 135; in this example, this is suggested by making the resource 179A appear more prominent by showing the resource 179B in dashed lines.

The produced resource can be a document, a determination, a computational result, etc., made, created or prepared for the user 192, and/or the primary entity 193, and/or the secondary entity 196, etc. As such, in some embodiments, the resource is produced by processing and/or a computation. In some embodiments, therefore, the resource is produced on the basis of a characterized attribute of the primary entity 193 and/or the secondary entity 196.

The resource may be produced in a number of ways. For instance, at least one of the dataset values of the dataset 135 can be a numerical base value, e.g. B1, as mentioned above. In such cases, applying the certain digital resource rule may include performing a mathematical operation on the base value B1. For example, applying the certain digital resource rule may include multiplying the numerical base value B1 with a number indicated by the certain digital resource rule. Such a number can be, for example, a percentage, e.g., 1.5%, 3%, 5%, and so on. Such a number can be indicated directly by the certain rule, or be stored in a place indicated by the certain rule, or by the dataset 135, and so on.

In embodiments, a notification can be caused to be transmitted, e.g. via the network 188, by the computer system 195. In the example of FIG. 1, a notification 136 can be caused to be transmitted by the computer system 195, for example as an answer or other response to the received dataset 135.

The notification can be about an aspect of the resource that was produced, and possibly not about the whole resource. Or, the notification can be about the whole resource. That is why the resources 179A, 179B are not depicted in FIG. 1 as being entirely with the notification 136. In particular, the notification 136 may inform about the aspect of the resource 179A or 179B, namely that it has been determined, or where it can be found, or what it is, or a portion of its content, or a value of it, or a statistic of the value, or a rounded version of the value, and so on. Of course, the planning should be such that the recipient of the notification 136 understands what is being provided.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179A or 179B, it can be advantageous to embed in the payload 137 the identity value (ID) and/or one or more values of the dataset 135. This will help the recipient correlate the response 187 to the request 184, and therefore match the received aspect of the resource 179A or 179B as the answer or other response to the appropriate dataset.

As seen above, the computer system 190, the computer system 195, and possibly also the OPF 189 may exchange requests and responses. Such can be implemented with a number of different architectures. Two examples are now described with reference to the computer systems 190 and 195 only.

In one such architecture, a device remote to the service engine 183, such as the computer system 190, may have a certain application (not shown) and a connector (not shown) that is a plugin that sits on top of that certain application. The connector may be able to fetch from the remote device the details required for the service desired from the OSP 198, form an object or payload (e.g. 134), and then send or push a request (e.g. 184) that carries the payload to the service engine 183 via a service call. The service engine 183 may receive the request with its payload. The service engine 183 may then access the digital resource rules 170, find the appropriate one(s) of them, and apply it or them to the payload to produce the requested resource 179A or 179B. The service engine 183 may then form a payload (e.g. 137) that includes an aspect of the resource 179A or 179B, and then push, send, or otherwise cause to be transmitted a response (e.g. 187) that carries the payload it formed to the connector. The connector receives the response, reads its payload, and forwards that payload to the certain application.

An alternative such architecture uses Representational State Transfer (REST) Application Programming Interfaces (APIs). REST or RESTful API design is designed to take advantage of existing protocols. While REST can be used over nearly any protocol, it usually takes advantage of Hyper Text Transfer Protocol (HTTP) when used for Web APIs. In such an alternative architecture, a device remote to the service engine 183, such as the computer system 190, may have a particular application (not shown). In addition, the computer system 195 implements a REST API (not shown). This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in the background to the service engine 183. Again, the service engine 183 determines the requested resource 179A or 179B, and sends an aspect of it back to the REST API. In turn, the REST API sends the response 187 that has the payload 137 to the particular application.

Referring again to the digital resource rules 170, digital rules in embodiments can be expressed in the form of a logical "if-then" statement, such as: "if P then Q". In such statements, the "if" part, represented by the "P", is called the condition, and the "then" part, represented by the "Q", is called the consequent. In a set of digital rules, the condition or the consequent may be repeated. For instance, the condition can be the same for multiple different rules. And the consequent can be the same for multiple different rules.

Searching for a rule that applies can be performed by searching for whether or not the rule's one or more conditions are met. The computer system may recognize that such a condition is met. For instance, the certain condition could define a boundary of a region that is within a space. The region could be geometric, and be within a larger space. The region could be geographic, within the space of a city, a state, a country, a continent or the earth. The boundary of the region could be defined in terms of numbers according to a coordinate system within the space. In the example of geography, the boundary could be defined in terms of groups of longitude and latitude coordinates. For instance, the attribute could be a location of the entity, and the one or more values of the dataset 135 that characterize the location could be one or more numbers or an address, or longitude and latitude. A condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The search can be iterative through all the digital rules of a set of rules or of a subset of rules. Sometimes once the condition of one rule is met, its consequent is applied, and the search effectively stops. Other times, all eligible rules are searched, and those whose conditions are met are marked for later consideration and application, for instance by proper implementation of the consequent.

As mentioned above, the digital resource rules 170 include the rules D_R_RULE4 174 and D_R_RULE5 175, one of which is eventually selected and applied. In some embodiments, the rules 170 are implemented by simple rules. A simple rule has a single condition ("P"), and a single consequent ("Q"). As a result of an initial search, then, the digital resource rule D_R_RULE4 174 or D_R_RULE5 175 is selected, and then its consequent is applied to produce the respective resource.

In some embodiments, the rules 170 further include additional digital resource rules that select that digital resource rule D_R_RULE4 174 in the first place, for ultimately applying it. In such embodiments, the rules 170 can be implemented as simple rules or as complex rules. Complex rules may have more than conditions, and/or more than one consequents. Complex rules may be implemented as individual single rules with complex coding. Alternatively, a complex rule may be implemented in part by more than one simpler individual rules, which can have hierarchical relationships among them, e.g. from one rule's application or execution leading to another, and so on. As a result of the initial search, then, rules are found which, when applied, select that certain rule in the first place.

Figure 2:
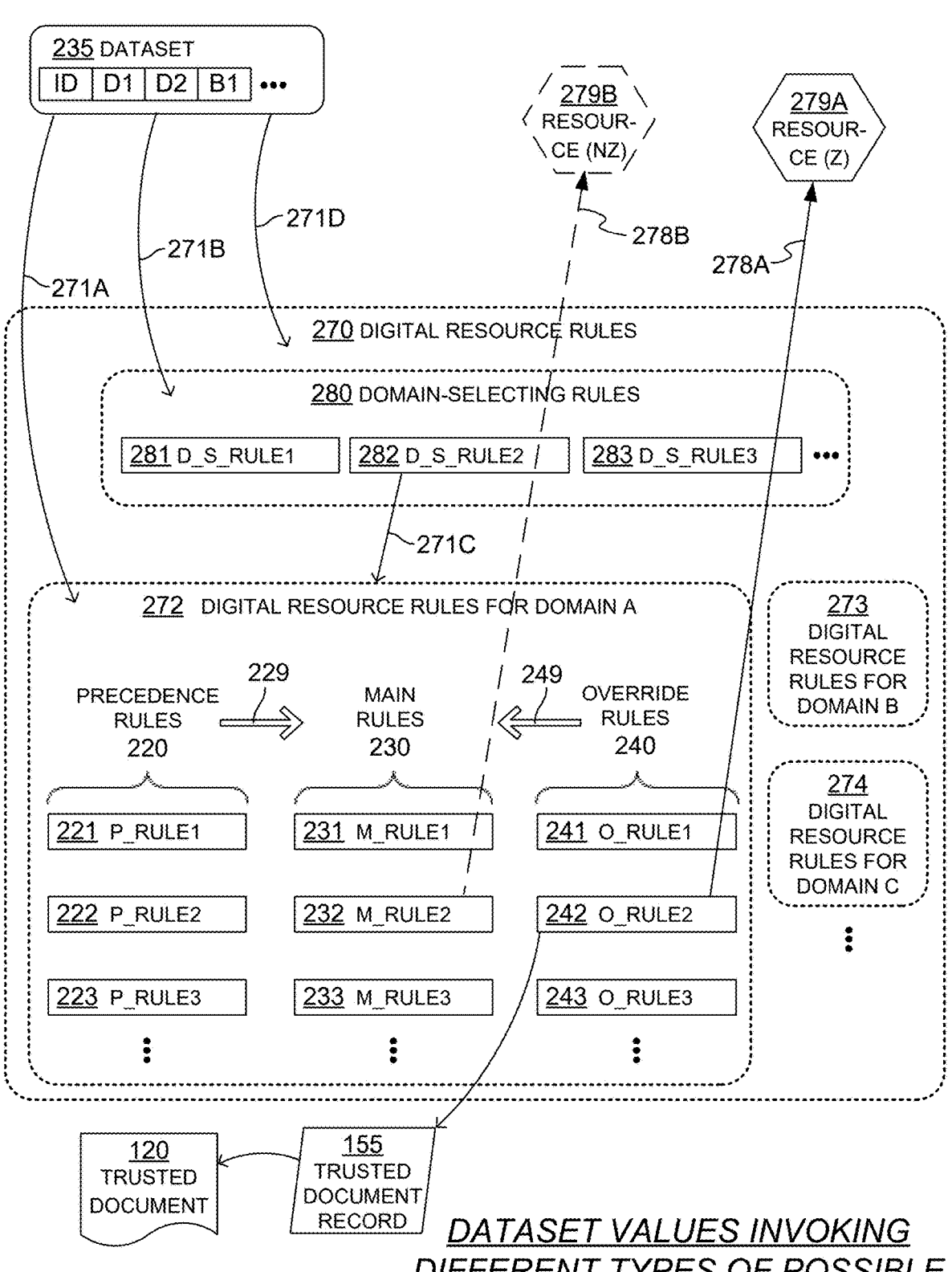
FIG. 2 is a diagram showing details and aspects of different types of possible embodiments of the digital resource rules of FIG. 1.

Referring now to FIG. 2, a dataset 235 can be as described for the dataset 135 of FIG. 1. In addition, a set 270 of digital resource rules is an example of digital resource rules, such as the digital resource rules 170 of FIG. 1.

Similarly with FIG. 1, in FIG. 2 a resource 279A can be produced according to an arrow 278A, or a resource 279B can be produced according to an arrow 278B. The resources 279A, 279B can be as the resources 179A, 179B, at least an aspect of which can be reported by the notification 136 in embodiments.

The set 270 includes different subsets of rules, into which the individual rules belong. One of these individual rules is eventually selected and applied, while one or more of them may have been used for selecting it. In addition, there are hierarchical relationships among rules of different subsets, and/or of types. Implementation can be performed by using multiple simple rules from the different sets and/or subsets, or fewer complex digital rules that fuse together some or all of these simple rules.

In the example of FIG. 2, the set 270 includes a subset of domain-selecting rules 280. The set 270 also includes subsets 272, 273, 274, . . . , each for digital resource rules for domains A, B, C, . . . respectively. A domain for which a subset of resource rules is thus provided could be associated with the primary entity 193 of FIG. 1, another domain could be associated with the secondary entity 196, and so on.

In many embodiments, one of the domain-selecting rules of the subset 280 can be used to select which domain's rules should be applied. Then the certain one of the digital resource rule(s) can be selected from the digital resource rules of the selected domain. Then the resources 279A, 279B can be produced by applying the selected certain digital resource rule(s) to at least one of the dataset values of the dataset 235.

In this example, the subset of domain-selecting rules 280 includes rules D_S_RULE1 281, D_S_RULE2 282, D_S_RULE3 283, . . . . One of these rules may be selected and used when more than one domain could be considered as eligible for its rules to apply. The rules of the subset 280, however, might not be necessary for embodiments where a single domain is considered or implied for one or more, or all of, the relationship instances. This can happen, for example, when it is known in advance that the primary entity 193 and every possible secondary entity are both associated with the same domain. Or, when it is planned that digital resource rules of only one domain will be considered, while any rules of any other domain will not be considered and will be disregarded.

Resource rules for individual domains are now described. Such rules need not be the same for each domain, or of the same type for each domain. The sample subset 272 of resource rules for domain A is now described in more detail. Its description could be similar for subsets for other domains, such as the subsets 273, 274, . . . .

The subset 272 of resource rules includes different types of rules. In this example, the subset 272 includes precedence rules 220, main rules 230, and override rules 240. In this example, the precedence rules 220 include rules P_RULE1 221, P_RULE2 222, P_RULE3 223, . . . . The main rules 230 include rules M_RULE1 231, M_RULE2 232, M_RULE3 233, . . . . The override rules 240 include rules O_RULE1 241, O_RULE2 242, O_RULE3 243, . . . .

In embodiments, the different types of rules within the selected subset further have different hierarchies among them. For a first instance, one of the precedence rules 220 may indicate which one of the main rules 230 is to be selected, as generally indicated by an arrow 229. Or, the one of the precedence rules 220 that does apply may itself be the eventually selected certain digital resource rule, instead of indicating any one of the main rules 230.

For a second instance, even when one of the main rules 230 is thus indicated, one of the override rules 240 may still override the indication, as generally indicated by an arrow 249. In such cases, the one of the rules 240 that overrides may be the eventually selected certain digital resource rule, instead of one of the main rules 230. Or, one of the rules 240 overrides by indicating yet a different one of the main rules 230 to be selected instead, and so on.

In FIG. 2, sample arrows 271A, 271B and 271D begin from the dataset 235. These arrows suggest possible paths of the eventual selection of the certain rule, for producing the resource 279A or 279B. These arrows are more detailed versions of the arrows 171 of FIG. 1. They are examples of possible arrows, and not all of them are necessarily used in every such determination.

According to the arrow 271A, the subset 272 is indicated. So, at least one of the rules of the subset 272 may initially be indicated as the certain rule, e.g. from one or more values of the dataset 235. The initially indicated rule can be the finally certain rule, or another intermediate rule which, in turn, will be used to select that certain rule.

According to the arrow 271B, at least one of the domain-selecting rules of the subset 280 may be invoked, from one or more values of the dataset 235.

According to an arrow 271C, the one of the rules of subset 280 that was invoked by the arrow 271B was the rule D_S_RULE2 282. And, the arrow 271C further indicates that the invoked rule points to the subset 272, instead of to the subsets 273, 274, . . . . As such, the subset 272 of resource rules should be used for selecting the certain rule. This example has the same result, but from a different path, as the sample arrow 271A.

The arrow 271D is drawn to indicate that one or more of the values of the dataset 235 are received and processed by the finally selected certain rule, for ultimately producing the resource 279A or 279B.

In embodiments, upon beginning to apply the digital resource rules 270 to the values of the dataset 235, a subset of the digital resource rules 270 is selected. In this example, the subset 272 is selected. As mentioned above, the subset 272 has many rules. For the example of this selection, the rules of the subset 272 include the main rule M_RULE2 232 and the override rule O_RULE2 242, which appear in a single row. These may have been indicated by further application of the digital resource rules 270 to the values of the dataset 235, which narrows down from the initial selection of the subset 272. It will be recognized that the override rule O_RULE2 242 and the main rule M RULE2 232 of FIG. 2 correspond respectively to the digital resource rules D_R_RULE4 174 and D_R_RULE5 175.

Still referring to FIG. 2, in embodiments it is determined whether the override rule of the selected subset applies or not. This determination may be made from the trusted document record 155, for instance, whether it is provided, whether it is properly invoked by the dataset values of the dataset 135 or 235, whether it has expired or not and so on. In FIG. 2 this dependence on the trusted document record is shown by an arrow from the override rule O_RULE2 242 to the trusted document record 155, and with another arrow from the trusted document record 155 to the trusted document 120. In FIG. 1 this dependence on the trusted document record is also shown by an arrow from the digital resource rule D_R_RULE4 174 to the trusted document record 155, and with another arrow from the trusted document record 155 to the trusted document 120.

In embodiments, responsive to determining that the override rule applies, a resource 279A, 179A is produced that has a value of zero (Z). This is indicated by the arrows 278A, 178A, and is consistent with applying the override rule. Applying the override rule may be accomplished digitally in a number of ways. For instance, a default value of the resource can be set to zero, explicitly or implicitly. Responsive to determining that the override rule applies, that zero value can be permitted to remain until it is exported by the notification 136. For another instance, the zero value may be attained by a multiplication by zero.

In embodiments, responsive to determining that the override rule does not apply, a resource 279B, 179B is produced that has a non-zero (NZ) value, this resource being produced by applying the main rule to at least one of the dataset values. For instance, and as mentioned above, the at least one of the dataset values can be a numerical base value, and applying the main rule may include multiplying the numerical base value with a number indicated by the main rule.

FIG. 3 is a diagram that shows a sample original document 300, which can be as the original document 100. The original document 300 may be either a physical paper document, or a computer document such as a computer file, an image file, a pdf, a form-fillable pdf, and so on. The original document may have been signed by a person, either physically by a writing implement such as a pen, or electronically by typing or moving a mouse.

In this example, the original document 300 includes writings 300A1, 300A2, 300B1, 300B2, 300C1, 300C2, . . . . The content of these writings in this diagram is depicted as random alphanumeric strings. A content of at least one of these writings may be associated with the primary entity 193.

FIG. 3 also shows a sample trusted document 320, which could be the trusted document 120 that is uploaded in FIG. 1. The trusted document 320 is a computer file, which may have been generated from the original document 300 according to an arrow 350. Depending on what the original document 300 and the trusted document 320 are, the generation may have been performed by the user 192. For instance, the trusted document 320 may be an image file in various formats, such as a scan of a document that could be a pdf file, a form-fillable pdf file that was scanned or not, or photographs of documents and so on.

In this example, the trusted document 320 stores versions of writings 320A1, 320A2, 320B1, 320B2, 320C1, 320C2, . . . . In this example, the depicted versions of writings all start with the letter V, to suggest "version of", and are followed by the actual corresponding writings of the original document 300. This is to remind the reader of this document that the generation of the versions of the writings may be perfect, or not. For instance, form-fillable pdfs that are uploaded without manual scanning often render, upon uploading, reliably what was entered in the form by the user. On the other hand, paper documents that are manually scanned may result in the electronic trusted document to have versions of the original writings from which it may not be easy or even possible to extract the original writings.

Returning to FIG. 1, as mentioned above, the text segments 122 of FIG. 1 can be extracted from the versions of the writings of the trusted document 120 prior to being inputted by the computer system 195. In particular, as indicated by the extract operation 151, in some embodiments the operations of the computer system 195 further include, prior to the inputting of the text segments, extracting at least some of the text segments 122 from the versions of the writings of the trusted document 120. The extracted segments may then be input, so that they are ready for a subsequent operation. An example is now described.

FIG. 4 repeats the trusted document 320 of FIG. 3. In addition, according to an extract operation 451, extracted text segments 422 are provided, which can be as the extracted text segments 122 of FIG. 1. In particular, the extracted text segments 422 include text segments 422A1, 422A2, 422B1, 422B2, 422C1, 422C2, . . . . In some embodiments, the extracting 451 is performed by applying an Optical Character Recognition (OCR) process to the trusted document 320. In this example the extraction was correct for all the text segments, but such is not always the case.

In this example, the depicted versions of the text segments are provided by removing the letter V from the versions of the writings. In this example, as is ideal, the extracted text segments 422A1, 422A2, 422B1, 422B2, 422C1, 422C2, . . . are identical to the writings 300A1, 300A2, 300B1, 300B2, 300C1, 300C2, . . . of the original document 300 of FIG. 3. This is not always the case, however, especially when the trusted document 120, 320 has been created by manually scanning or capturing an image of the original document 100, 300.

In some embodiments, the operations of the computer system 195 further include inputting a language input of the trusted document, which corresponds to a human language. In such embodiments, the text segments are extracted in the language indicated by the language input. For instance, a default setting may be a language input indicating that the language of the trusted document is English, for the entire system or for documents of a specific client. As such, the extract operation 151 will be attempted in English. The user 192 may facilitate this by providing the language input, for instance if they are given feedback that there are problems in the extraction. Or, a language can be detected from some characters of the trusted document, and the appropriate language can be applied.

Returning to FIG. 1, as mentioned above, the set 140 of trusted document requirements includes required content fields. In some embodiments, the text segments 122 of FIG. 1 can be further characterized along similar lines, for instance, as indicated by the characterize operation 152. Examples are now described.

In some embodiments, the operations of the computer system 195 further include characterizing at least some of the text segments as actual values. In such embodiments, the requirement is satisfied by at least some of the actual values being the certain required values. In the example of FIG. 1, the text segments 122A2, 122B2, 122C2 are also examples of text segments that have been characterized as actual values.

Moreover, at least some of the text segments of the trusted document may further be optionally characterized as actual content fields. In the example of FIG. 1, the text segments 122A1, 122B1, 122C1 are also examples of text segments that have been characterized as actual content fields.

In such cases the text segments that are characterized as the actual values can be so characterized with reference to the text segments that are characterized as the actual content fields.

In the example of FIG. 1, the text segments 122A2, 122B2, 122C2 have been characterized as actual values with reference to the text segments 122A1, 122B1, 122C1 that are actual content fields. Indeed, they appear in a sequence, first the actual content field and the its actual value. Another example is now described.

Figure 5:
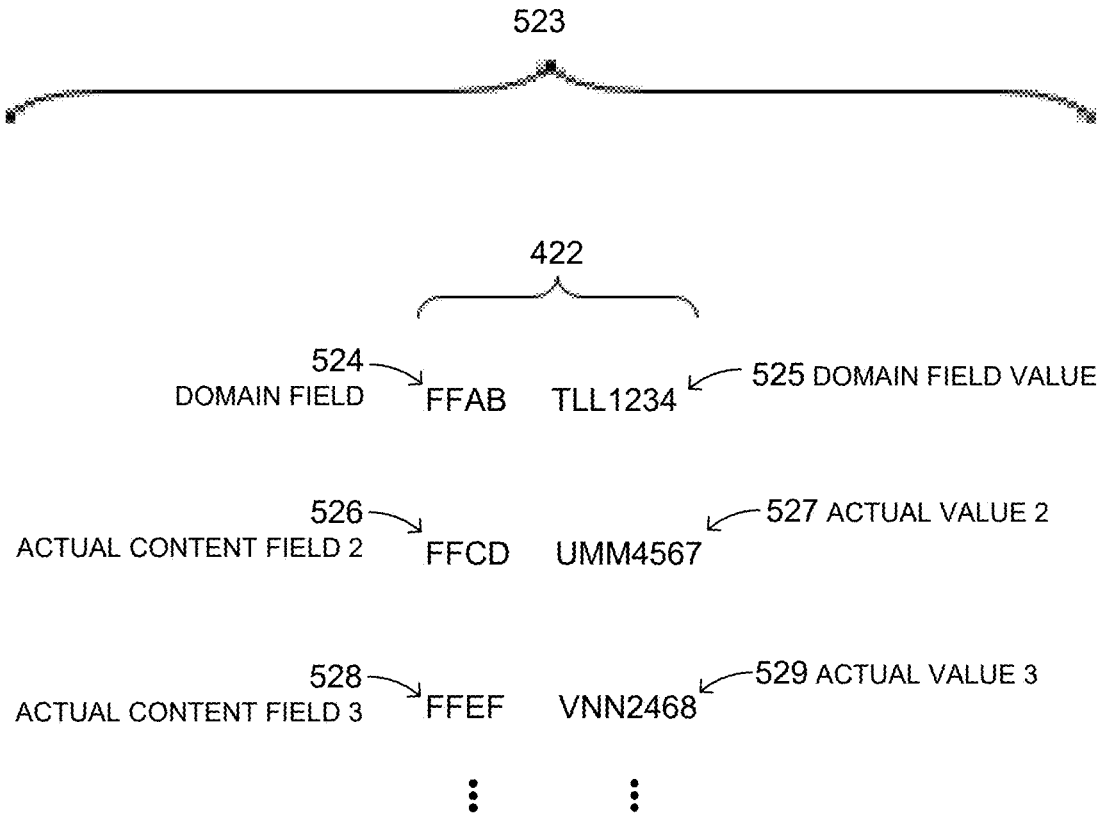
FIG. 5 is a diagram showing how text segments may be characterized according to embodiments.

FIG. 5 is a diagram showing how text segments may be characterized according to embodiments. FIG. 5 repeats the extracted text segments 422 of FIG. 4. In addition, it characterizes them, which facilitates in the confirmation operation described above. For instance, the text segments 525, 527, 529 in the right column are characterized respectively as the actual values of: Domain Field Value, Actual Value 2, Actual Value 3. And, the corresponding text segments 524, 526, 528 in the left column are characterized respectively as the actual content fields of: Domain Field, Actual Content Field 2, Actual Content Field 3. All these characterized text segments are shown together as 523.

The required certain fields of the identified set of requirements can be intended for any purpose. In embodiments, they are intended for reference, when producing resources for relationship instances, such as was described with reference to FIG. 1.

In some embodiments, one of the text segments, which is confirmed to be indeed one of the certain required values, is a document type. This means that the text segment announces the type of the trusted document, which can be one of many possible types. In embodiments, upon the characterization taking place, it can also be determined whether the trusted document is, for instance, wholly inapplicable. The user may be notified with appropriate error messages via a UI, and so on.

Figure 6:
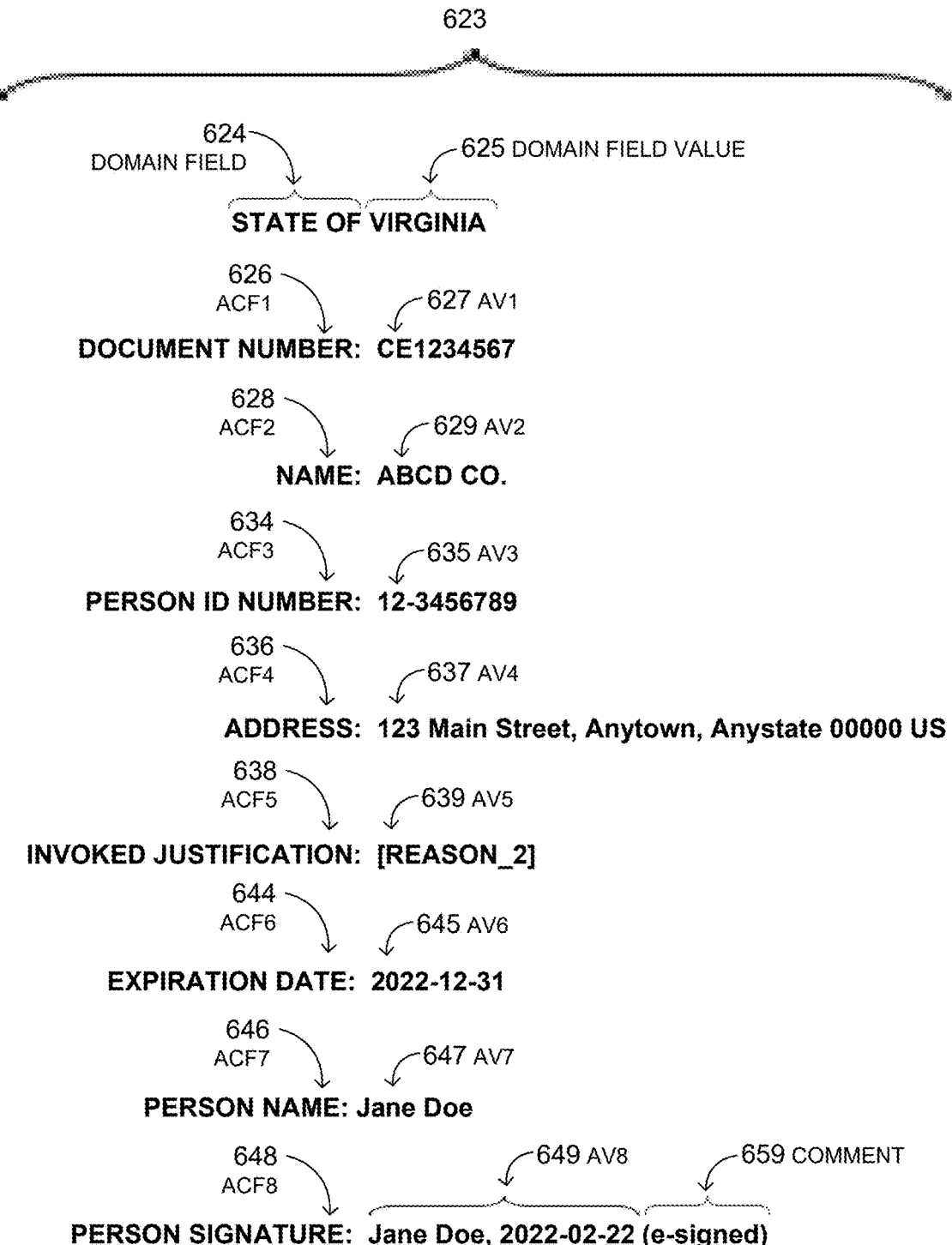
FIG. 6 shows sample text segments have been characterized according to embodiments.

FIG. 6 shows examples of where text segments 623 are confirmed to be indeed among the respective certain required values. In these examples, the text segments 623 have been further characterized as Actual Content Fields (ACFs) and corresponding Actual Values (AVs).

In some embodiments, one of the text segments, which is confirmed to be indeed one of the certain required values, is a domain of the primary entity. The domain can be a name, or an identity number of a domain, and so on. The domain can be a specific domain in which the primary entity 193 belongs, in a context of multiple possible domains. In the example of FIG. 6, a text segment 624 ("STATE OF") is a domain field, and a text segment 625 ("VIRGINIA") is a domain field value. Note that the individual text segments 624 and 625 are considered separately for these purposes, even though the person who originally designed the appearance of the relevant trusted document may have thought of them as a single phrase!

In all the remaining examples of FIG. 6, the definition of the text segments is easier, because there is a colon between them. It should be recognized that the colon is itself text—even though not itself an alphanumeric character—and thus could be part of a text segment. This, however, may add little value. Still, such a colon can serve as a useful demarcation for deciding where one text segment ends and the next one begins, without the colon necessarily belonging in either one of the text segments.

In some embodiments, one of the text segments, which is confirmed to be indeed one of the certain required values, is a document number of the trusted document. In the example of FIG. 6, a text segment is an ACF1 626 ("DOCUMENT NUMBER"). After it is another text segment that is an AV1 627 ("CE1234567"), which is a sample document number.

In some embodiments, one of the text segments, which is confirmed to be indeed one of the certain required values, is a name of the primary entity. In the example of FIG. 6, a text segment is an ACF2 628 ("NAME"). After it is another text segment that is an AV2 629 ("ABCD CO."), which is a sample name.

In the example of FIG. 6, a text segment is an ACF3 634 ("PERSON ID NUMBER"). After it is another text segment that is an AV3 635 ("12-3456789").

In some embodiments, one of the text segments, which is confirmed to be indeed one of the certain required values, is an address of the primary entity. In the example of FIG. 6, a text segment is an ACF4 634 ("ADDRESS"). After it is another text segment that is an AV4 635 ("123 Main Street, Anytown, Anystate 00000 US"), which is a sample address.

In some embodiments, one of the text segments, which is confirmed to be indeed one of the certain required values, is an invoked justification for the trusted document. In the example of FIG. 6, a text segment is an ACF5 638 ("INVOKED JUSTIFICATION"). After it is another text segment that is an AV5 639 ("[REASON_2]"). Here the full text of a reason could be given, or an item in a numbered list could be indicated, and so on.

In some embodiments, one of the text segments, which is confirmed to be indeed one of the certain required values, is an expiration date of the trusted document. In the example of FIG. 6, a text segment is an ACF6 644 ("EXPIRATION DATE"). After it is another text segment that is an AV6 645 ("2022 Dec. 31"), which is a sample date.

In the example of FIG. 6, a text segment is an ACF7 646 ("PERSON NAME"). After it is another text segment that is an AV7 647 ("Jane Doe"), which is a sample name.

In some embodiments, one of the text segments, which is confirmed to be indeed one of the certain required values, is an electronic signature of a person. In embodiments, a person's signature can be either electronic by typing, or an image of a handwritten portion that is captured. It can also be detected which type of signature is provided, or different types of a single trusted document can anticipate the person's signature in different forms. In the example of FIG. 6, a text segment is an ACF8 648 ("PERSON SIGNATURE"). After it is another text segment that is an AV8 649 ("Jane Doe, 2022 Feb. 22"). After that is a comment 659 ("(e-signed)"), which indicates which type of signature was used, and/or detected as used.

FIG. 6 is an example only. It should be noted, however, that the presented actual content fields of this example need not be present in all embodiments of trusted documents. In fact, some of these may be only implied by how the trusted document is written, and actually applied or supplied by the computer system, based on the required content fields, for giving titles to the actual values.

Returning to FIG. 1, in some embodiments, the operations of the computer system 195 further include causing one of the text segments 122 to be presented via a User Interface (UI). The UI can be on the screen 191. The operations then may further include receiving a confirmation input responsive to causing the one of the text segments to be presented. The confirmation input may be received from the UI. When the confirmation input is indeed received, then the treatment of the arrow 142 may take place, where the trusted document 120 can be treated as valid, and reliable for subsequent operations. An example of a UI is now described.

Figure 7:
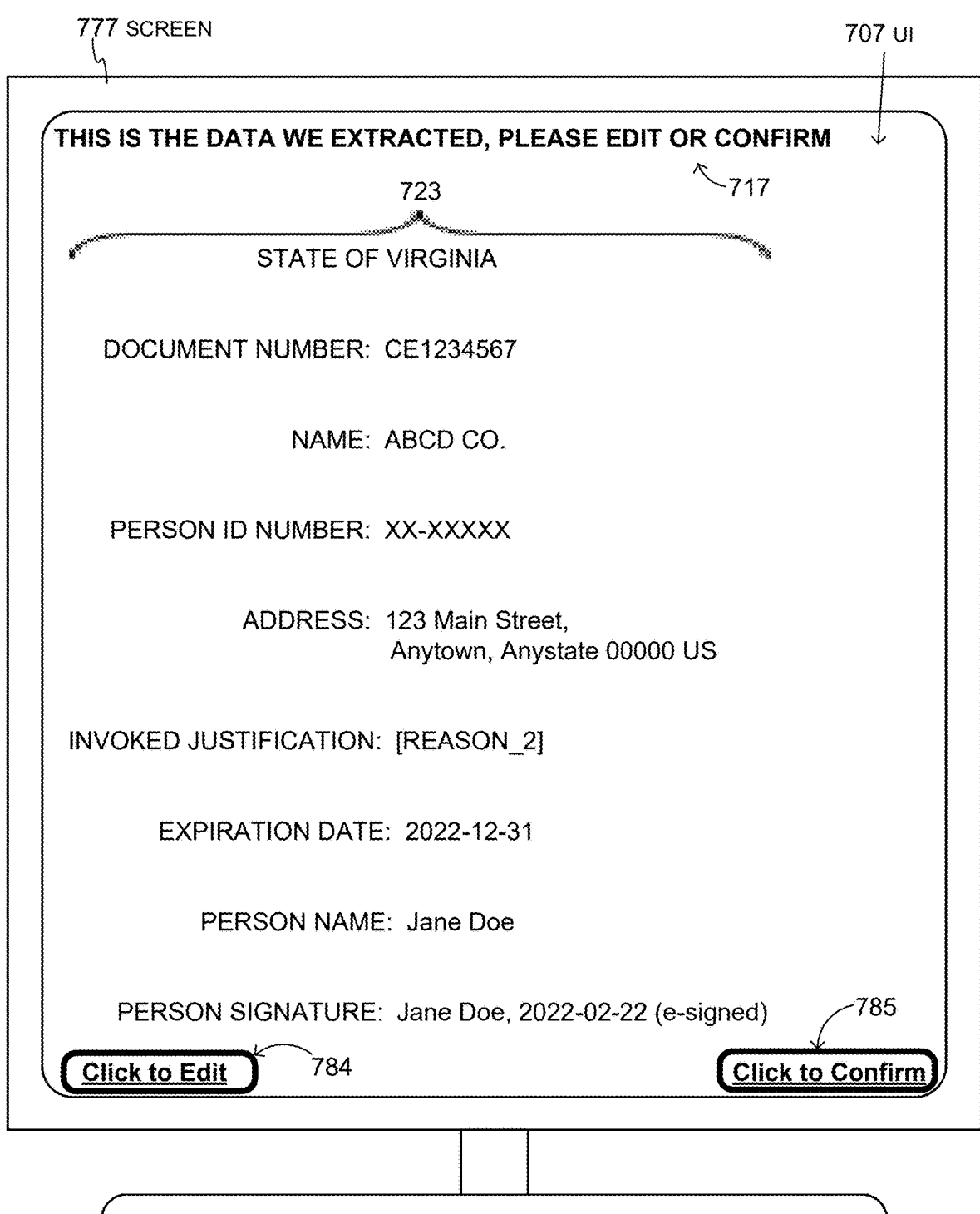
FIG. 7 is a sample view of a User Interface (UI) for displaying extracted text segments to a user for confirmation by the user, according to an embodiment.

FIG. 7 shows a screen 777, which is intended for the user 192. The screen 777 shows a UI 707.

At the top, the UI 707 presents an introductory message 717. For most of the screen 777, the UI 707 presents sample characterized text segments 723 which, in this example, are as was described for the text segments 623.

At the bottom left, the UI 707 presents a button 784 with the option to the user to edit any of the data, i.e. text segments, which were extracted from the trusted document.

At the bottom right, the UI 707 presents a button 785 with the option to the user to confirm all the data, i.e. text segments, which were extracted from the trusted document. Clicking on the button 785 can send the confirmation input mentioned above.

In this example, it is assumed that all the text segments of the trusted document were recognized correctly. Such is not always the case, as is now described in more detail.

Returning to FIG. 4, more details are now provided about the process of extracting the text segments. In embodiments, the operations of the computer system 195 may further include conducting an attempt to extract a certain one of the text segments from a certain one of the versions of the writings of the trusted document. In the example of FIG. 4, the extract operation 451 includes an attempt to extract the text segment 422B2 ("UMM4567") from the version of writing 320B2 ("VUMM4567") of the trusted document 320.

As mentioned above, in the example of FIG. 4, the extracted text segment 422B2 ("UMM4567") is the same as the writing 300B2 of the original document 300. In other words, the extract operation 451 operates perfectly to render the extracted text segments 422 from the writings of the original document 300, but the conducted attempt is not shown. In the example of FIG. 4, it may be evaluated, internally by the computer system, that the result of the attempt meets an Extraction Confidence Threshold (ECT), and therefore the extracted text segment 422B2 is presented with adequate confidence to the user. Such presenting was described with reference to FIG. 7 above.

Figure 8:
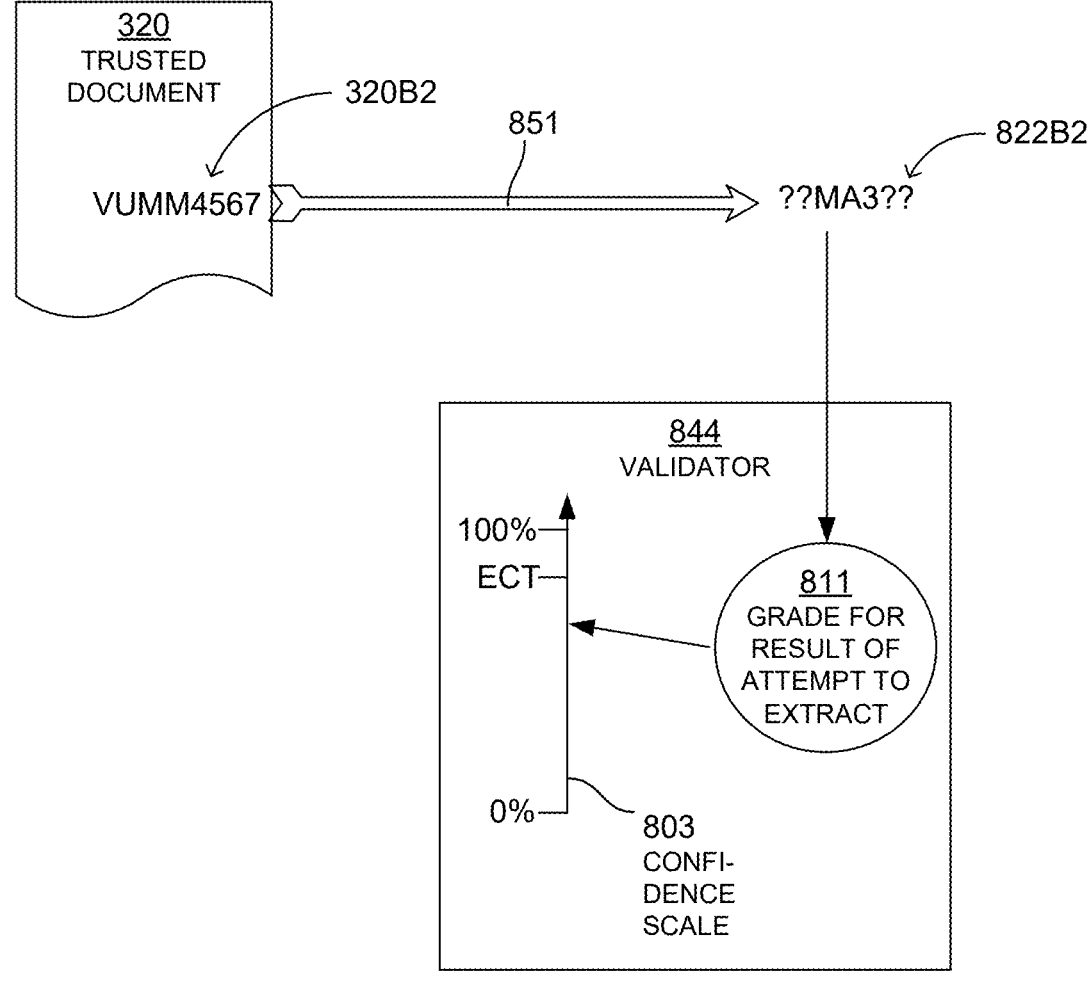
FIG. 8 is a diagram showing elements of a background process for how text segments can be extracted according to embodiments, in a sample scenario alternate to that of FIG. 4, where there is failure to extract a text segment.

The internal evaluation of the extract operation 151, 451 is now described in more detail. Referring now to FIG. 8, a validator 844 may be used for validating the attempts of extraction. The validator 844 may be implemented by a number of techniques, alone or in combination, for instance using a spell checker where appropriate, and other techniques from Artificial Intelligence (AI).

In some embodiments, the operations of the computer system 195 may further include evaluating that a result of the attempt does not meet the ECT. For instance, in FIG. 8 a scenario is presented that is alternate to that of FIG. 4, for the version of writing 320B2 ("VUMM4567") of the trusted document 320. In particular, the attempt to extract 851 results in a text segment 822B2. The validator 844 assigns a grade 811 for the result of the attempt to extract. The grade 811 is judged against a confidence scale 803 that is designed to be between a minimum, here, 0%, and a maximum, here 100%. The ECT is also shown, at a value that can be learned by experimentation, AI training, and so on. In the example of FIG. 8, the grade 811 is shown on the scale 803 as being less than the ECT. This outcome can be designated as a failure to extract the text segment.

It will be recognized from FIG. 8 that the failure to extract was depicted by question marks in the text segment 822B2 ("?? MA3?? "). Here, the question marks may indeed be used to suggest that perhaps scanned text was wholly unreadable in places. While this is the case, text may be extracted that also fails to meet expected criteria in different ways. In embodiments, while the confirming operation includes that at least one of the extracted text segments is indeed one of the certain required values, there can also be a further operation of ascertaining that at least one of the extracted segments meets a preset validity criterion. In such embodiments, the trusted document record can be caused to be created responsive also to so ascertaining. For instance, in the text segment 822B2 ("?? MA3?? ") a validity criterion may be applied that a number was expected for the fourth digit, not the extracted letter "A".

In such embodiments where there is failure to extract a text segment, sometimes a correction is sought by the user. In particular, the operations of the computer system 195 may further include causing, responsive to the result not meeting the ECT, a correction query to be presented via a User Interface (UI); and receiving, by the computer system and responsive to the correction query, a corrected value. In some of these embodiments, the trusted document record is created also from the corrected value. An example is now described.

FIG. 9 shows again the screen 777, but with a different UI 904. At the top, the UI 904 presents an introductory message 914. For most of the screen 777, the UI 904 presents sample characterized text segments 923 which, in this example, are the same as the text segments 723, except for one. In particular, to the right of ACF3 934, and after the colon, there is no corresponding actual value, because there was failure to extract the corresponding text segment, as per the example of FIG. 8. Instead, the UI 904 presents an invitation 984 for the user to enter the corrected value from their own independent knowledge, for instance by themselves reading the trusted document.

In such embodiments, the confirming operation may include ascertaining that the received corrected value is indeed one of the certain required content fields. If that happens then, from the perspective of the user, the screen 777 may again show the UI 707.

Figure 9:
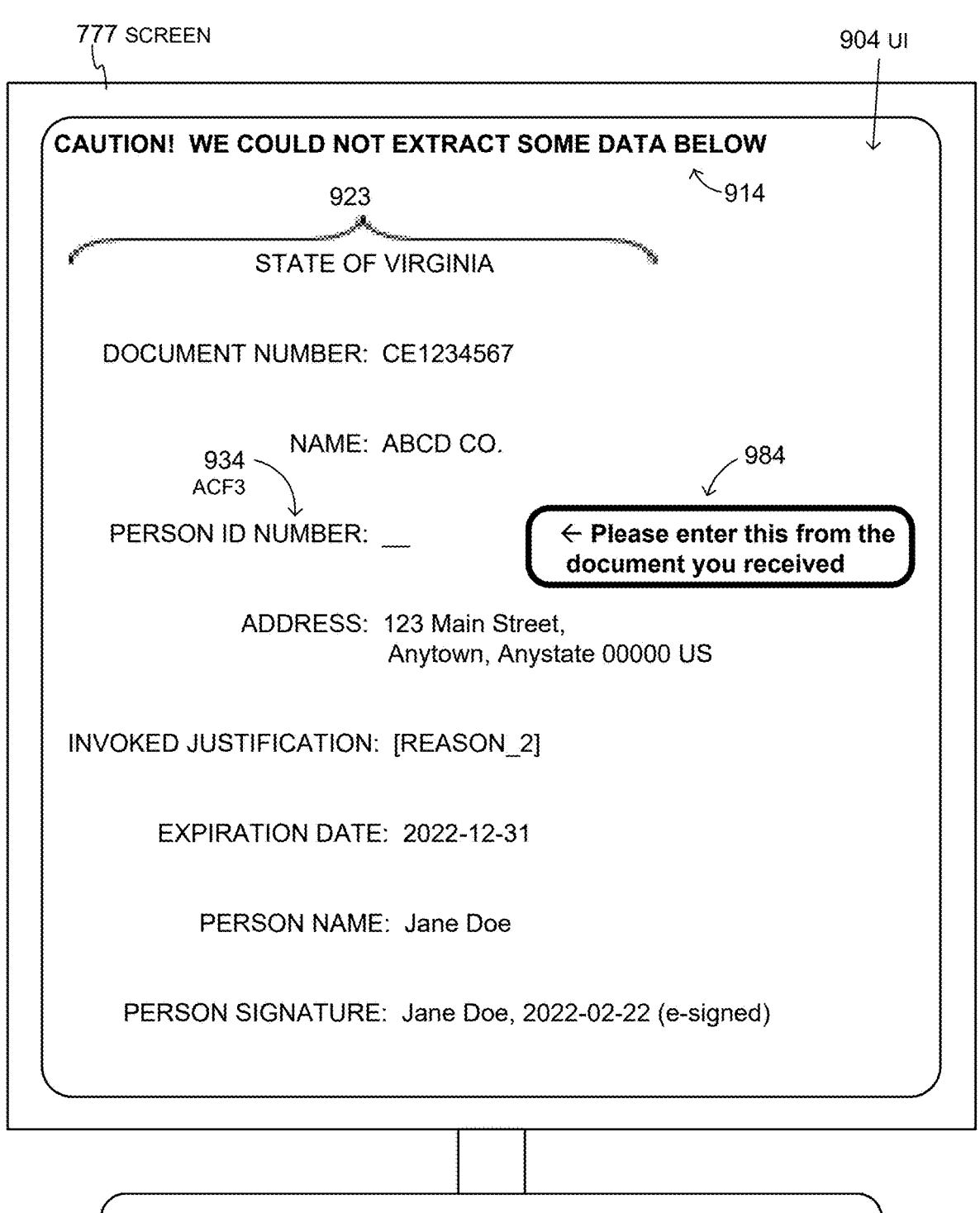
FIG. 9 is a sample view of a User Interface (UI) for inviting a user to enter a text segment for which there was failure to extract from an uploaded trusted document, according to an embodiment.

Of course, the correction of FIG. 9 may be sought for fields where the user can make it. Sometimes what is extracted is not text segments but images. Sometimes the user may have to seek an improved version of the trusted document for uploading. An example is now described.

Returning again to the example of FIG. 1, it was confirmed according to the arrows 141 that all the requirements of the set 140 were met. That is not necessarily always the case. In some embodiments, the operations of the computer system 195 may further include deciding, by the computer system, that the trusted document does not include a text segment that satisfies a certain one of the required content fields. This decision may take place, for instance, after attempting the above-described classification, and so on. An example is now described.

Figure 10:
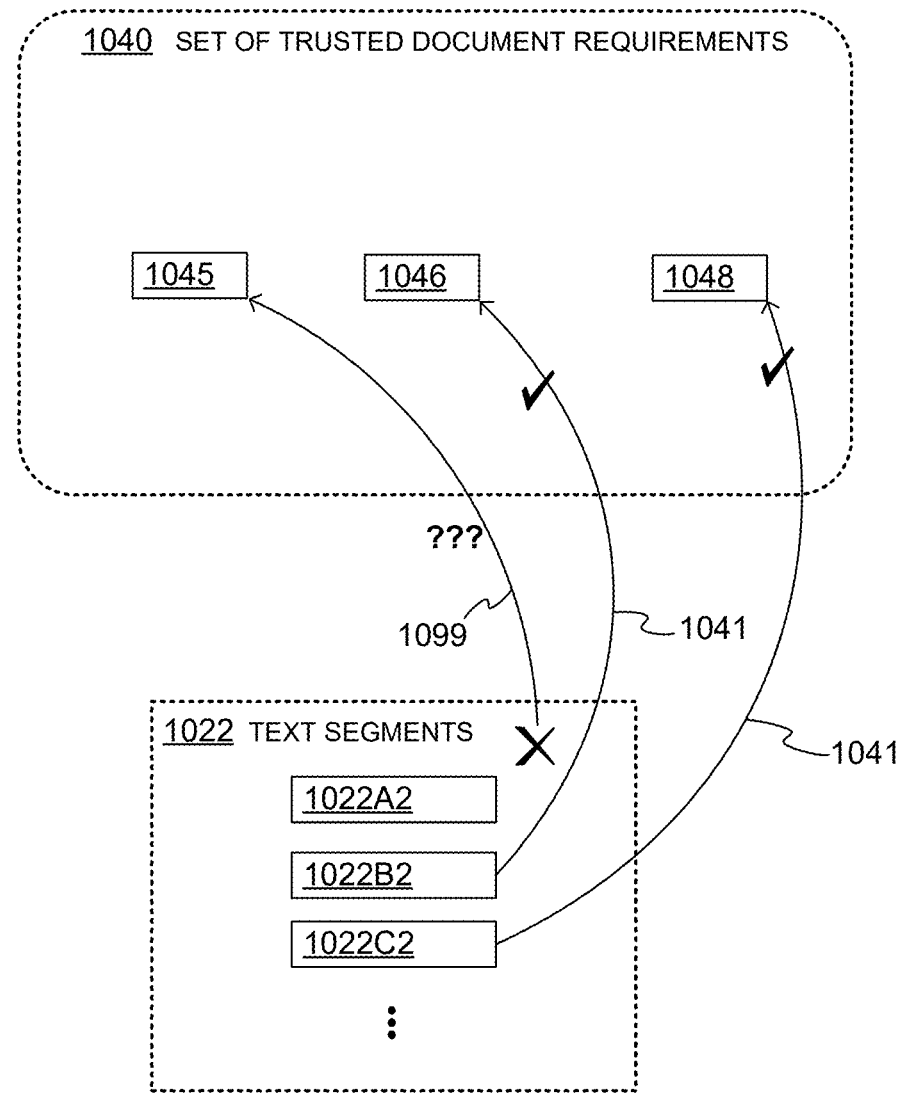
FIG. 10 is a diagram for showing a scenario where the set of identified requirements is not met, according to embodiments.

FIG. 10 shows text segments 1022, which may have been extracted from a trusted document (not shown) as was described for the text segments 122. The text segments 1022 include text segments 1022A2, 1022B2, 1022C2, . . . .

In addition, a set 1040 of trusted document requirements has been identified. The set 140 includes required content fields 1045, 1046, 1048.

When it comes to confirming, according to arrows 1041 with checkmarks, the text segments 1022B2, 1022C2 are indeed the certain values required by the required content fields 1046, 1048. However, according to an arrow 1099 with question marks, no text segment of the text segments 1022 satisfies the required content field 1045. This absence of a text segment is indicated by cross-marks.

In such embodiments, the operations of the computer system 195 may further include causing, responsive to so deciding, a compliance error message to be presented in a User Interface (UI). An example is now described.

Figure 11:
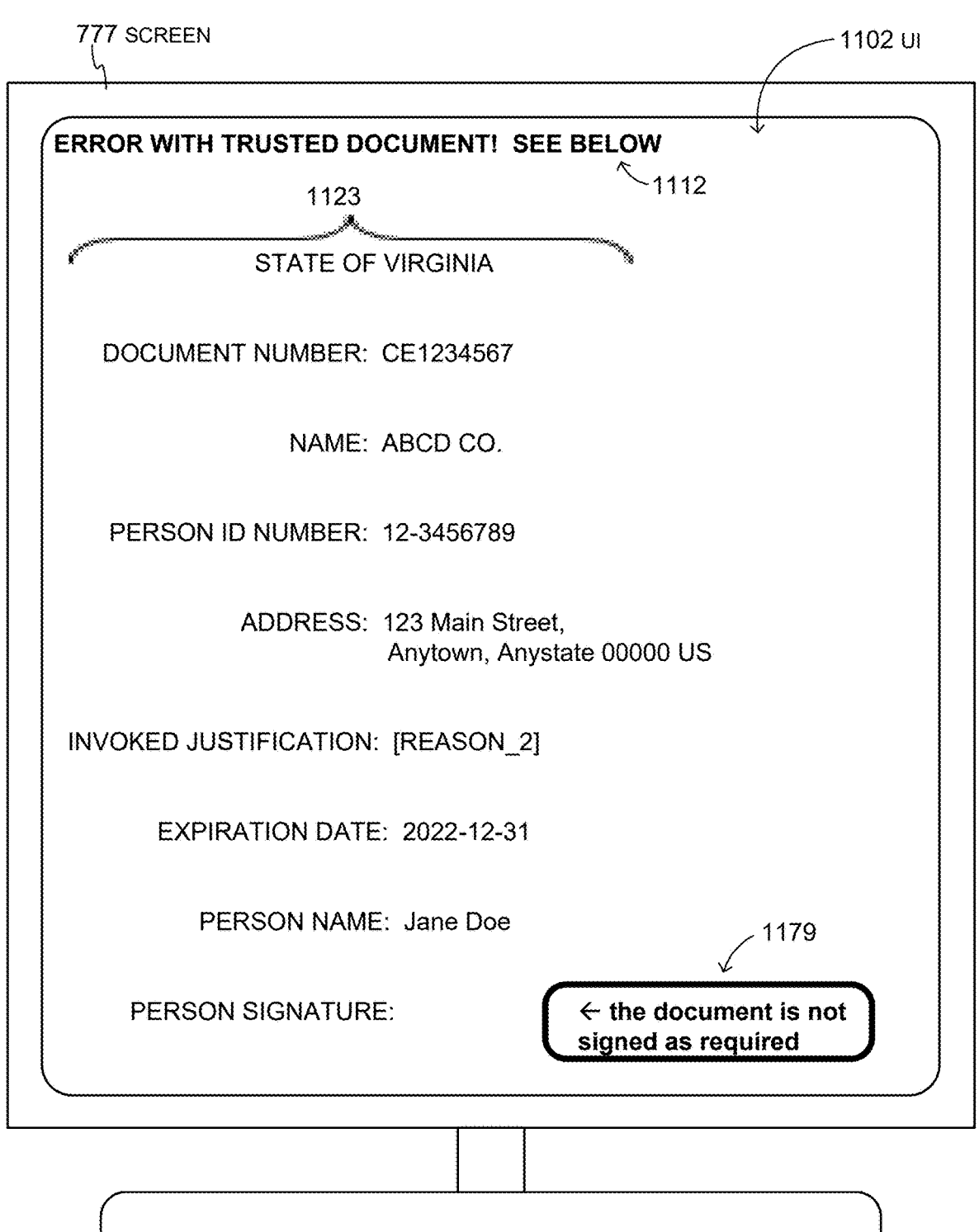
FIG. 11 is a sample view of a User Interface (UI) resulting from the scenario of FIG. 10, according to an embodiment.

FIG. 11 shows again the screen 777, but with a different UI 1102. At the top, the UI 1102 presents an introductory message 1112. For most of the screen 777, the UI 1102 presents sample characterized text segments 1123 which, in this example, are the same as the text segments 723, except for one. In particular, at the bottom right, the signature of the person is wholly missing. Instead, the UI 1102 presents a compliance error message 1179.

Returning to FIG. 1, a trusted document record 155 was shown. A more detailed example is now described.

Figure 12:
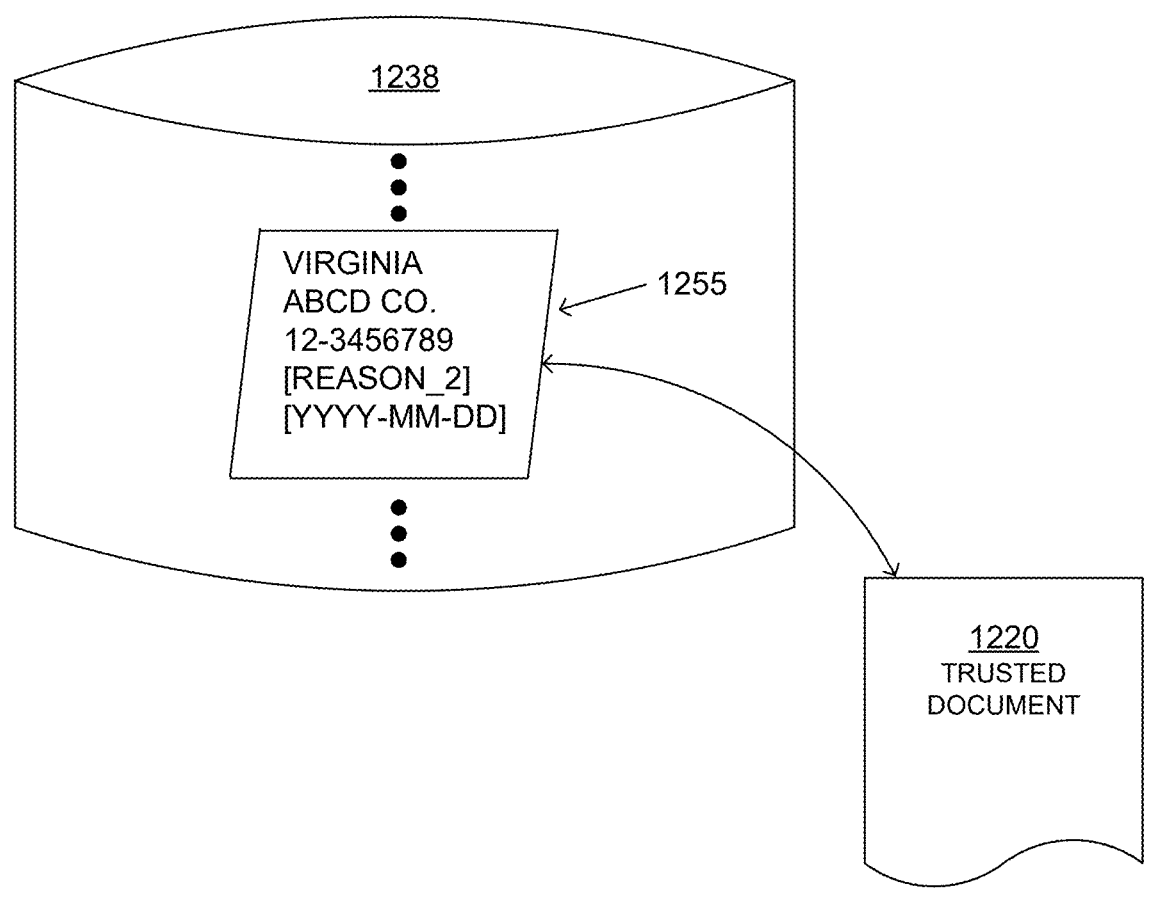
FIG. 12 is a diagram showing a sample trusted document record for a sample trusted document, according to embodiments.

FIG. 12 shows a sample trusted document record 1255, which refers to a sample trusted document 1220. The trusted document 1220 can be as described for the trusted document 120. The trusted document 1220 can be finally stored for long term storage after the confirmation of FIG. 7.

The trusted document record 1255 is, in this example, stored in a database 1238. The database 1238 can be a database for such records, and sometimes storing records of the primary entity only 193, or also of other entities.

The trusted document record 1255 can have representative data of the trusted document 1220, for instance as extracted and characterized per FIG. 6, and/or as confirmed per FIG. 7, and sometimes after being corrected per FIG. 9. Creating the trusted document record 1255 can be followed by storing it. Being thus stored, the trusted document record 1255 can be quickly consulted for determining whether or not an override rule applies or not.

Figure 13:
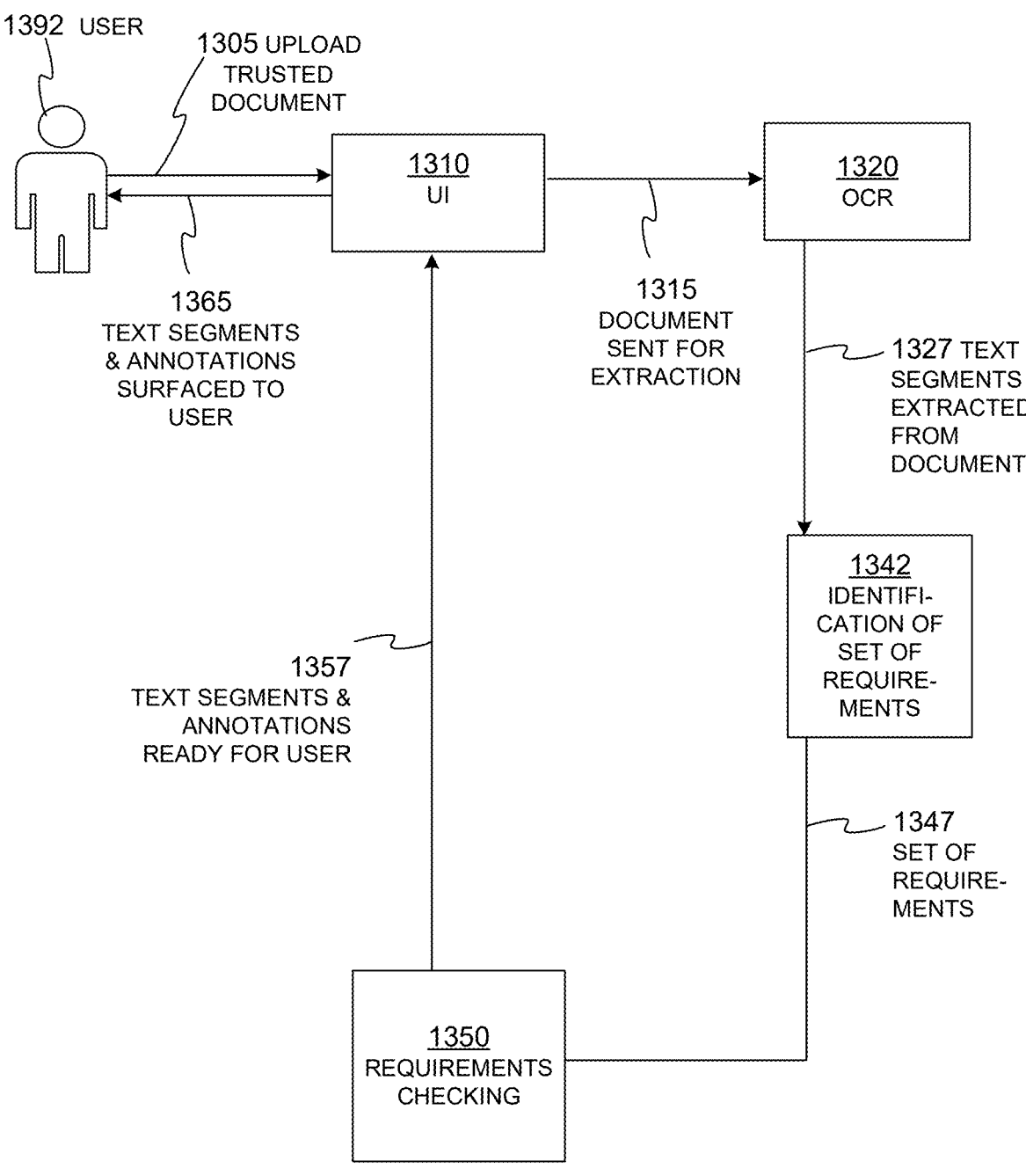
FIG. 13 is a flowchart for illustrating sample methods according to embodiments for building Artificial Intelligence (AI) models.

FIG. 13 is a flowchart 1300 for illustrating sample methods according to embodiments. A user 1392 can be as the user 192, who uses a UI 1310.

According to an operation 1305, the user 1392 may upload a trusted document in the UI 1310.

According to an operation 1315, the uploaded trusted document can be transferred to an OCR module 1320 for text extraction.

According to an operation 1342, text segments 1327 that are extracted by the OCR module 1320 result in a set 1347 of identified requirements.

According to an operation 1350, the set 1347 of requirements is checked, which results in text segments, and annotations 1357 ready for the user. The UI 1310 may surface these (operation 1365) to the user 1392, for confirmation and/or correction.

The flowchart 1300 is simplified in the sense that it does not cover all possibilities, as will be understood from the rest of this document, nor does it explicitly show characterization of the extracted text segments, and so on. For instance, if a checked requirement is not met at the operation 1350, it can be surfaced to the user 1392 as an annotation, and the user can meet it, and it may be checked again through another iteration through the operation 1350, and so on. In addition, other sequences may be possible.

Returning again to FIG. 1, and as mentioned above, the set of requirements 140 for the trusted document 120 can be identified according to arrow 104 from the trusted document 120. Examples are now described.

Figure 14:
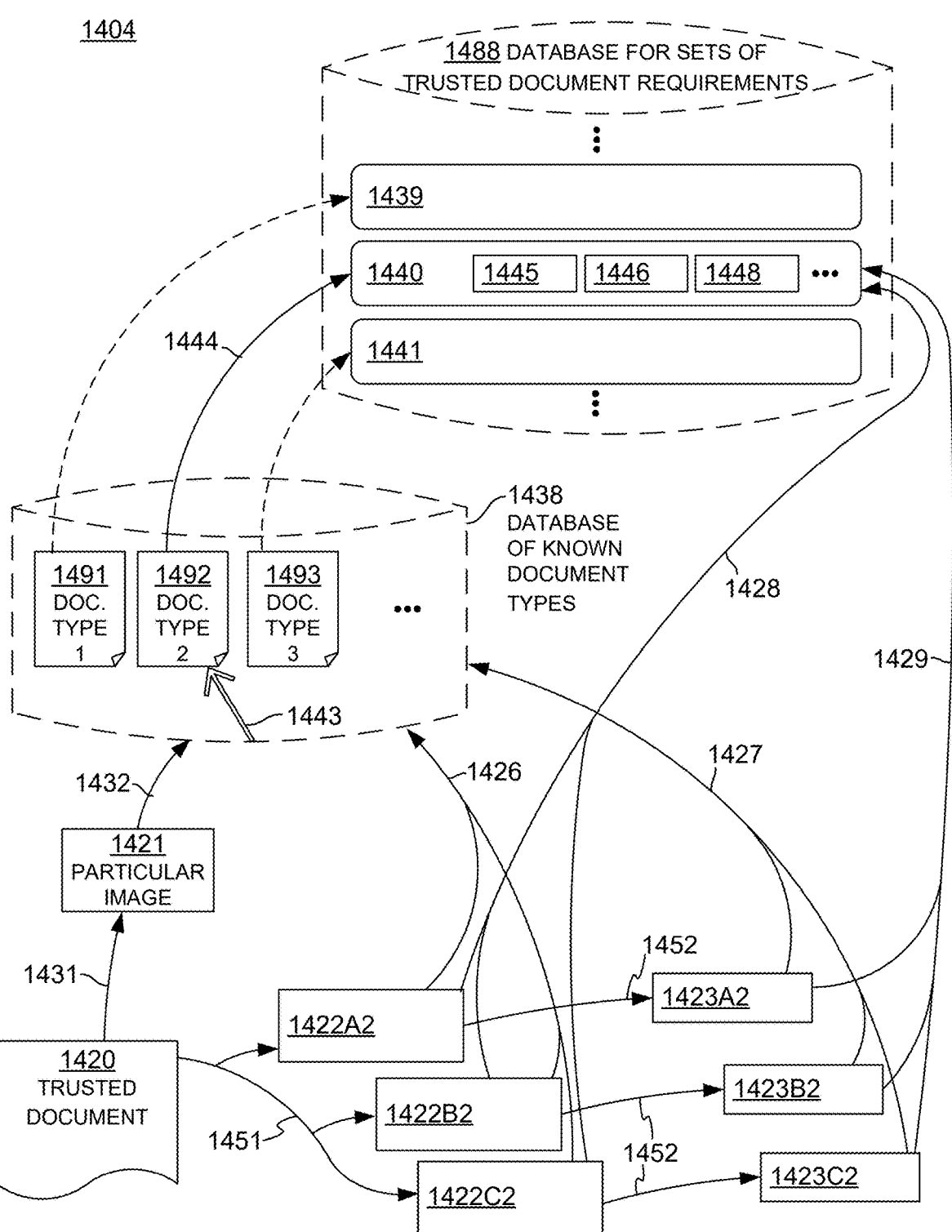
FIG. 14 is a single diagram for showing multiple different embodiments of identifying a set of requirements for a trusted document.

FIG. 14 is a diagram 1404 that is intended to facilitate the description of how the set of requirements 1440 can be identified from the trusted document 1420. At the bottom left, the diagram 1404 shows a trusted document 1420, which could be as the trusted document 120. At the top right, the diagram 1404 shows a set of requirements 1440, which could be as the set of requirements 140. The set of requirements 1440 includes required content fields 1445, 1446, 1448, . . . , which could be as described above for similar elements. While not required, the set of requirements 1440 is one among a plurality of such sets . . . , 1439, 1440, 1441, . . .

In embodiments, these sets . . . , 1439, 1440, 1441, . . . of requirements are stored as records in a database 1488 for such sets of trusted document requirements, although that is not required. When stored in a database, these sets of requirements can be indexed depending on how it is envisioned they would be looked up.

In some embodiments, known document types are stored, in the hope that the received uploaded trusted document will match one of these known document types. In the example of FIG. 14, known document types 1491, 1492, 1493, . . . are stored, optionally in a database 1438 of known document types. In embodiments, the document types may be used to generate the sets of requirements for each document type.

For each of the known stored document types, there is a corresponding set of stored document requirements among the plurality of such sets. Multiple document types may have the same set of requirements. In the example of FIG. 14, for each of the shown known document types 1491, 1492, 1493, there is a corresponding set 1439, 1440, 1441 of stored document requirements.

In such embodiments, the trusted document is compared to the stored known document types, and the comparison indicates that a certain document type matches the trusted document above a confidence threshold. In such embodiments, then, the set of requirements is identified as the set of requirements that corresponds to the certain document type. In the example of FIG. 14, the trusted document 1420 is compared to the stored known document types 1491, 1492, 1493, . . . , and the comparison indicates—per an arrow 1443—that a certain document type 1492 matches the trusted document 1420 above a confidence threshold. In this example, then, the set of requirements is identified as the set of requirements 1440 that corresponds to the certain document type 1492, according to an arrow 1444.

The comparison of the trusted document to the stored known document types can be performed in a number of ways, or combinations of ways. In some embodiments, the comparison is image-based. For instance, the trusted document can be compared to the stored known document types by comparing a particular image of at least a portion of the trusted document to respective images of at least portions of the stored known document types. The particular image can be a top portion of a cover page, which may bear a title and a distinctive design such as a logo or unique shape, and which can be extracted from the received uploaded trusted document. Or, the particular image may be the whole cover page, which may have a heading of what type of document it is, and so on. In the example of FIG. 14, a particular image 1421 can be isolated or extracted if need be according to a process arrow 1431. Then the particular image 1421 can be used for the comparison according to a process arrow 1432, with respective images of at least portions of the stored known document types 1491, 1492, 1493, . . . .

In some embodiments, the comparison is word-based. For instance, the trusted document can be compared to the stored known document types by comparing one or more of the inputted text segments to one or more stored text segments previously extracted from the stored known document types. In the example of FIG. 14, the inputted text segments 1422A2, 1422B2, 1422C2, have been extracted from the trusted document 1420 according to a process arrow 1451. Then the inputted text segments 1422A2, 1422B2, 1422C2, can be used for the comparison according to merged search arrows 1426, with one or more stored text segments previously extracted from the stored known document types.

For another instance, the inputted text segments are first characterized. In embodiments, the operations of the computer system 195 further include characterizing at least one of the text segments as a value for a domain field of the trusted document. In such embodiments, the trusted document can be compared to the stored known document types by comparing the value for a domain field to a stored text segment previously extracted from the stored known document types. In the example of FIG. 14, the extracted text segments 1422A2, 1422B2, 1422C2, can be characterized, according to characterization arrows 1452, to yield values 1423A2, 1423B2, 1423C2 for domain fields of the trusted document 1420. Characterizing can be aided by the location of the text segments with reference to the remainder of the trusted document 1420. Then the values 1423A2, 1423B2, 1423C2 can be used for the comparison according to merged search arrows 1427, with one or more stored text segments previously extracted from the stored known document types.

In some instances, the comparison indicates that none of the document types matches the trusted document above a confidence threshold. In some embodiments, when this happens, the trusted document is stored as an additional document type. This may be performed with further causing UIs to be projected to a human for oversight, and perhaps annotation, for determining a new set of requirements for the new document type and so on. Then the trusted document can be used for recognizing a new document, and so on.

It is not required that the identification of the set of requirements be performed by explicitly recognizing one of the document types. Indeed, in some embodiments, and as mentioned above, the plurality of sets of trusted document requirements are stored as records in a database for sets of trusted document requirements. In such embodiments, the set of requirements can be identified by using the one or more of the inputted text segments to search the database for sets of trusted document requirements. In the example of FIG. 14, the inputted text segments 1422A2, 1422B2, 1422C2, can be used to search the database 1488, for instance as key words, according to merged search arrows 1428.

For another instance, in some embodiments, the operations of the computer system 195 further include characterizing one or more of the text segments as values for domain fields of the trusted document. In such embodiments, the set of requirements can be identified by using the one or more of the values for domain fields to search the database for sets of trusted document requirements. In the example of FIG. 14, the values 1423A2, 1423B2, 1423C2 can be used to search the database 1488, for instance as key words, according to merged search arrows 1429.

Figure 15:
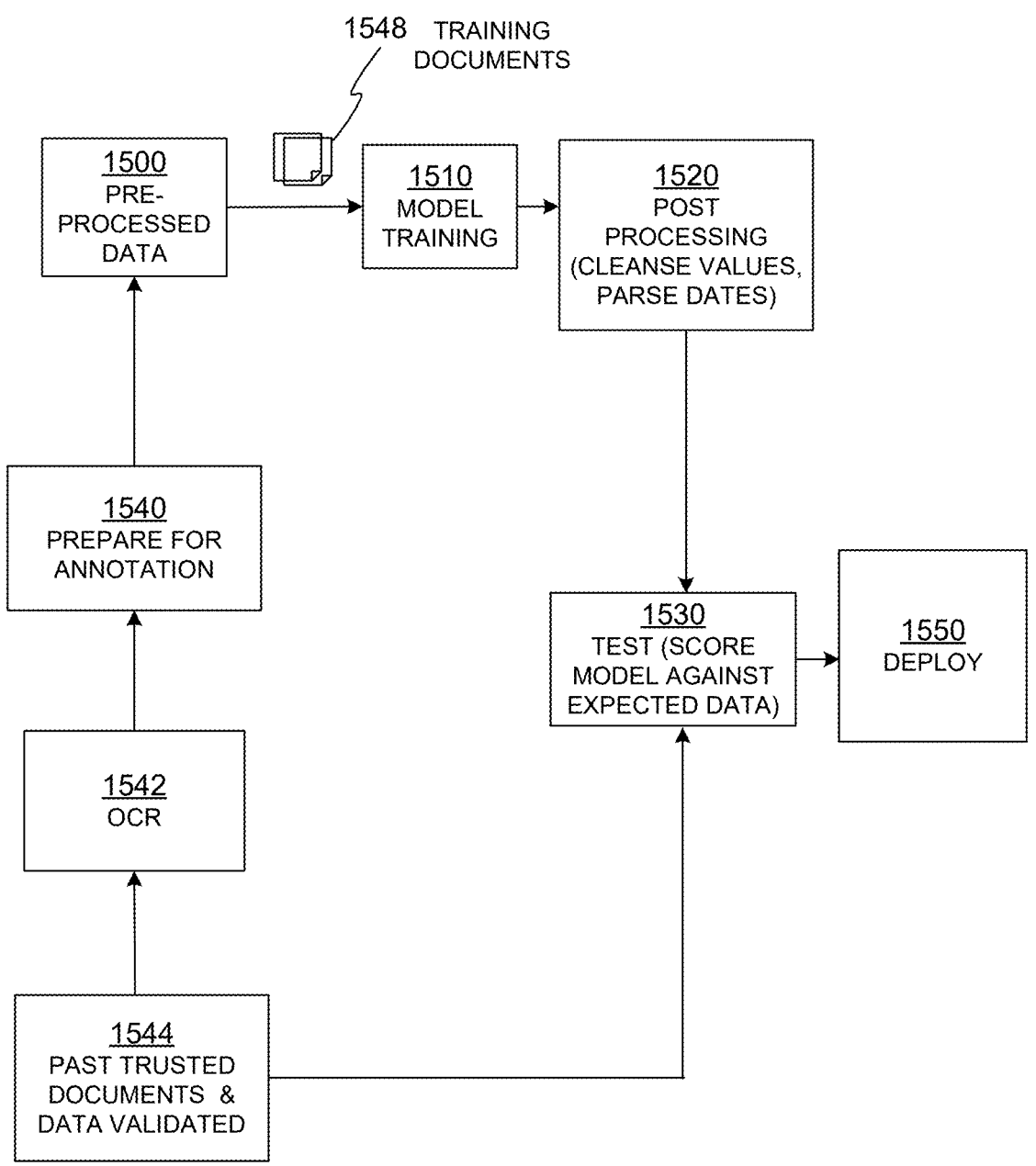
FIG. 15, is a flowchart for illustrating sample methods according to embodiments.

FIG. 15 is a flowchart for illustrating sample Artificial Intelligence (AI) techniques for building models to train a system, e.g. for facilitating the comparison of the trusted document 1420. A method may use past trusted documents and validated data 1544, which can be as described above. From those, there can follow the operations 1542, 1540, 1500, 1510, 1520, whose depicted texts describe their operations. Pre-processed data 1500 can amount to training documents 1548. Then, at operation 1530, the models can be tested as shown to determine their predictive value. If satisfactory, they deployed at an operation 1550.

FIG. 16 shows a flowchart 1600 for describing methods according to embodiments. Many of the operations of the flowchart 1600 can be performed by a computer system, such as the computer system 195, and examples were given in FIG. 1.

The flowchart 1600 is made from two parts, namely sub-flowchart 1607 and sub-flowchart 1677 according to embodiments. The sub-flowchart 1607 pertains to inputting and validating a trust document, while the sub-flowchart 1677 pertains to using a validated trusted document for a dataset, which can happen later than the sub-flowchart 1607.

According to an operation 1610, a trusted document can be received by an upload.

According to another operation 1620, text segments may be input that have been extracted from the versions of the writings of the trusted document.

According to another operation 1630, a set of requirements may be identified from the trusted document. The requirements of the set may include that the received trusted document must include certain required values.

According to another operation 1640, it may be confirmed that at least some of the extracted text segments are indeed the certain required values.

According to another operation 1650, responsive to so confirming, a trusted document record can be caused to be created about the trusted document.

According to another operation 1672, a dataset may be received from a remote device via a network.

According to another operation 1674, stored digital resource rules may be accessed.

According to another operation 1676, a subset of the digital resource rules may be selected responsive to one or more of the dataset values. The subset may include a main rule and an override rule.

According to another operation 1680, it may be determined whether the override rule applies or not. The determination may be made from the trusted document record.

According to another operation 1682, responsive to determining that the override rule applies, i.e. the answer at operation 1680 being YES, a resource may be produced having a value of zero.

According to another operation 1684, responsive to determining that the override rule does not apply, i.e. the answer at operation 1680 being NO, a resource may be produced having a non-zero value. That resource may be produced by applying the main rule to at least one of the dataset values.

According to another operation 1690, a notification can be caused to be transmitted about an aspect of the resource to one of an output device and another device. That, regardless of whether the resource was produced by the operation 1682 or the operation 1684.

Figure 17:
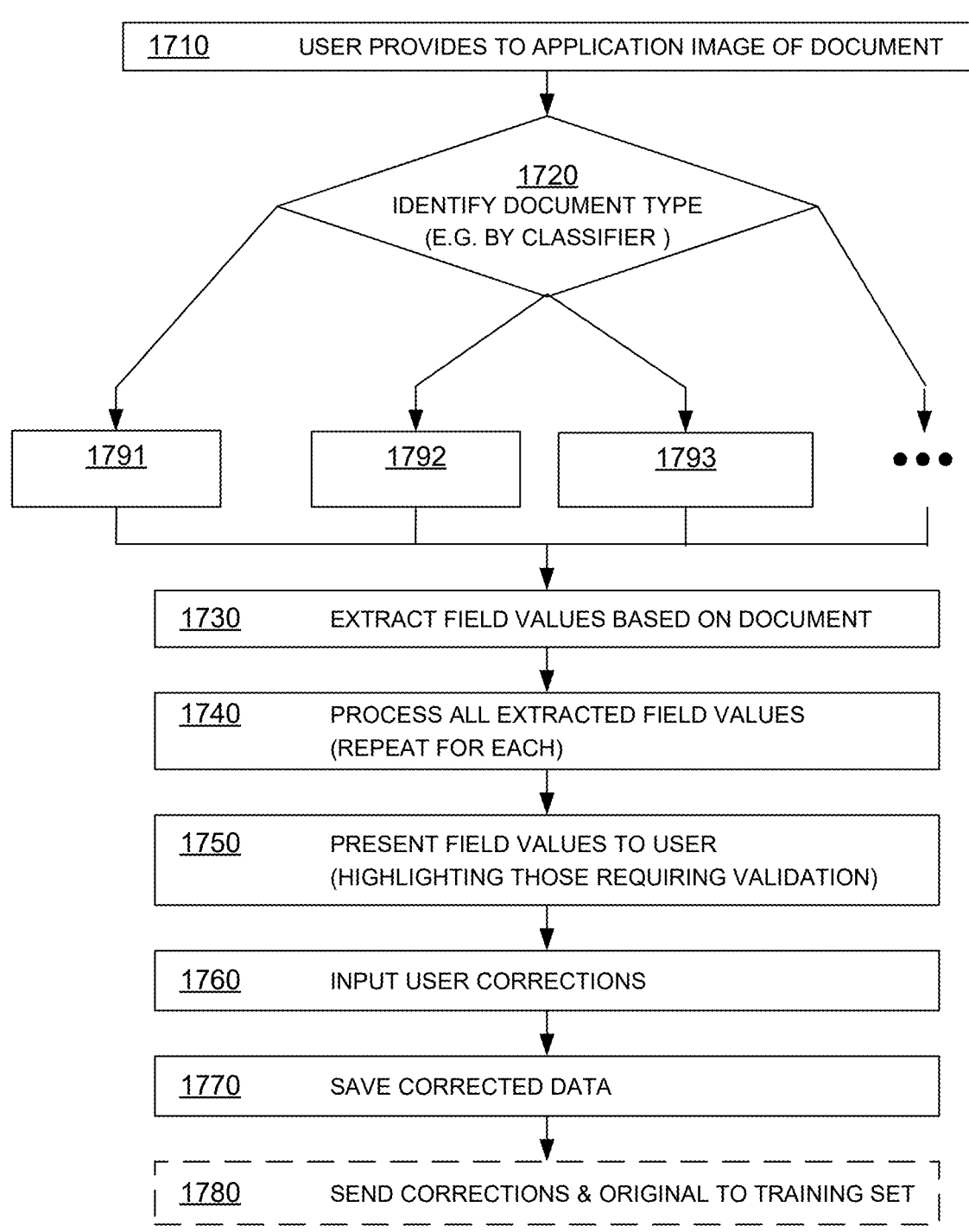
FIG. 17 is a flowchart for illustrating sample methods according to embodiments.

FIG. 17 shows a flowchart 1700 for describing methods according to embodiments, which also use AI implementations of the type of FIG. 15. A number of the operations of the flowchart 1700 have been described above in different contexts.

The flowchart 1700 starts with the operation 1710, which results in the uploading described previously.

According to another operation 1720, a type of the uploaded document is identified, for instance using a classifier. The image may be recognized or not. If not, an error message can be sent. If recognized, it can be determined whether the image is of an expected type or not. If not, the image can be added to the stored document types, have its requirements be learned and stored, and so on. If it is recognized, the classifier can select one of document types 1791, 1792, 1793, . . . .

The flowchart 1700 continues with the operations 1730, 1740, 1750, 1760, 1770 and 1780, which are described in their depicted texts.

Figure 18:
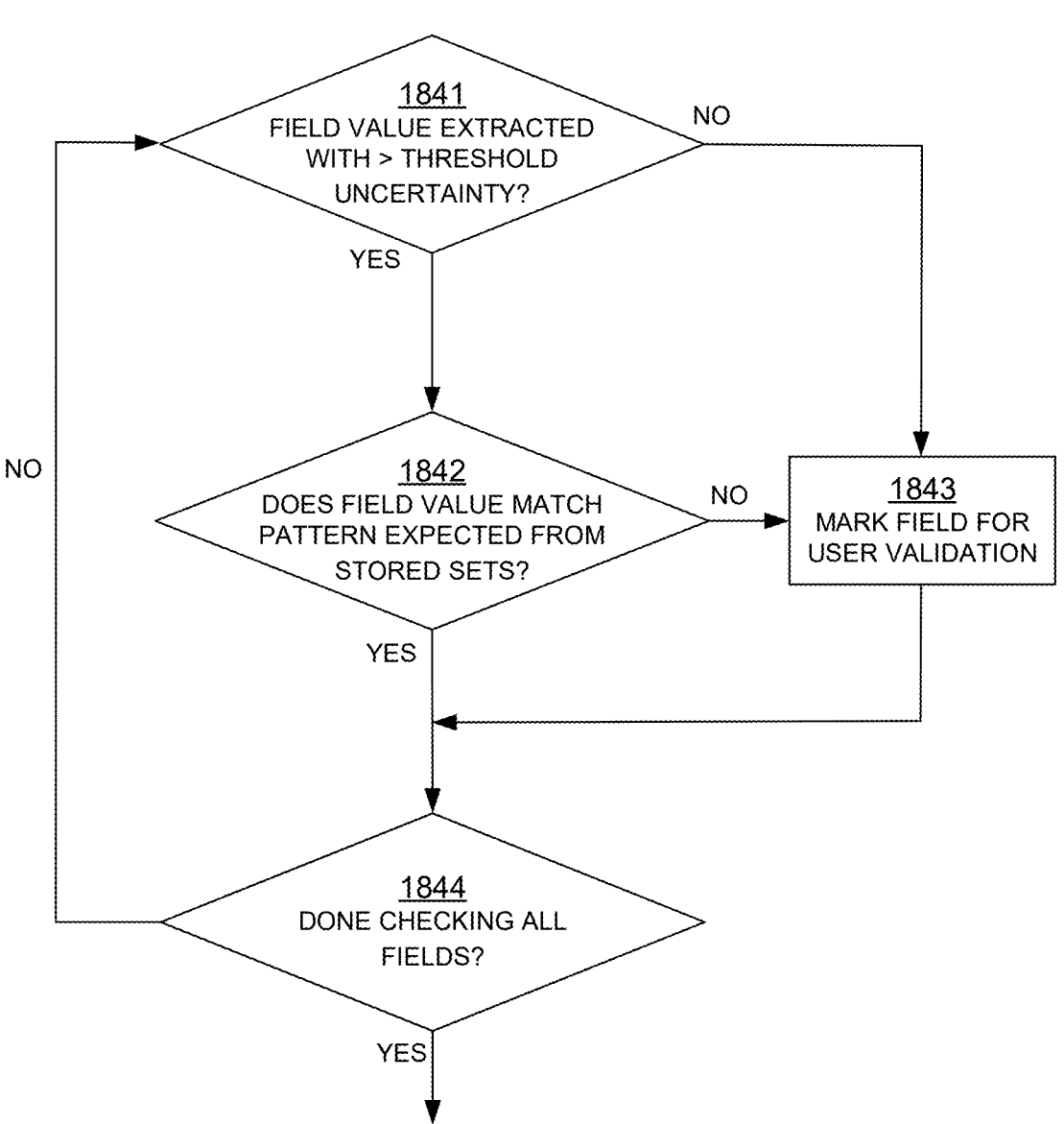
FIG. 18 is a flowchart for illustrating a sample operation of the methods of FIG. 17, according to embodiments.

FIG. 18 shows a flowchart 1840 for describing methods for the operation 1740 of FIG. 17. The flowchart 1840 starts with the operation 1841, and continues with the operations 1842, 1843, 1844, all of which are described in their depicted texts.

Details about Computer Systems

Figure 19:
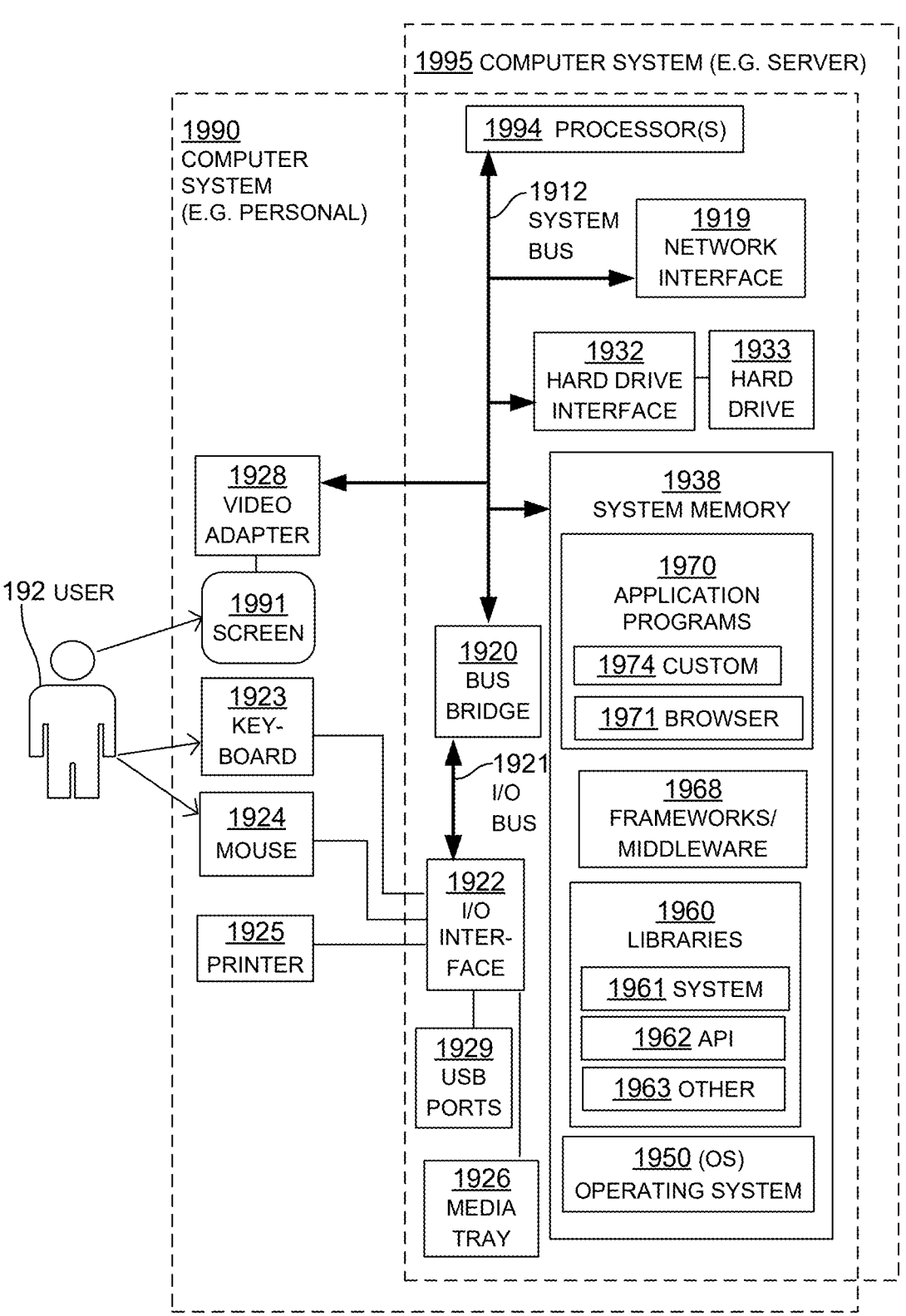
FIG. 19 is a block diagram showing additional components of sample computer systems according to embodiments.

FIG. 19 shows details for a sample computer system 1995 and for a sample computer system 1990. The computer system 1995 may be a server, while the computer system 1990 may be a personal device, such as a personal computer, a desktop computer, a personal computing device such as a laptop computer, a tablet computer, a mobile phone, and so on. Either type may be used for the computer system 195 and 190 of FIG. 1, and/or a computer system that is part of OPF 189.

The computer system 1995 and the computer system 1990 have similarities, which FIG. 19 exploits for purposes of economy in this document. It will be understood, however, that a component in the computer system 1995 may be implemented differently than the same component in the computer system 1990. For instance, a memory in a server may be larger than a memory in a personal computer, and so on. Similarly, custom application programs 1974 that implement embodiments may be different, and so on.

The computer system 1995 includes one or more processors 1994. The processor(s) 1994 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 1994 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 1995, or the computer system 1990, are not intended to be exhaustive. Rather, they are representative, for highlighting essential components that can be used with embodiments.

The computer system 1995 also includes a system bus 1912 that is coupled to the processor(s) 1994. The system bus 1912 can be used by the processor(s) 1994 to control and/or communicate with other components of the computer system 1995.

The computer system 1995 additionally includes a network interface 1919 that is coupled to system bus 1912. Network interface 1919 can be used to access a communications network, such as the network 188. Network interface 1919 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 1995 also includes various memory components. These memory components include memory components shown separately in the computer system 1995, plus cache memory within the processor(s) 1994. Accordingly, these memory components are examples of non-transitory machine-readable media. The memory components shown separately in the computer system 1995 are variously coupled, directly or indirectly, with the processor(s) 1994. The coupling in this example is via the system bus 1912.

Instructions for performing any of the methods or functions described in this document may be stored, completely or partially, within the memory components of the computer system 1995, etc. Therefore, one or more of these non-transitory computer-readable media can be configured to store instructions which, when executed by one or more processors 1994 of a host computer system such as the computer system 1995 or the computer system 1990, can be designed to or programmed to cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 1995 include a non-volatile hard drive 1933. The computer system 1995 further includes a hard drive interface 1932 that is coupled to the hard drive 1933 and to the system bus 1912.

The memory components of the computer system 1995 include a system memory 1938. The system memory 1938 includes volatile memory including, but not limited to, cache memory, registers and buffers. In embodiments, data from the hard drive 1933 populates registers of the volatile memory of the system memory 1938.

In some embodiments, the system memory 1938 has a software architecture that uses a stack of layers, with each layer providing a particular functionality. In this example the layers include, starting from the bottom, an Operating System (OS) 1950, libraries 1960, frameworks/middleware 1968 and application programs 1970, which are also known more simply as applications 1970. Other software architectures may include less, more or different layers. For example, a presentation layer may also be included. For another example, some mobile or special purpose operating systems may not provide a frameworks/middleware 1968.

The OS 1950 may manage hardware resources and provide common services. The libraries 1960 provide a common infrastructure that is used by the applications 1970 and/or other components and/or layers. The libraries 1960 provide functionality that allows other software components to perform tasks more easily than if they interfaced directly with the specific underlying functionality of the OS 1950. The libraries 1960 may include system libraries 1961, such as a C standard library. The system libraries 1961 may provide functions such as memory allocation functions, string manipulation functions, mathematical functions, and the like.

In addition, the libraries 1960 may include API libraries 1962 and other libraries 1963. The API libraries 1962 may include media libraries, such as libraries to support presentation and manipulation of various media formats such as MPREG4, H.264, MP3, AAC, AMR, JPG, and PNG. The API libraries 1962 may also include graphics libraries, for instance an OpenGL framework that may be used to render 2D and 3D in a graphic content on the screen 1991. The API libraries 1962 may further include database libraries, for instance SQLite, which may support various relational database functions. The API libraries 1962 may additionally include web libraries, for instance WebKit, which may support web browsing functionality, and also libraries for applications 1970.

The frameworks/middleware 1968 may provide a higher-level common infrastructure that may be used by the applications 1970 and/or other software components/modules. For example, the frameworks/middleware 1968 may provide various Graphic User Interface (GUI) functions, high-level resource management, high-level location services, and so forth. The frameworks/middleware 1968 may provide a broad spectrum of other APIs that may be used by the applications 1970 and/or other software components/modules, some of which may be specific to the OS 1950 or to a platform.

The application programs 1970 are also known more simply as applications and apps. One such app is a browser 1971, which is a software that can permit the user 192 to access other devices in the internet, for example while using a Graphic User Interface (GUI). The browser 1971 includes program modules and instructions that enable the computer system 1995 to exchange network messages with a network, for example using Hypertext Transfer Protocol (HTTP) messaging.

The application programs 1970 may include one or more custom applications 1974, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 1970 may include a contacts application, a book reader application, a location application, a media application, a messaging application, and so on. Applications 1970 may be developed using the ANDROID™ or IOS™ Software Development Kit (SDK) by an entity other than the vendor of the particular platform, and may be mobile software running on a mobile operating system. The applications 1970 may use built-in functions of the OS 1950, of the libraries 1960, and of the frameworks/middleware 1968 to create user interfaces for the user 192 to interact with.

The computer system 1995 moreover includes a bus bridge 1920 coupled to the system bus 1912. The computer system 1995 furthermore includes an input/output (I/O) bus 1921 coupled to the bus bridge 1920. The computer system 1995 also includes an I/O interface 1922 coupled to the I/O bus 1921.

For being accessed, the computer system 1995 also includes one or more Universal Serial Bus (USB) ports 1929. These can be coupled to the I/O interface 1922. The computer system 1995 further includes a media tray 1926, which may include storage devices such as CD-ROM drives, multi-media interfaces, and so on.

The computer system 1990 may include many components similar to those of the computer system 1995, as seen in FIG. 19. In addition, a number of the application programs may be more suitable for the computer system 1990 than for the computer system 1995.

The computer system 1990 further includes peripheral input/output (I/O) devices for being accessed by a user more routinely. As such, the computer system 1990 includes a screen 1991 and a video adapter 1928 to drive and/or support the screen 1991. The video adapter 1928 is coupled to the system bus 1912.

The computer system 1990 also includes a keyboard 1923, a mouse 1924, and a printer 1925. In this example, the keyboard 1923, the mouse 1924, and the printer 1925 are directly coupled to the I/O interface 1922. Sometimes this coupling is via the USB ports 1929.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium includes one or more processors 1994.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all of these aspects have even similar reference numerals, for ease of explanation.) For instance, the present disclosure could be configured in a number of different ways beyond the review and validation of exemption certificates for sales tax that is described below. Additional use cases include for similar processing of any compliance document including business licenses, certificates, credentials, proof of completion, and so on.

Operational examples and sample use cases are possible where the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

Figure 20:
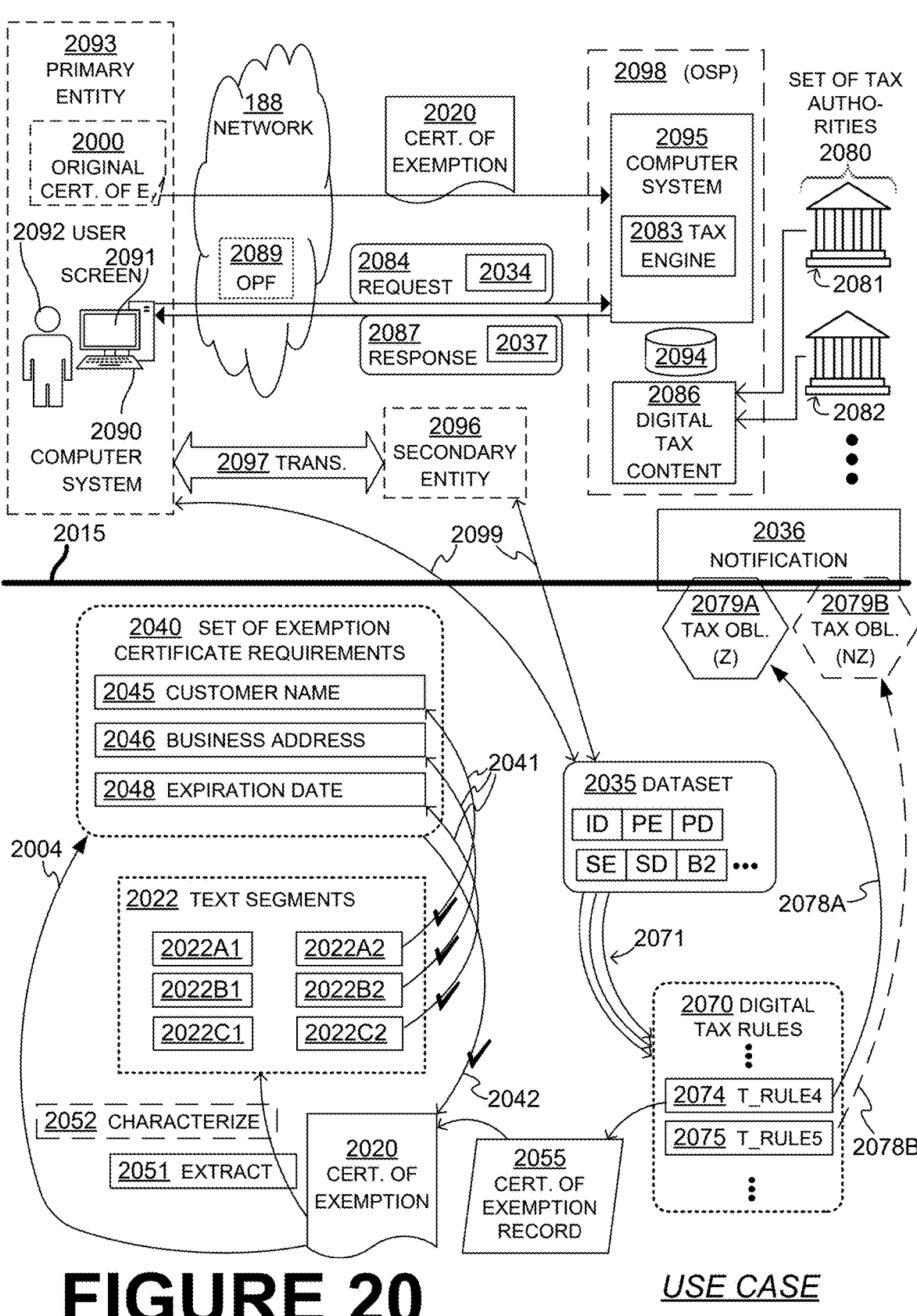
FIG. 20 is a diagram of sample aspects for describing operational examples and use cases of embodiments.

FIG. 20 is a diagram for an operational example where a buy-sell transaction 2097 is a use case of the relationship instance 197. The transaction 2097 is conducted between a primary entity 2093, which is a seller, and a secondary entity 2096, which is a buyer. A tax obligation 2079A or 2079B arises often from the transaction 2097—in particular a sales and/or use tax must be paid by either the primary entity 2093 or the secondary entity 2096. A computation of the tax obligation 2079A or 2079B is a use case of producing the resource 179A or 179B.

It will be recognized that aspects of FIG. 20 have similarities with aspects of FIG. 1. Portions of such aspects may be implemented as described for analogous aspects of FIG. 1. In particular, a thick horizontal line 2015 separates FIG. 20, although not completely or rigorously, into a top portion and a bottom portion. Above the line 2015 are shown elements with emphasis mostly on entities, components, their relationships, and their interactions, while below the line 2015 are shown elements with emphasis mostly on processing of data that takes place often within one or more of the components that are above the line 2015.

Above the line 2015, a computer system 2095 is shown, which is used to help customers, such as a user 2092, with tax compliance. For instance, the user 2092 may log into the computer system 2095 by using credentials, such as a user name, a password, a token, and so on. Further in this example, the computer system 2095 is part of an OSP 2098 that is implemented as a Software as a Service (SaaS) provider, for being accessed by the user 2092 online. As such, the OSP 2098 can be an online service provider for clients. Alternately, the functionality of the computer system 2095 may be provided locally to a user.

The user 2092 may be standalone. The user 2092 may use a computer system 2090 that has a screen 2091. In embodiments, the user 2092 and the computer system 2090 are considered part of the primary entity 2093, which is also known as entity 2093. The primary entity 2093 can be a business, such as a seller of items, a reseller, a buyer, a service business, and so on. In such instances, the user 2092 can be an employee, a contractor, or otherwise an agent of the entity 2093. In use cases the entity 2093 is a seller, the secondary entity 2096 is a buyer, and together they are performing the buy-sell transaction 2097. The buy-sell transaction 2097 may involve an operation, such as an exchange of data to form an agreement. This operation can be performed in person, or over the network 188, etc. In such cases the entity 2093 can even be an online seller, but that is not necessary. The transaction 2097 will have data that is known to the entity 2093, similarly with what was described by the relationship instance 197 of FIG. 1.

In a number of instances, the user 2092 and/or the entity 2093 use software applications to manage their business activities, such as sales, resource management, production, inventory management, delivery, billing, and so on. The user 2092 and/or the entity 2093 may further use accounting applications to manage purchase orders, sales invoices, e-invoicing, refunds, payroll, accounts payable, accounts receivable, and so on. Such software applications, and more, may be used locally by the user 2092, or from an Online Processing Facility (OPF) 2089 that has been engaged for this purpose by the user 2092 and/or the entity 2093. In such use cases, the OPF 2089 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective tax jurisdictions. These tax obligations are challenging. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a group of countries, of a single country, of a state, of a county, of a municipality, of a city, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities-if the seller cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome for the amounts of money involved. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes can be considered trust-fund taxes, meaning that the management of a company may be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location, meaning according to the rules of the tax authority of the seller, or from the buyer's location, meaning according to the rules of the tax authority of the buyer.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. As the United States switched, largely but not completely, from primarily origin-based sales tax to destination-based tax, the number of tax jurisdictions rapidly multiplied, and the incentives for local governments to implement new and varied tax rules and ever smaller juris- dictions multiplied. As such, there are over 10,000 different tax jurisdictions in the US, with many partially overlapping. Their sizes vary from as large as many square miles to as small as a single building. In parallel, tens of thousands of tax rules and tax rates have been developed.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is, and/or what the purchase is for. For example, certain entities are exempt from paying sales tax on their purchases, as long as they properly create and sign an exemption certificate and give it to the seller for each purchase made. Entities that are entitled to such exemp- tions may include wholesalers, resellers, non-profit charities, educational institutions, etc. Of course, who can be exempt is not exactly the same in each tax jurisdiction. And, even when an entity is entitled to be exempt, different tax juris- dictions may have different requirements for the certificate of exemption to be issued and/or remain valid. And, certifi- cates of exemption may expire after some time, and may need to be renewed or reissued.

Presently, when an exemption certificate is presented by a secondary entity to a primary entity for claiming exemp- tion from sales tax, the primary entity needs one of their employees to determine that the exemption certificate is legally adequate for this purpose. Of course, they first need the employee to even know the rules for what makes that document legally adequate. Then relying on that employee's determination that the exemption certificate is indeed legally adequate for a sale, they do not collect the applicable sales tax, and they do not remit such a tax to the tax authority. If there is a mistake, there are consequences against the primary entity, including paying the sales tax, paying pen- alties, and so on.

Fifth, it can be hard to determine which tax authorities a seller owes sales tax to. A seller may start with tax juris- dictions that it has a physical presence in, such as a main office, a distribution center or warehouse, an employee working remotely, and so on. Such ties with a tax jurisdic- tion establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

The economic nexus mentioned above can be even more complicated. Even where a seller might not have reached any of the thresholds for economic nexus, a number of states are promulgating marketplace facilitator laws that some- times use such thresholds. According to such laws, interme- diaries that are characterized as marketplace facilitators per laws of the state may have an obligation, instead of the seller, to collect sales tax on behalf of their sellers, and remit it to the state. The situation becomes even more complex when a seller sells directly to a state, and also via such an intermediary.

To help with such complex determinations, the computer system 2095 may be specialized for tax compliance. The computer system 2095 may have one or more processors and memory, for example as was described for the computer system 195 of FIG. 1. The computer system 2095 thus implements a tax engine 2083 to make the determinations of tax obligations. The tax engine 2083 can be as described for the service engine 183.

The computer system 2095 may further store locally entity data, i.e. data of user 2092 and/or of entity 2093, either of which/whom may be a customer, and/or a seller or a buyer in a sales transaction. The entity data may include profile data of the customer, and transaction data from which a determination of a tax obligation is desired. In the online implementation of FIG. 20, the OSP 2098 has a database 2094 for storing the entity data. This entity data may be inputted by the user 2092, and/or caused to be downloaded or uploaded by the user 2092 from the computer system 2090 or from the OPF 2089, or extracted from the computer system 2090 or from OPF 2089, and so on. In other implementations, a simpler memory configuration may suf- fice for storing the entity data.

A digital tax content 2086 is further implemented within the OSP 2098. The digital tax content 2086 can be a utility that stores digital tax rules 2070 for use by the tax engine 2083. As part of managing the digital tax content 2086, there may be continuous updates of the digital tax rules, by inputs gleaned from a set 2080 of different tax authorities 2081, 2082, . . . . Updating may be performed by humans, or by computers, and so on. As mentioned above, the number of the different tax authorities in the set 2080 may be very large. In such use cases, tax jurisdictions such as a country, a state, a city, a municipality, etc. correspond to domains discussed earlier in this document.

In embodiments, when a seller receives an exemption certificate from a buyer, they convert it to a computer image file if it is not converted already, as shown in FIG. 3 for a trusted document. Then they upload it to an Exemption Certificate Management (ECM) system made according to embodiments. Briefly, the ECM system tries to recognize the type of document it is, and produce an error message if it does not recognize it, or if the document is not an exemption certificate. Then the ECM system extracts text segments from the uploaded image file, characterizes the text seg- ments as field values, finds the requirements for this type of exemption certificate (which it can know independently of the user), checks which of the requirements are met by the uploaded file, and surfaces back to the user what has been read, what has not been read, and what is missing. The assessment for the uploaded document can be Valid, Needs Review, or Invalid. If it Needs Review, the user can then correct any errors in the extraction. If it is Invalid, the user can take other measures, for instance communicate with the buyer. When the image is finally Valid, the user can confirm it, and therefore the certificate can be stored for use in determining that the sales tax will be zero. This saves the user from having to enter items manually in a system, having to know what the requirements are for that certificate, checking as to whether these requirements are met, and so on. This also saves delays from a human user doing the process, and from any errors they may make. These opera- tions are now described in more detail.

In embodiments, a certificate of exemption 2020 may be received by an upload to the computer system 2095. A certificate of exemption may also be called an exemption certificate. The certificate of exemption 2020 is a computer file that may have been generated or created by the user 2092 from an original certificate of exemption 2000 that may have been given to the user 2092. For the certificate of exemption 2000 a few requirements are defined by one of the tax authorities of the set 2080. If these requirements are met, they exempt an entity from the payment of sales tax. In this use case, the certificate of exemption 2020 is the same as the trusted document 120.

The uploading may be performed, for instance via the network 188 by the primary entity 2093. Unusually, the certificate of exemption 2020 is shown in two places in FIG. 20, both above the line 2015 to show its being uploaded to the computer system 2095, and also below the line 2015 to show its internal use by the computer system 2095.

The certificate of exemption 2020 can be as described for the trusted document 120. A content of at least one of the writings may be associated with the primary entity 2093 and/or the secondary entity 2096. In fact, one of these entities may have prepared one or more aspects of the trusted document 120 before the uploading.

In embodiments, text segments that have been extracted from the versions of the writings of the certificate of exemption 2020 may be inputted by the computer system 2095. In the example of FIG. 20, an extract operation 2051 is shown below the line 2015, which provides sample text segments 2022.

According to an optional characterization operation, these text segments are also characterized. In the example of FIG. 20, an optional characterize operation 2052 is shown. In addition, the sample text segments 2022, while not required, are shown characterized in pairs, namely text segments 2022A1, 2022A2, 2022B1, 2022B2, 2022C1, 2022C2.

In embodiments, a set of exemption certificate requirements 2040 is identified from the certificate of exemption 2020, as indicated by an arrow 2004. In embodiments, the set 2040 of requirements can be so identified from among a plurality of such sets of certificate of exemption requirements, which can be stored so that they are accessible to the computer system 2095. In the example of FIG. 20, only the identified set 2040 is shown.

The identified set 2040 of exemption certificate requirements may include that the received certificate of exemption 2020 must include certain required values that satisfy the certain content fields. In the example of FIG. 20, the identified set 2040 defines required content fields Customer Name 2045, Business Address 2046, and Expiration Date 2048. Although not shown, additional requirements could be exemption certificate type, tax ID, and that the exemption certificate include a signature. In addition, the requirements include that the text segments 2022A2, 2022B2, 2022C2 are indeed values that satisfy these certain content fields, as indicated by the endings of the arrows 2041.

It will be appreciated that, by creating the set 2040 such that it incorporates the rules that a particular exemption certificate needs to be valid or not, the OSP 2098 may then provide an automated validation service for validating exemption certificates. If validation is lacking, it can offer feedback like: "this one needs these two fields filled out—look at the original", or "this one needs a signature".

After all feedback has been addressed, it is confirmed by the computer system 2095 that at least some of the extracted text segments 2022A2, 2022B2, 2022C2 are indeed all the certain required values, according to arrows 2041 that begin from the respective text segments, and show checkmarks.

In embodiments, once it is confirmed that the set of requirements is met, the certificate of exemption 2020 can be treated as valid, and reliable for subsequent operations. This treatment is depicted in FIG. 20 by an arrow 2042, which further has a checkmark.

Then a certificate of exemption record 2055 is caused to be created by the computer system 2095. The certificate of exemption record 2055 can be about the certificate of exemption 2020, and be created from at least some of the actual values that satisfy the certain required content fields. The certificate of exemption record 2055 indicates that the certificate of exemption has been stored in a memory that is convenient for retrieval if necessary. For instance, it may be stored by the OSP 2098 in association with the primary entity, meaning together with and findable from data and/or other records of the primary entity.

For a specific determination of a tax obligation, the computer system 2095 may receive one or more datasets. A sample received dataset 2035 is shown just below line 2015. The dataset 2035 has values that can also be called dataset values, and be otherwise examples of what was described for the dataset values of the dataset 135 of FIG. 1. In this example, the computer system 2090 transmits a request 2084 that includes a payload 2034, and the dataset 2035 is received by the computer system 2095 parsing the received payload 2034. In this example the single payload 2034 encodes the entire dataset 2035, but that is not required, as mentioned above.

In this example, the dataset 2035 has been received because it is desired to determine any tax obligations arising from the buy-sell transaction 2097. As such, the sample received dataset 2035 has values that characterize attributes of the buy-sell transaction 2097, as indicated by a correspondence arrow 2099. Accordingly, in this example the sample received dataset 2035 has a value ID for an identity of the dataset 2035 and/or the transaction 2097. The dataset 2035 also has a value PE for the name of the primary entity 2093 or the user 2092, which can be the seller making sales transactions, some perhaps online. The dataset 2035 further has an optional value PD for relevant data of the primary entity 2093 or the user 2092, such as an address, place(s) of business, prior nexus determinations with various tax jurisdictions, and so on. The value PD is optional because it may be possible to look it up from the value PE. The dataset 2035 also has a value SE for the name of the secondary entity 2096, which can be the buyer. The dataset 2035 further has a value SD for relevant data of the secondary entity 2096, entity-driven exemption status, and so on. In some instances, the value SD can be optional, similarly with the value PD. The dataset 2035 has a numerical value B2 for the sale price of the item sold. The dataset 2035 may further have additional dataset values, as indicated by the dot-dot-dot in the right side of the dataset 2035. These values may characterize further attributes, such as what item was sold, for example by a Stock Keeping Unit (SKU), how many units of the item were sold in the transaction 2097, a date and possibly also time of the transaction 2097, and so on.

The digital tax rules 2070 are digital in that they are implemented for use by software, similarly with these rules 170. The digital tax rules 2070 can be created so as to accommodate legal tax rules that the set 2080 of different tax authorities 2081, 2082 . . . promulgate to apply within the boundaries of their tax jurisdictions. In the example of this diagram, only two sample digital tax rules are shown explicitly, namely rule T_RULE4 2074 and T_RULE5 2075.

Then the computer system 2095 may select a certain one of the digital tax rules 2070. In this example, either rule T_RULE4 2074 or the rule T_RULE5 2075 is thus selected. The selection of these particular rules is indicated also by the fact that the arrows 2078A, 2078B begin from these rules respectively.

The computer system 2095 may thus select either rule T_RULE4 2074 or the rule T_RULE5 2075 responsive to one or more of the dataset values of the dataset 2035. The impact of the dataset 2035 in the selection is indicated by at least some of the arrows 2071, similarly with the arrows 171.

As such, the computer system 2095 may produce a zero-tax obligation 2079A, which is akin to producing the resource 179A of FIG. 1. This may happen by applying the certain digital tax rule T_RULE4 2074, as indicated by the arrow 2078A, where an uploaded certificate of exemption has been deemed valid, stored, a record was created, and so on.

Alternately, the computer system 2095 may produce a non-zero tax obligation 2079B, which is akin to producing the resource 179B of FIG. 1. This may happen by applying the certain digital tax rule T_RULE5 2075, as indicated by the arrow 2078B, where there is no certificate of exemption that has been considered. For instance, one was never uploaded, or one was uploaded by not deemed valid, its discovered defects were not rectified, and so on. In this example, the identified certain digital tax rule T_RULE4 2074 may specify that a sales tax is due, the amount is to be determined by a multiplication of the sale price of the value B2 by a specific rate, the tax return form that needs to be prepared and filed, a date by which it needs to be filed, and so on.

The computer system 2095 may then cause a notification 2036 to be transmitted. In the example of FIG. 20, the notification 2036 is caused to be transmitted by the computer system 2095 as an answer to the received dataset 2035. The notification 2036 can be about an aspect of the produced tax obligation 2079A or 2079B, similarly with the notification 136 of FIG. 1.

The notification 2036 can be transmitted to one of an output device and another device that can be the remote device, from which the dataset 2035 was received. The output device may be the screen of a local user or a remote user. The notification 2036 may thus cause a desired image to appear on the screen, such as within a Graphical User Interface (GUI) and so on. The other device may be a remote device, as in this example. In particular, the computer system 2095 causes the notification 2036 to be communicated by being encoded as a payload 2037, which is carried by a response 2087. The response 2087 may be transmitted via the network 188 responsive to the received request 2084. The response 2087 may be transmitted to the computer system 2090, or to the OPF 2089, and so on. As such, the other device can be the computer system 2090, or a device of the OPF 2089, or the screen 2091 of the user 2092, and so on. In this example the single payload 2037 encodes the entire notification 2036, but that is not required, similarly with what is written above about encoding datasets in payloads. Of course, along with the aspect of the tax obligation 2079A or 2079B, it is advantageous to embed in the payload 2037 the ID value and/or one or more values of the dataset 2035. This will help the recipient correlate the response 2087 that they receive to their request 2084, and therefore match the received aspect of the tax obligation 2079A or 2079B as the answer to the transmitted dataset 2035.

The digital tax rules 2070 can be implemented or organized in different ways. For example, these digital tax rules 2070 may have applicability conditions that relate to geographical boundaries, effective dates with possible temporary exceptions, item classification into categories, differently-treated parties, and so on, for determining where and when a certain digital tax rule is to be selected and applied, to determine the tax obligation 2079A or 2079B. These conditions may be expressed as logical conditions with ranges, dates, other data, and so on. Values of the dataset 2035 can be iteratively tested against these logical conditions according to arrows 2071. In such cases, the applicable tax rules may indicate how to compute one or more tax obligations, such as to indicate different types of taxes that are due, rules, rates, exemption requirements, reporting requirements, remittance requirements, the actual amounts of tax obligations, etc.

As with the digital resource rules 170 of FIG. 1, the digital tax rules 2070 may also be complex. While a certain one of them is eventually selected and applied to determine the tax obligation, more than one of them may be used for selecting that certain one.

Figure 21:
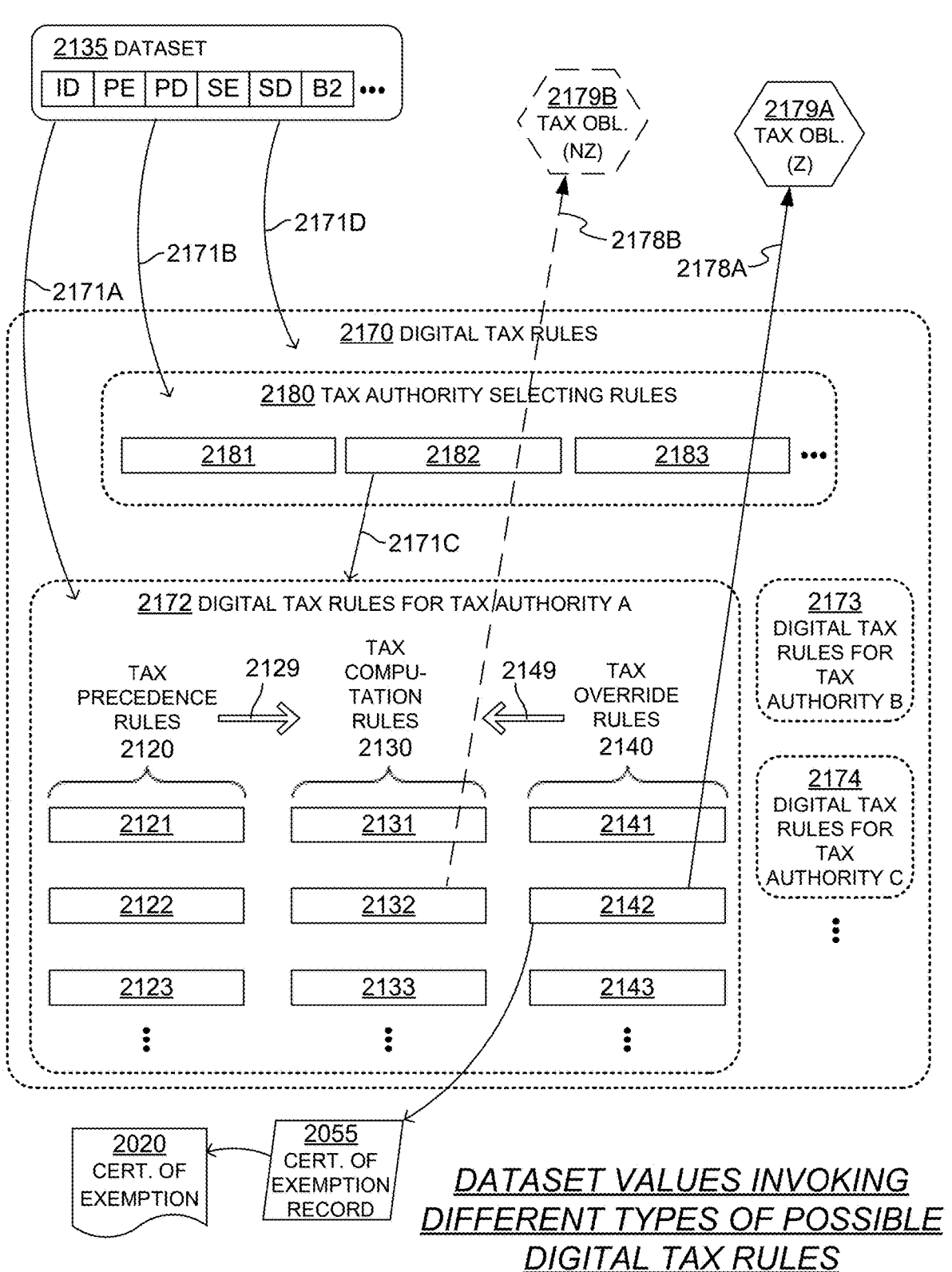
FIG. 21 is a diagram showing details and aspects of different types of possible embodiments of the digital tax rules of the use cases of FIG. 20.

Referring now to FIG. 21, a dataset 2135 can be as described for the dataset 2035 of FIG. 20. In addition, a set 2170 of digital tax rules is a use case of the digital tax rules 2070 of FIG. 20. Either one of tax obligations 2179A, 2179B can be produced according to the arrows 2178A, 2178B. The tax obligations 2179A, 2179B can be as described for the tax obligations 2079A, 2079B of FIG. 20. And it will be further recognized that FIG. 21 has many similarities with FIG. 2. This is intentional, so that portions of the explanations for FIG. 2 also apply to FIG. 21.

The set 2170 of digital tax rules shows examples for digital tax rules, such as the digital tax rules 2070 of FIG. 20. The set 2170 of digital tax rules includes different subsets, into which the individual rules belong. In addition, there are hierarchical relationships among rules of different subsets, and/or of types. In this example, the set 2170 includes a subset of tax authority selecting rules 2180. The set 2170 also includes subsets 2172, 2173, 2174, . . . , each for digital tax rules for tax authorities A, B, C, . . . respectively. Accordingly, by virtue of which tax jurisdiction an entity is subject to due to its presence and activities, a tax authority for which a subset of tax rules is thus provided could be associated with the primary entity 2093, another tax authority could be associated with the secondary entity 2096, and so on. In cases where digital tax rules are provided only for the tax authority A, the tax obligation 2179A or 2179B will be determined by starting from an arrow 2171A.

The subset 2180 includes rules 2181, 2182, 2183, . . . . . The subset 2180 may be invoked, e.g. per an arrow 2171B, when multiple jurisdictions are candidates. These rules may select which tax jurisdiction's rules will be applied, e.g. per an arrow 2171C. For instance, the rules of the subset 2180 may be used to resolve whether a sales tax determination will be origin-based or destination-based. This may depend on appropriate rules of the tax jurisdictions themselves. Then the rules of the subset 2180 may point to the digital tax rules of one or more tax authorities whose legal tax rules must be followed. For instance, and as mentioned above, a buy-sell transaction may be burdened by a sales tax from the tax jurisdictions of a state and of a city. These could invoke, respectively, the subsets 2172 and 2173.

Digital tax rules for individual tax authorities are now described. Such rules need not be the same for each tax authority, or of the same type for each domain. The sample subset 2172 of digital tax rules for tax authority A is now described in more detail. Its description can be similar for subsets for other domains, such as the subsets 2173, 2174, . . . .

The subset 2172 includes different types of rules. In this example, the subset 2172 includes tax precedence rules 2120, tax computation rules 2130, and tax override rules 2140. In this example, the tax precedence rules 2120 include rules 2121, 2122, 2123, . . . . The tax computation rules 2130 include rules 2131, 2132, 2133, . . . . The tax override rules 2140 include rules 2141, 2142, 2143, . . . .

In embodiments, one of the tax computation rules 2130 may ordinarily be selected as the certain digital tax rule. In FIG. 21 this is rule 2132, which is analogous to the rule T_RULE5 2075 of FIG. 20. For instance, the rule 2132 may specify a percentage tax rate for the sales tax. The tax obligation 2179B may be the percentage rate. Or, the purchase price (base value B2) may be further learned from the dataset 2135, e.g. per an arrow 2171D, and the tax obligation 2179B may be the sales tax amount, produced by multiplying the percentage rate by the purchase price.

In addition, although not always required, the different types of rules within the subset 2172 further have different hierarchies among them.

For a first instance, one of the tax precedence rules 2120 may indicate which one of the tax computation rules 2130 is to be selected, as generally indicated by an arrow 2129. As an example, one of the tax precedence rules 2120 may decide the taxability of a specific item indicated in the dataset 2135. Such a tax precedence rule may implement, therefore, an item classification task. The answer can be no sales tax, or different sales tax depending on different categories. For instance, bagels may be taxed differently depending on whether or not they are sold with utensils, based on whether or not they are pre-sliced when sold, and so on. Then the precedence rule may indicate which one of the tax computation rules 2130 is the appropriate one to use for the computation of the sales tax. As another example, one of the tax precedence rules 2120 may indicate that there is a temporary sales tax holiday in a tax jurisdiction on the day of the transaction, in which case the sales tax for the transaction 2097 of FIG. 20 will be zero, and the tax obligation will be computed accordingly. As one more example, one of the tax precedence rules 2120 may indicate that there is no economic nexus for this transaction which, alone or in combination with other nexus determinations, may determine that no sales tax will be imposed. As mentioned above, the example shown here is that rule 2132 was thus selected, which produced a non-zero (NZ) tax obligation 2179B.

For a second instance, even though the tax computation rule 2132 is thus indicated, one of the tax override rules 2140 may still override that indication, as generally indicated by an arrow 2149. As an example, rules for implementing cases where the sales tax computation is overridden and no sales tax is due, such as with a tax holiday or lack of economic nexus, may be implemented as the tax override rules 2140 instead of by the precedence rules 2120. As another example, which is the case depicted here, rule 2142 is one of the override rules 2140 that indicates that a party is exempt from paying sales tax because certain conditions are met, for instance if they have a valid and current exemption certificate. Accordingly, that rule 2142 was thus selected, which produced a zero (Z) tax obligation 2179A. The rule 2142 In FIG. 21 is analogous to the rule T_RULE4 2074 of FIG. 20. Repeating into FIG. 21 elements from FIG. 20, that rule 2142 may have been applied responsive to the certificate of exemption record 2055, as shown by an arrow, which in turn has been caused to be created responsive to having received and validated the certificate of exemption 2020, as shown by another arrow.

As mentioned above, the system described herein is an automated validation service that streamlines and simplifies how to manage exemption certificates for purposes of determining tax obligations, such as sales tax obligations. The automated validation service reads text from documents, classifies whether the documents are exemption certificates, and then extracts relevant data from them. Post extraction, the service applies business rules to validate these certificates. In this use case example, a validation service such as an Exemption Certificate Management (ECM) system allows for certificates to be reviewed and validated as they come in, eliminating the need for manual data entry and review. Not only does this increase accuracy, but it saves countless hours of human activity. Plus, the ECM system does a real-time Tax ID validation check.

Figure 22:
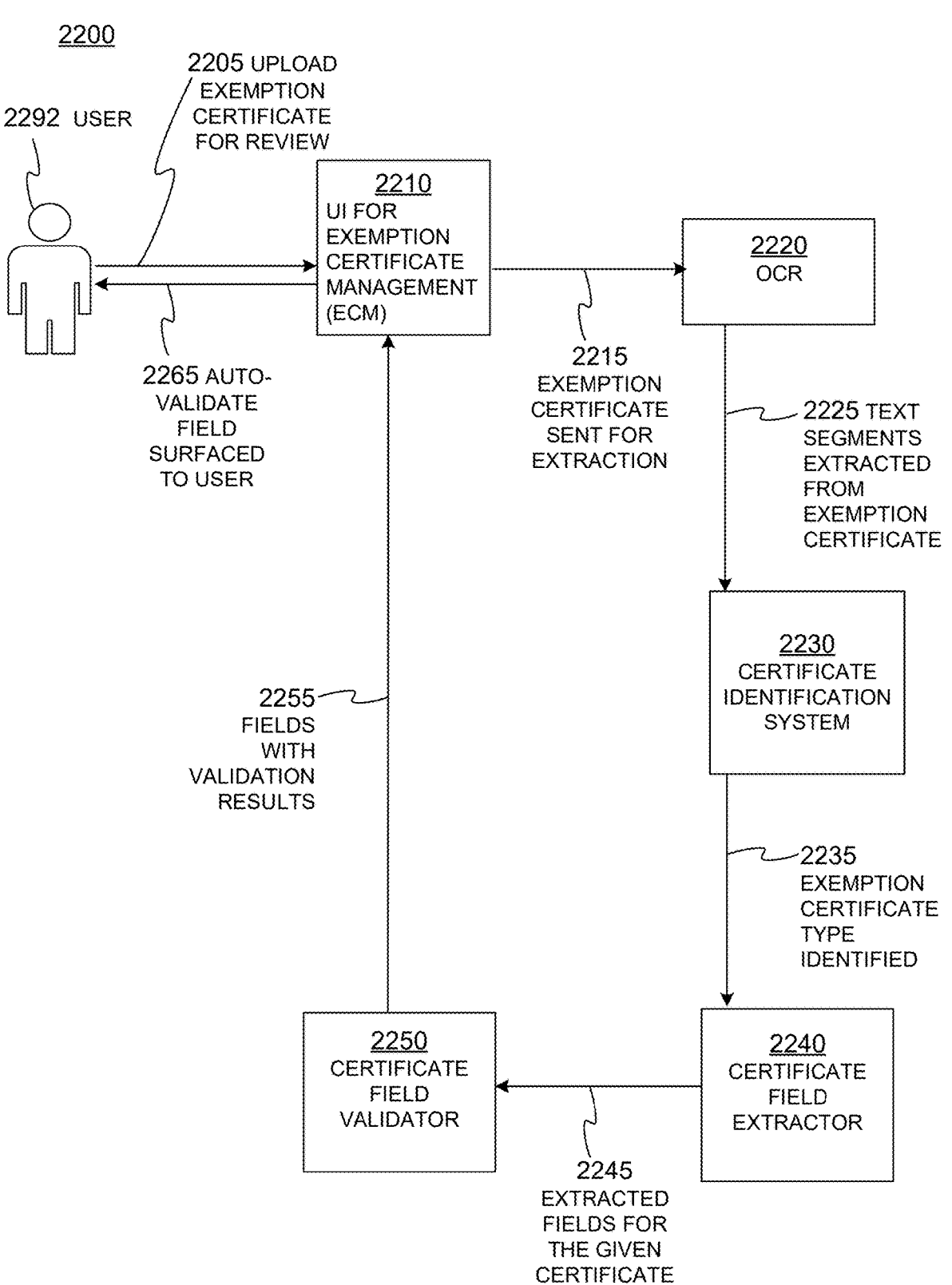
FIG. 22 is a flowchart for illustrating sample methods for use cases of embodiments.

FIG. 22 is a flowchart 2200 for illustrating a high-level operation of such a system. It will be recognized that the flowchart 2200 has some similarities to the flowchart 1300 of FIG. 13, and it is further applied to exemption certificates whose requirements are identified by identifying similar documents.

A user 2292 can be as the user 192 or the user 2092. The user 2292 interacts with the ECM UI 2210. The operations and elements 2205, 2215, 2220, 2225, 2230, 2235, 2240, 2245, 2250, 2255, 2265 can be as written on the drawing. In addition, the certificate field extractor 2240 is analogous to characterizing text segments as field values from their locations on the image file. The validator 2250 is analogous to the requirements checking operation 1350.

Further, it will be understood that the certificate identification system 2230 is a way of identifying the set of requirements 1342, and may use part of a Certificate Information Extraction system.

A Certificate Information Extraction system for use cases of embodiments may include components 2230, 2240, 2250. In other words, such a system, may have classifier, extractor, and even validation modules. The classifier component (2230) may determine the type of uploaded document. The extractor component (2240) may extract details and aspects of the certificate/document, especially if it has been trained to read on that type or category of certificates/documents, which also amounts to the aforementioned characterizing extracted text as field values. At the validation stage (2250), one or more business rules may be compared against the extracted content to determine whether the certificate is valid or valid for a particular purpose, event, location, transaction, and so on.

In some embodiments, the Certificate Information Extraction system may include models that have many classifiers. In one example, the multiple classifiers may be configured to:

(A) Detect language.
(B) Detect country of origin for the certificate.
(C) Detect province/state for the certificate.
(D) Detect certificate type.
(E) Extract.

For example, languages detected could be English, French, Arabic, or any other language or combination of languages. Each country may have states or provinces depending on the country of origin e.g., US or Canada. Canada may use English, French, both, and so on. Each of those states or provinces may each have difference certificates. In the US, the classification could even go deeper down to the municipality (e.g., city, county, etc.), and even to special tax jurisdictions.

In some embodiments, a certificate may be processed for validation in accordance with any or all combinations of the following:

(A) Store indicia of expected document types.

(B) Store digital rules for each of the expected document type and their fields.

(C) From a machine learning model on-boarding (which may be, but not limited to, at a client), receive (1) a name of the machine learning model, and (2) a tolerance input value regarding an error tolerance for the machine learning model for OCR error.

In some embodiments, using previously validated certificates and data from certificates, models can be trained to identify the certificate type with a given confidence score for the predictions. For the identified certificate, models can be built to extract fields like certificate number (tax ID), state, business name, business address, effective and expiry dates from the document. The existing customer data can also be used to evaluate the accuracy of model predictions, for instance as already shown in FIG. 15.

Figure 23:
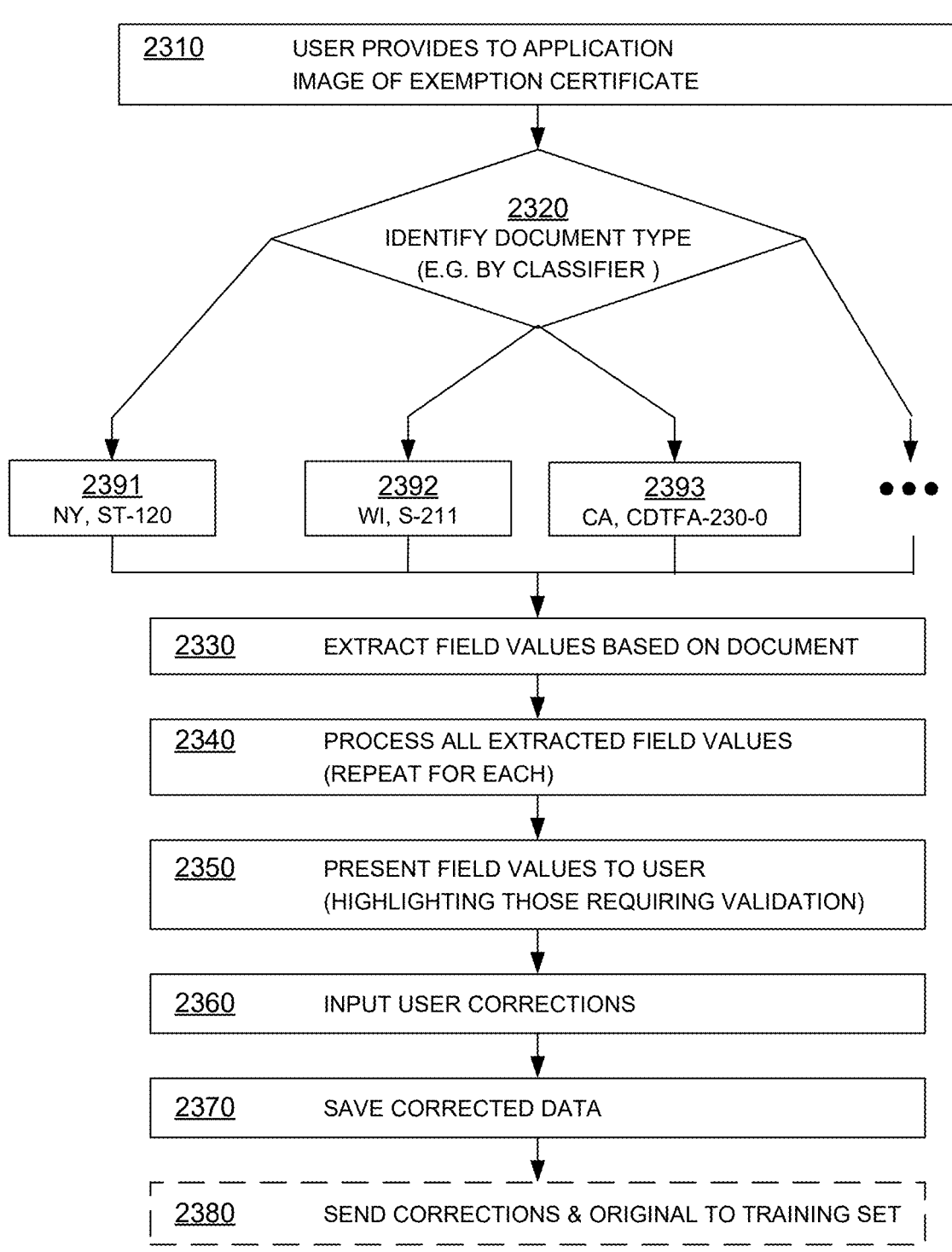
FIG. 23 is a flowchart for illustrating sample methods in use cases of embodiments.

FIG. 23 shows a flowchart 2300 for describing methods according to embodiments. The flowchart 2300 has operations 2310, 2320, 2330, 2340, 2350, 2360, 2370 and optionally 2380 that are depicted in texts. It will be recognized that the flowchart 2300 is similar to the flowchart 1700 of FIG. 17, and some of their description applies as well.

According to the operation 2310, the user provides to the application an image of an exemption certificate, for instance by uploading.

At the operations 2320, the image may be recognized or not. If not, an error message can be sent, and/or the image can be added to the stored document types, have its requirements be learned and stored, and so on. If it is recognized, the classifier can select one of document types 2391, 2392, 2393, . . . it should be noted that, in this example, these document types mention the state, then after a comma, a form number, and so on.

The operation 2340 may be performed as described in FIG. 18. For the operations 2320, 2330, 2340, a classifier may be used, and the following may be performed:

(A) Identify indicia from the scanned new document.

(B) Search the identified indicia against the stored indicia for matching.

(C) If the identified indicia matches the stored indicia of an expected type of document:

(1) input the expected type of document, and (2) input remaining stored indicia of the type of document.

(D) Determine whether the remaining stored input indicia match additional identified indicia of the scanned document.

(E) If YES, then, (1) look up the stored digital rules for the document type, and (2) from the digital rules and their format, extract & recognize from the scanned new document: customer name, tax ID, address, certificate number, dates, including expiry dates, reasons for the exemption, etc.

(F) Compare confidence score of fields extracted & recognized in the previous step with tolerance input value above. The tolerance input can be the above-described Extraction Confidence Threshold (ECT).

(1) If confidence score>tolerance value, just store it.

(2) If confidence score<tolerance value, then ask the client to correct it:

(a) present as proposed what was extracted, (b) ask them to enter correct value, (c) input what they entered, (d) store their input as the corrected value.

(G) Notify client when certificate expires.

The operations 2350, 2360, 2370 and 2380 can be performed as described for the operations 1750, 1760, 1770 and 1780 of FIG. 17.

Figure 24:
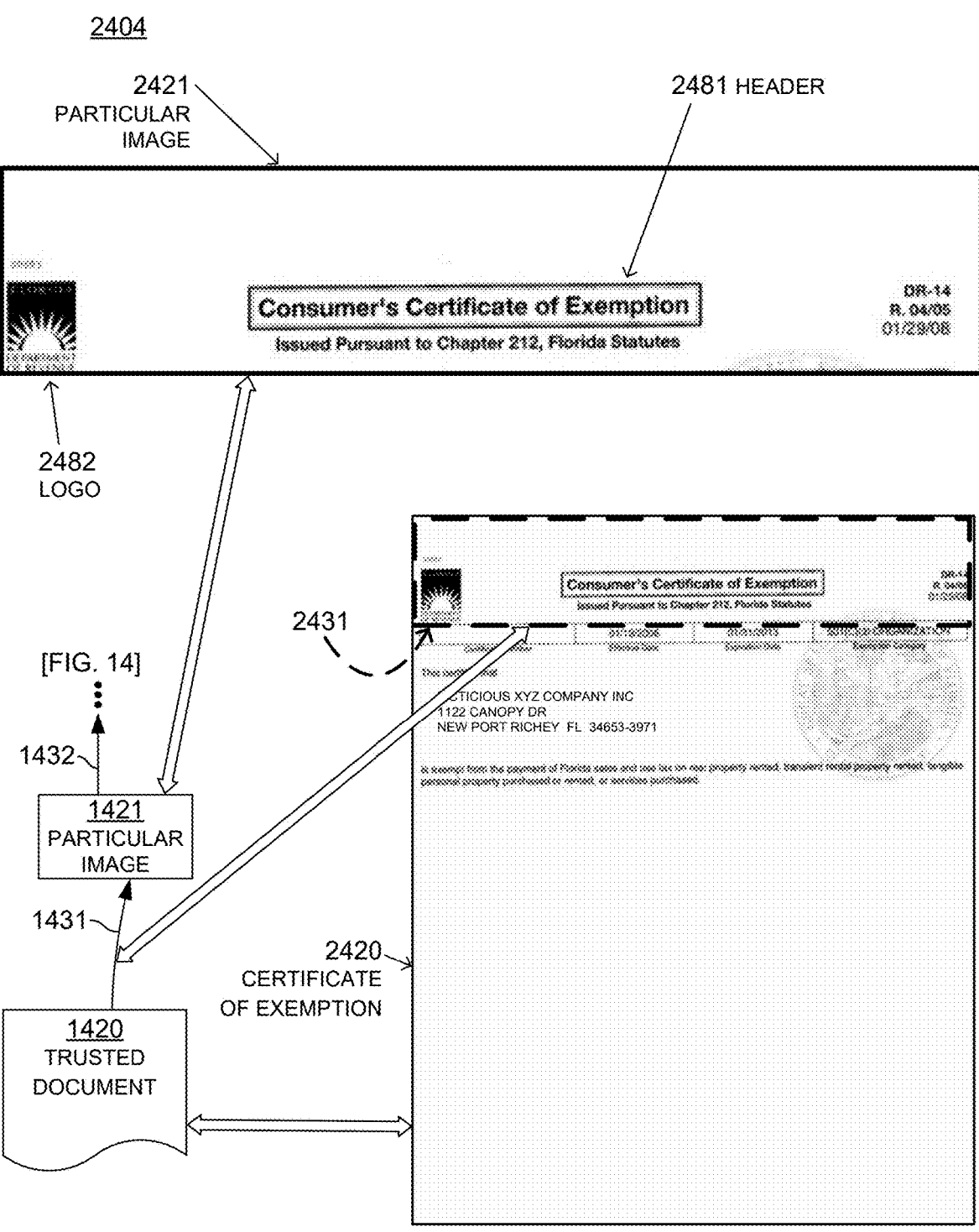
FIG. 24 is a diagram showing a sample partial operation of identifying a set of requirements for an exemption certificate in a use case of embodiments.

FIG. 24 is a diagram 2404 showing a sample partial operation of identifying a set of requirements for an exemption certificate, in a use case of embodiments. The diagram 2404 is partial, in that it is really only a small portion of the diagram 1404 of FIG. 14.

FIG. 24 repeats, at its lower left, from FIG. 14 the trusted document 1420, the process arrow 1431, the particular image 1421, and the process arrow 1432. After the process arrow 1432, the dot-dot-dot here indicates that the remaining operations may proceed as indicated in FIG. 14.

In FIG. 24, an actual certificate of exemption 2420 is also shown, as a sample of the trusted document 1420. For the operation of the arrow 1431, a rectangle 2431 carves out the top of the certificate of exemption 2420. For the particular image 1421, the example this time is the carved-out particular image 2421 by itself. This includes a header 2481 and a logo 2482. This particular image 2421, or at least the logo 2482 may be identified as an image by AI against prestored images, and so on.

Figure 25:
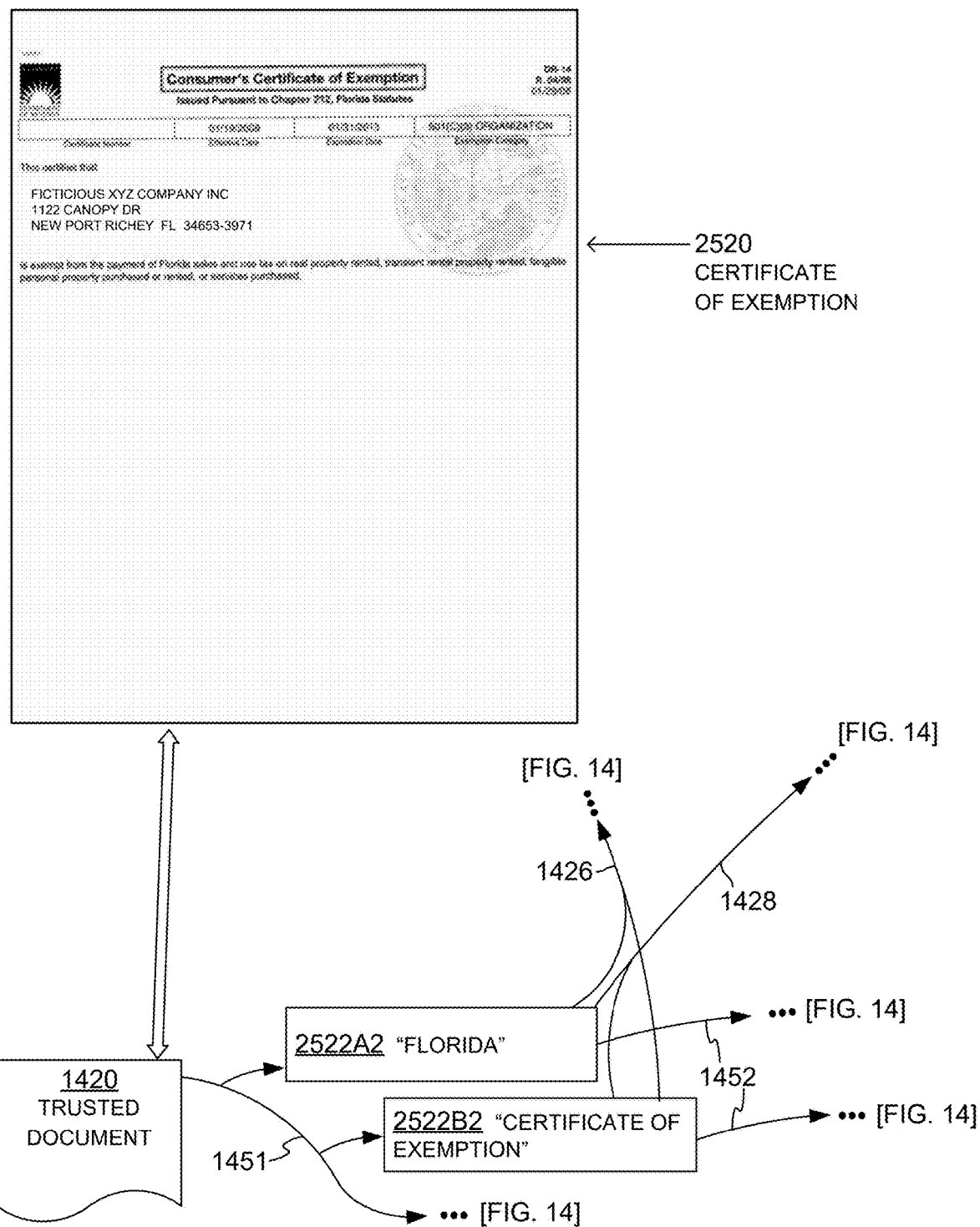
FIG. 25 is a diagram showing a sample partial operation of identifying a set of requirements for an exemption certificate in a use case of embodiments.

FIG. 25 is a diagram 2504 showing a sample partial operation of identifying a set of requirements for an exemption certificate, in a use case of embodiments. The diagram 2504 is partial, in that it is really only a small portion of the diagram 1404 of FIG. 14.

FIG. 25 repeats, at its lower portion, from FIG. 14 the trusted document 1420, the process arrow 1451, the characterization arrows 1452, and the search arrows 1426, 1428. After these arrows, the dot-dot-dots here indicate that the remaining operations may proceed as indicated in FIG. 14.

In FIG. 25, an actual certificate of exemption 2520 is also shown, as a sample of the trusted document 1420. From the process arrows 1451, text segments 2522A2 and 2522B2 are extracted. In this case, the text segment 2522A2 is the word "FLORIDA" and the text segment 2522B2 are the words "CERTIFICATE OF EXEMPTION". These may be further characterized by the characterization arrows 1452, and then used as search kernels for identifying the set of requirements.

Figure 26:
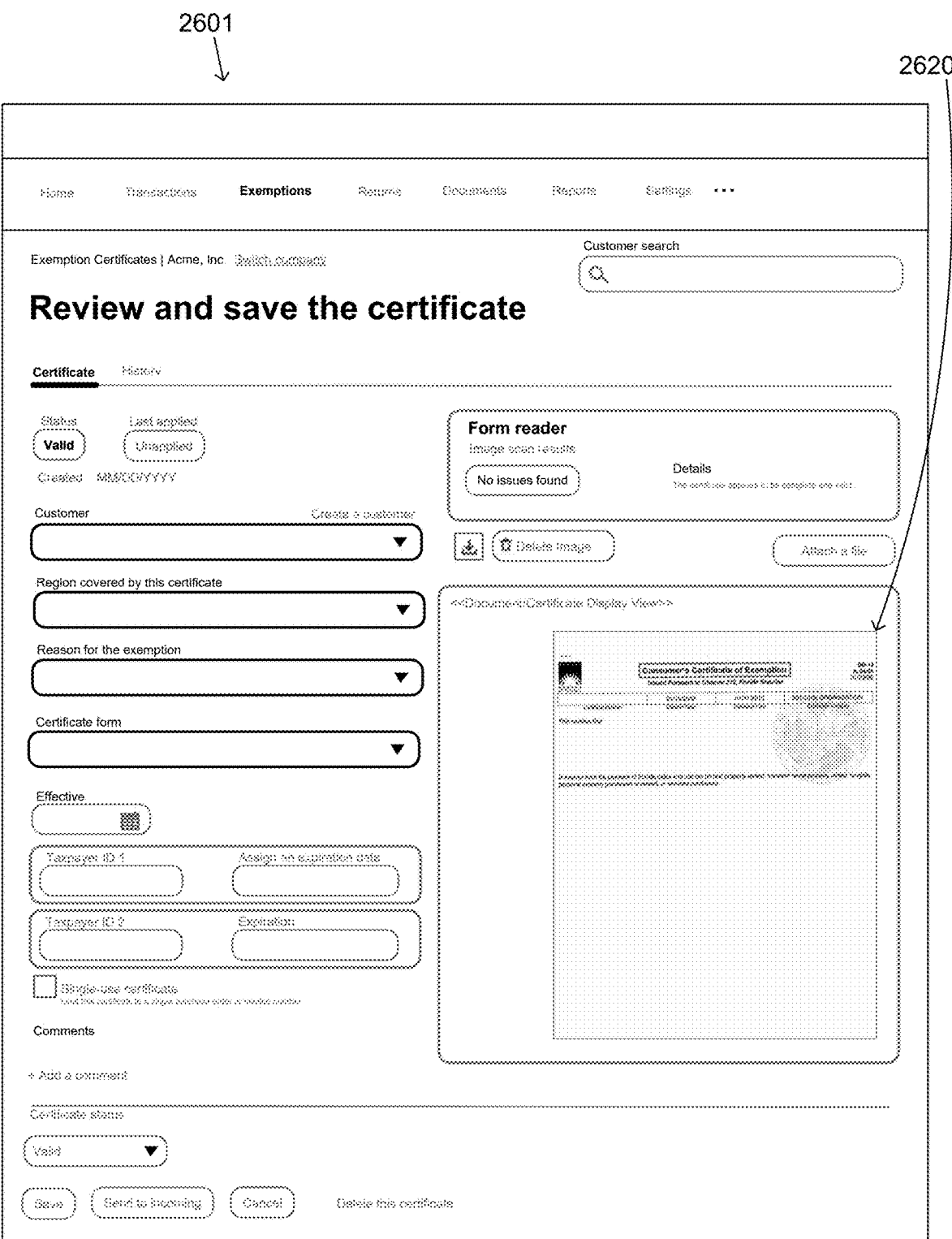
FIG. 26 is a sample view of a User Interface (UI) in a use case of an embodiment.

FIG. 26 is a sample view of a UI 2601 in a use case of an embodiment. This might be one view of UI 2210 of FIG. 22. The UI 2601 shows a proposed certificate of exemption 2620 in context. Such UIs may be used before uploading a certificate of exemption, or when correcting for a found inadequacy or error, and so on. It will be appreciated that the UI 2601 allows the user to review and manage exemption certificates, for instance informs the user what they are looking at, what they need to do, and so on.

Figure 27:
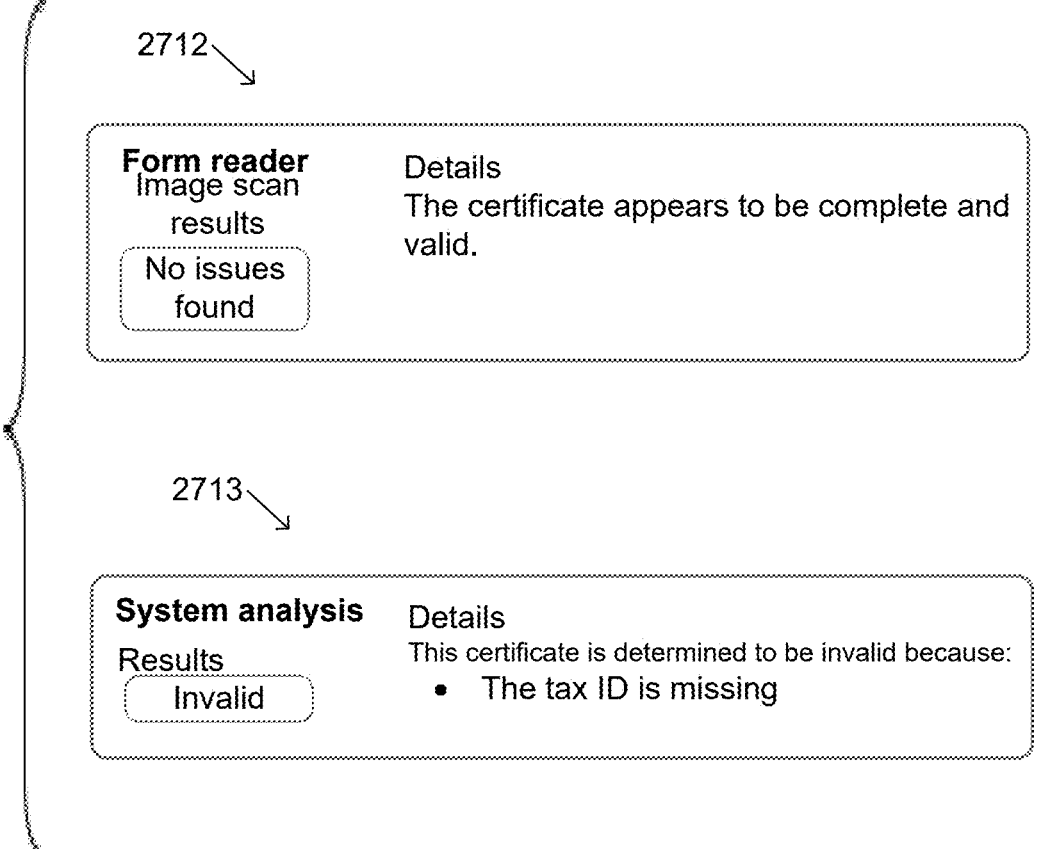
FIG. 27 shows sample user notices in User Interfaces (UIs) in use cases of embodiments.

FIG. 27 shows sample user notices of User Interfaces (UIs) in use cases of embodiments. A user notice 2712 may inform of the good news shown on the diagram. A user notice 2713 may inform the user that a certificate of exemption is not valid, and what the problem is.

A number of sample implementations are now shown.

FIG. 28A is a view of a sample document in a use case of embodiments.

FIG. 28B shows part of a process of identifying the document of FIG. 28A, if uploaded in a use case of embodiments. In particular, FIG. 28B shows labels that could be the options 2391, 2392, 2393, . . . of FIG. 23. These labels could be headers of the respective types of documents. For each such label, confidence level values are computed for indicia, such as a header text segment, that have been extracted from the document of FIG. 28A. The pairs of labels and respective confidence level values here are shown ranked by confidence level value from highest (0.74) to lowest (0). The first listed label ("Florida Annual Resale Certificate") has by far the highest confidence label, which thus makes for a confident identification of the document of FIG. 28A.

FIG. 29A is a view of the front and back sides of a sample document, in a use case of embodiments. The front and the back side are separated by a horizontal line 2915.

FIG. 29B shows part of a process of reading the document of FIG. 29A, if uploaded in a use case of embodiments. In particular, FIG. 29B shows pairs of labels and values, which could be the Actual Content Fields (ACFs) and the corresponding Actual Values (AVs) that are shown in FIG. 6 of this document.

Figure 30A:
FIG. 30A is a view of one more sample document in a use case of embodiments.

FIG. 30A is a view of one more sample document in a use case of embodiments.

FIG. 30B shows part of a process of reading the document of FIG. 30A, if uploaded in a use case of embodiments. In particular, the process of FIG. 30B is similar to the process of FIG. 29B.

Figure 31B:
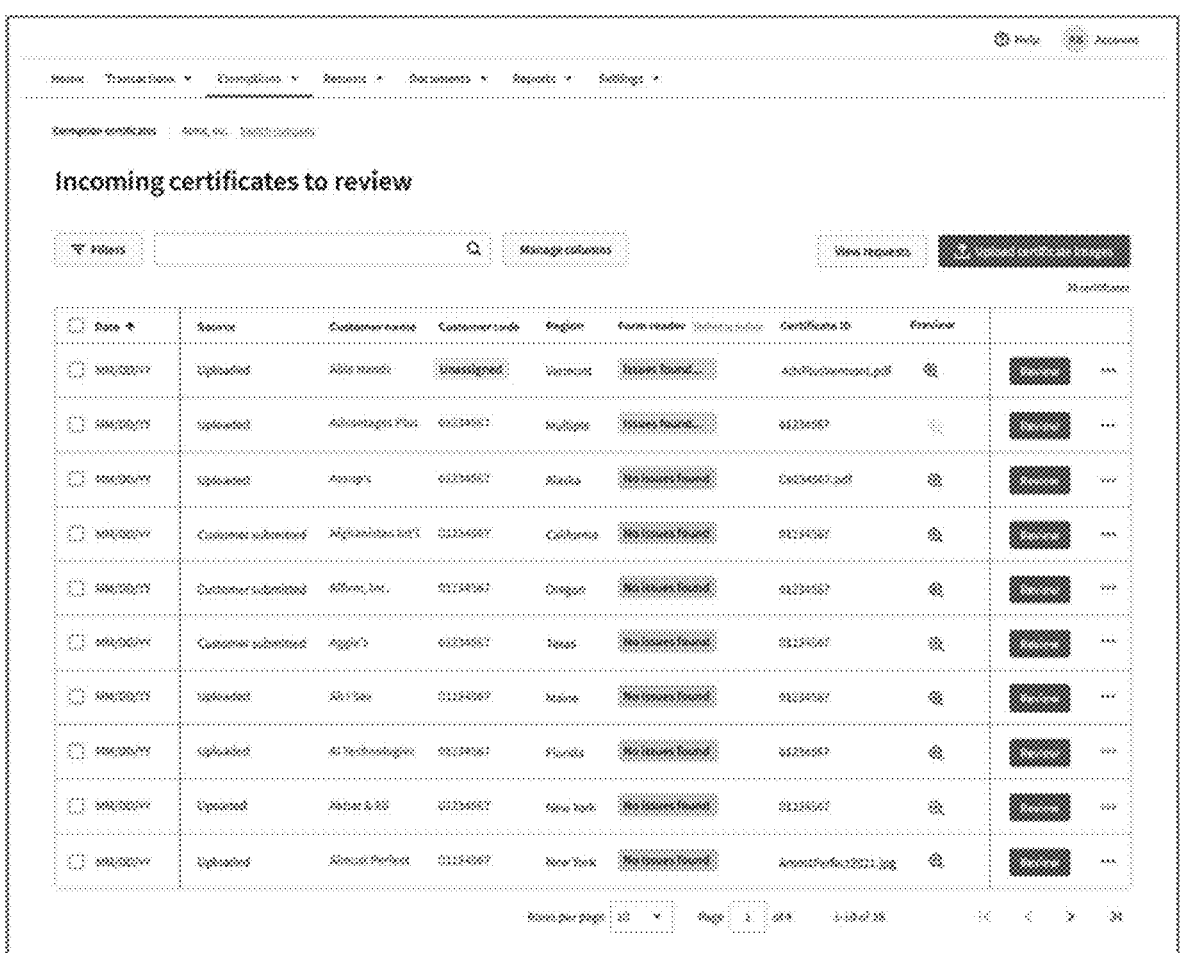
FIG. 31B is another sample view of a User Interface (UI) in a use case of an embodiment for managing exemption certificates.

In this system a user can see which certificates have been auto-reviewed and validated and which certificates should be manually reviewed for a potential issue like missing information or errors, (e.g., a missing signature or invalid Tax ID number). See, for example, the UIs FIG. 31A and FIG. 31B for managing multiple exemption certificates.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

A number of embodiments are possible, each including various combinations of elements. When one or more of the appended drawings—which are part of this specification—are taken together, they may present some embodiments with their elements in a manner so compact that these embodiments can be surveyed quickly. This is true even if these elements are described individually extensively in this text, and these elements are only optional in other embodiments.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and sub-combinations of elements, features and acts or operations, which are regarded as novel and non-obvious. The claims also include elements, features and acts or operations that are equivalent to what is explicitly mentioned. Additional claims for other such combinations and sub-combinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" compo- nent or "an" item, it means that the claim can have one or more of this component or this item.

In construing the claims of this document, 35 U.S.C. § 112 (f) is invoked by the inventor(s) only when the words "means for" or "steps for" are expressly used in the claims. Accordingly, if these words are not used in a claim, then that claim is not intended to be construed by the inventor(s) in accordance with 35 U.S.C. § 112 (f).

What is claimed is:

1. A computer system for including at least:
one or more processors; and
a non-transitory computer-readable storage medium hav- ing stored thereon instructions which, when executed by the one or more processors, are designed to result in operations performed by an online software platform (OSP) including at least:
   receiving, by an upload to the computer system, a trusted document, the trusted document being a computer file that stores versions of writings, a content of at least one of the writings being associ- ated with a primary entity;
   inputting, by the computer system, text segments that have been extracted from the versions of the writings of the trusted document;
   storing, by the computer system in a database, known document types and associations between each of the known document types and a corresponding set of requirements;
   comparing, by the computer system, the trusted docu- ment to the stored known document types by com- paring a particular image of at least a portion of the trusted document to respective images of at least portions of each of the stored known document types;
   determining, by the computer system based on the comparing, that a certain document type from the stored known document types matches the trusted document above a confidence threshold;
   responsive to determining that the certain document type matches the trusted document above the confi- dence threshold, selecting, by the computer system based on accessing the database, the set of require- ments that is associated with the certain document type to be a set of requirements for the trusted document, the set of requirements for the trusted document including a requirement that the received trusted document must include certain required val- ues;
   confirming, by the computer system, that at least some of the extracted text segments are indeed the certain required values;
   causing, by the computer system and responsive to so confirming, a trusted document record to be created about the trusted document, the trusted document record created from at least some of the extracted text segments that are indeed the required values;

then receiving, by the computer system from a remote device via a network, a dataset having dataset values, at least one of the dataset values associated with the primary entity;
   accessing, by the computer system, stored digital resource rules;
   selecting, by the computer system and responsive to one or more of the dataset values, a subset of the digital resource rules that includes a main rule and an override rule;
   determining, by the computer system and from the trusted document record, whether the override rule applies or not;
   producing, by the computer system and responsive to determining that the override rule applies, a resource having a value of zero;
   producing, by the computer system and responsive to determining that the override rule does not apply, a resource having a non-zero value by applying the main rule to at least one of the dataset values; and
   causing, by the computer system, a notification to be transmitted about an aspect of the resource to one of an output device and another device.

2. The computer system of claim 1, in which:
the other device is the remote device.

3. The computer system of claim 1, in which:
the at least one of the dataset values is a numerical base value, and
applying the main rule includes multiplying the numerical base value with a number indicated by the main rule.

4. The computer system of claim 1, in which the opera- tions further include:
extracting, by the computer system, at least some of the text segments from the versions of the writings of the trusted document prior to the inputting of the text segments.

5. The computer system of claim 4, in which:
the extracting is performed by applying an optical char- acter recognition (OCR) process to the trusted docu- ment.

6. The computer system of claim 1, in which:
the set of requirements for the trusted document defines certain content fields, and
the set of requirements for the trusted document further includes a requirement that the certain required values satisfy the certain content fields.

7. The computer system of claim 6, in which the opera- tions further include:
characterizing, by the computer system, at least some of the text segments as actual values, and
in which the requirement is satisfied by at least some of the actual values being the certain required values.

8. The computer system of claim 1, in which:
one of the text segments, which is confirmed to be indeed one of the certain required values, is a document type.

9. The computer system of claim 1, in which:
one of the text segments, which is confirmed to be indeed one of the certain required values, is a domain of the primary entity.

10. The computer system of claim 1, in which:
one of the text segments, which is confirmed to be indeed one of the certain required values, is a document number of the trusted document.

11. The computer system of claim 1, in which:
one of the text segments, which is confirmed to be indeed one of the certain required values, is a name of the primary entity.

12. The computer system of claim 1, in which:

one of the text segments, which is confirmed to be indeed one of the certain required values, is an address of the primary entity.

13. The computer system of claim 1, in which:

one of the text segments, which is confirmed to be indeed one of the certain required values, is an invoked justification for the trusted document.

14. The computer system of claim 1, in which:

one of the text segments, which is confirmed to be indeed one of the certain required values, is an expiration date of the trusted document.

15. The computer system of claim 1, in which:

one of the text segments, which is confirmed to be indeed one of the certain required values, is an electronic signature of an agent of the primary entity.

16. The computer system of claim 1, in which the operations further include:

causing, by the computer system, one of the text segments to be presented via a User Interface (UI); and receiving, by the computer system, a confirmation input responsive to causing the one of the text segments to be presented.

17. The computer system of claim 1, in which:

the trusted document record indicating that the trusted document has been stored in a memory.

18. The computer system of claim 1, in which the operations further include:

conducting, by the computer system, an attempt to extract a certain one of the text segments from a certain one of the versions of the writings of the trusted document;

evaluating, by the computer system, that a result of the attempt does not meet an extraction confidence threshold (ECT);

causing, by the computer system and responsive to the result not meeting the ECT, a correction query to be presented via a User Interface (UI); and receiving, by the computer system and responsive to the correction query, a corrected value, and in which the confirming includes ascertaining that the received corrected value is indeed one of the certain required values.

19. The computer system of claim 18, in which:

the trusted document record is created also from the corrected value.

20. The computer system of claim 1, in which the operations further include:

ascertaining that at least one of the extracted segments also meets a preset validity criterion, and in which the trusted document record is caused to be created responsive also to so ascertaining.

21. The computer system of claim 1, in which the operations further include:

deciding, by the computer system, that the trusted document does not include a text segment that satisfies a certain one of required content fields; and causing, by the computer system and responsive to so deciding, a compliance error message to be presented in a User Interface (UI).

22. The computer system of claim 1, in which:

the trusted document is further compared to the stored known document types by comparing one or more of the inputted text segments to one or more of stored text segments previously extracted from the stored known document types.

23. The computer system of claim 1, in which the operations further include:

characterizing, by the computer system, at least one of the text segments as a value for a domain field of the trusted document, and in which the trusted document is further compared to the stored known document types by comparing the value for a domain field to a stored text segment previously extracted from the stored known document types.

24. The computer system of claim 1, in which:

if the comparison indicates that none of the stored known document types matches the trusted document above the confidence threshold, then the trusted document is stored as an additional document type.

25. The computer system of claim 1, in which:

the sets of trusted document requirements corresponding to the stored known document types are stored as records in a database, and the set of requirements for the trusted document is identified by using the one or more of the inputted text segments to search the database for sets of trusted document requirements.

26. The computer system of claim 1, in which the operations further include:

characterizing, by the computer system, at least one of the text segments as one or more values for domain fields of the trusted document, and in which the sets of trusted document requirements corresponding to the stored known document types are stored as records in a database, and the set of requirements for the trusted document is identified by using the one or more of the values for domain fields to search the database for sets of trusted document requirements.

* * * * *